(12) United States Patent
Takeda et al.

(10) Patent No.: US 12,488,840 B2
(45) Date of Patent: Dec. 2, 2025

(54) MEMORY SYSTEM

(71) Applicant: Kioxia Corporation, Tokyo (JP)

(72) Inventors: Naomi Takeda, Yokohama Kanagawa (JP); Masanobu Shirakawa, Chigasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 212 days.

(21) Appl. No.: 18/222,640

(22) Filed: Jul. 17, 2023

(65) Prior Publication Data

US 2024/0127893 A1   Apr. 18, 2024

(30) Foreign Application Priority Data

Sep. 8, 2022   (JP) .................. 2022-143276

(51) Int. Cl.
   *G11C 16/26*   (2006.01)
   *G11C 16/34*   (2006.01)
(52) U.S. Cl.
   CPC .......... *G11C 16/26* (2013.01); *G11C 16/3418* (2013.01); *G11C 16/3486* (2013.01)
(58) Field of Classification Search
   CPC . G11C 16/26; G11C 16/3418; G11C 16/3486; G11C 2029/0411; G11C 11/5642; G11C 16/08; G11C 16/0483; G11C 29/52
   See application file for complete search history.

(56) References Cited

U.S. PATENT DOCUMENTS

| | | | |
|---|---|---|---|
| 11,120,882 B2 | 9/2021 | Ioannou et al. | |
| 11,250,918 B2 | 2/2022 | Malshe et al. | |
| 2018/0293029 A1* | 10/2018 | Achtenberg | G11C 29/028 |
| 2021/0375372 A1 | 12/2021 | Sakurada et al. | |
| 2022/0300200 A1* | 9/2022 | Yeh | G11C 7/04 |
| 2023/0162799 A1* | 5/2023 | Seo | G11C 11/5642 |
| | | | 365/185.01 |

FOREIGN PATENT DOCUMENTS

JP   2021-190150 A   12/2021

* cited by examiner

*Primary Examiner* — Xiaochun L Chen
(74) *Attorney, Agent, or Firm* — Maier & Maier, PLLC

(57) ABSTRACT

According to one embodiment, a memory system includes 1st-5th sub-memory regions and a controller, the controller being configured to: calculate a 1st voltage of the 1st sub-memory region in 1st processing; calculate a 2nd voltage of the 4th sub-memory region in 2nd processing; before the 1st processing, use a 3rd voltage when reading the 1st and 2nd sub-memory regions, and the 4th and the 5th sub-memory regions, and use a 4th voltage of the 3rd sub-memory region when reading the 3rd sub-memory region; use the 1st voltage when reading the 1st sub-memory region, use a 5th voltage calculated by using the 1st voltage when reading the 2nd, the 4th, and the 5th sub-memory regions, use a 6th voltage calculated by using the 2nd voltage when reading the 2nd and the 5th sub-memory regions.

19 Claims, 37 Drawing Sheets

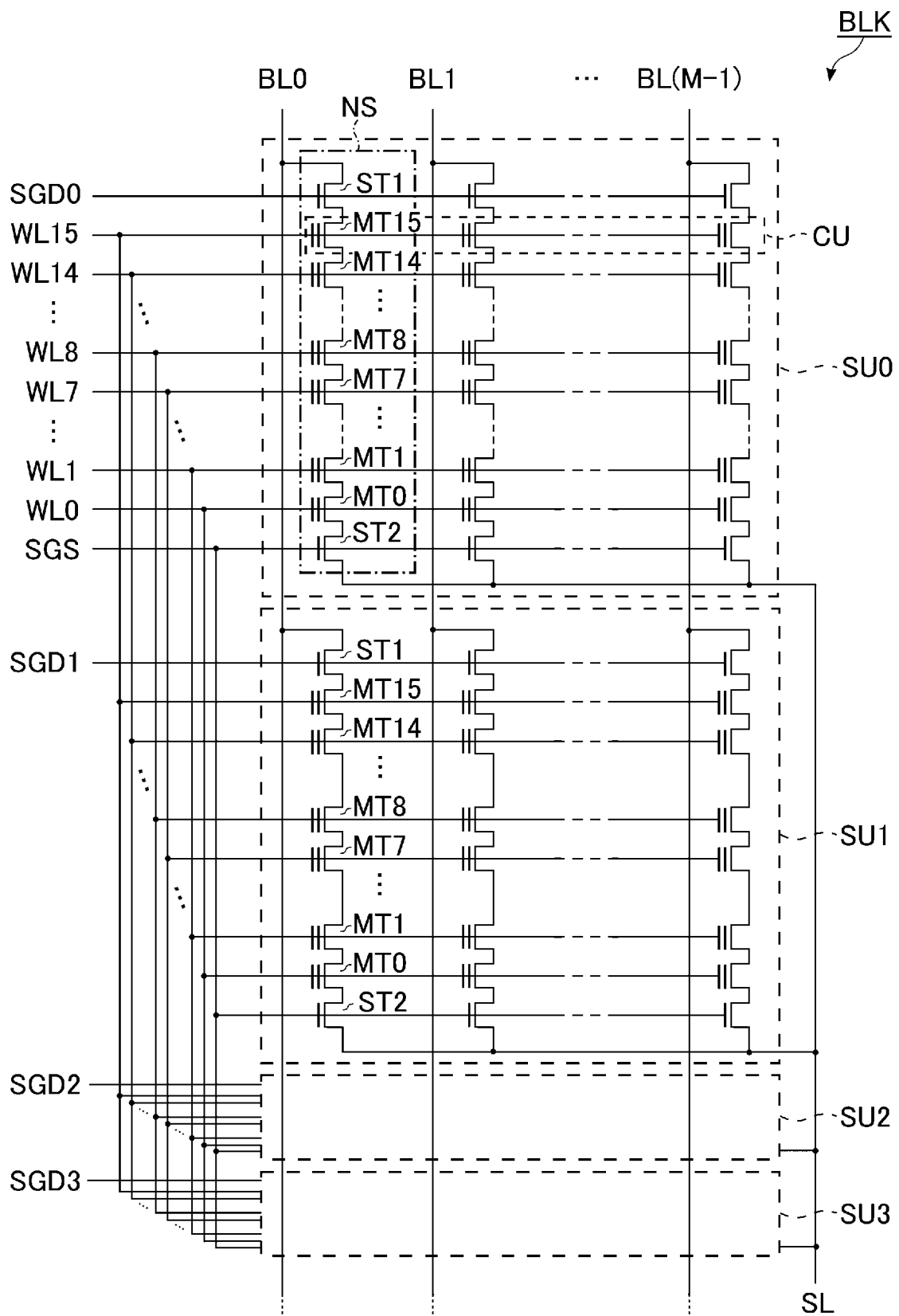
F I G. 3

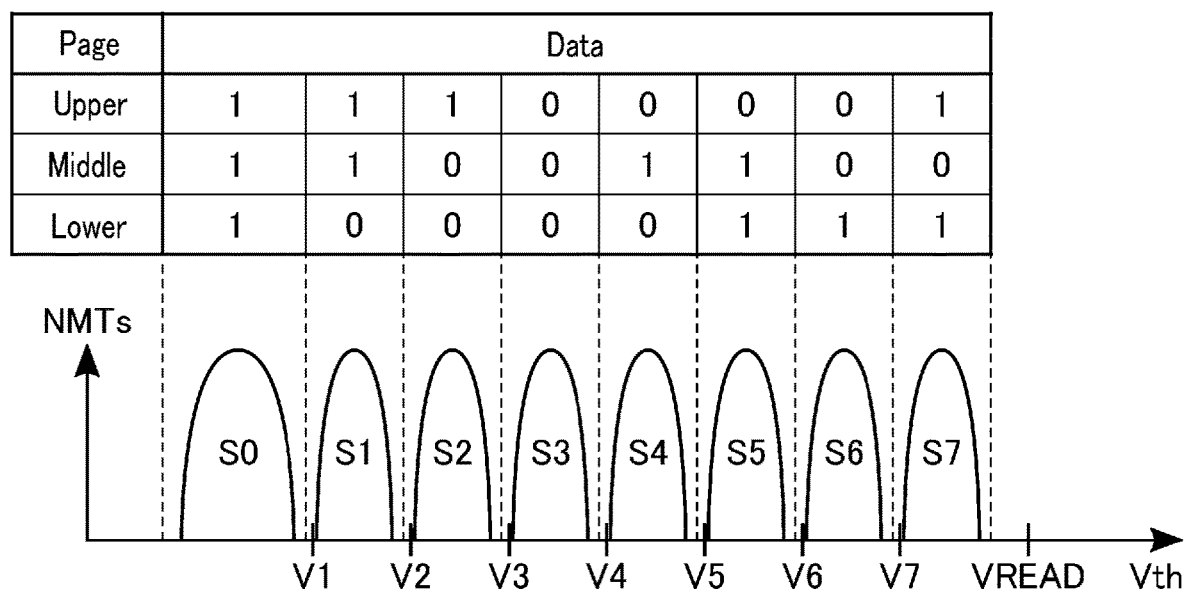
F I G. 4

| Chip | Block | Read voltage identifier | Individual read voltage (V1) | Common read voltage updating block |
|---|---|---|---|---|
| Chip0 | BLK0 | Icom0 | - | ○ |
| | BLK1 | Icom0 | - | × |
| | BLK2 | Ii | Vi0-2 | × |
| | BLK3 | - | - | ○ |
| | ⋮ | ⋮ | ⋮ | ⋮ |
| | BLKn | Icom0 | - | × |
| Chip1 | BLK0 | Icom1 | - | ○ |
| | BLK1 | Icom1 | - | × |
| | BLK2 | Icom1 | - | × |
| | BLK3 | Ii | Vi1-3 | ○ |
| | ⋮ | ⋮ | ⋮ | ⋮ |
| | BLKn | Icom1 | - | × |
| ⋮ | ⋮ | ⋮ | ⋮ | ⋮ |

F I G. 5

| Common read voltage identifier | Common read voltage (V1) |
|---|---|
| Icom0 | Vc0 |
| Icom1 | Vc1 |
| ⋮ | ⋮ |

F I G. 6

Before first overall operations

| BLK | Read voltage identifier | Individual read voltage | Common read voltage updating block |
|---|---|---|---|
| BLK0 | Icom0 | – | ○ |
| BLK1 | Icom0 | – | × |
| BLK2 | Ii | Vi0-2 | × |
| BLK3 | Icom0 | – | ○ |
| BLK4 | Icom0 | – | × |

| Common read voltage identifier | Common read voltage |
|---|---|
| Icom0 | Vc0(0) |

F I G. 9

After first overall operations and before second overall operations

| BLK | Read voltage identifier | Individual read voltage | Common read voltage updating block |
|---|---|---|---|
| BLK0 | Ii | Vi0-0 | ○ |
| BLK1 | Icom0 | — | × |
| BLK2 | Ii | Vi0-2 | × |
| BLK3 | Icom0 | — | ○ |
| BLK4 | Icom0 | — | × |

| Common read voltage identifier | Common read voltage |
|---|---|
| Icom0 | Vc0(1) |

F I G. 10

After second overall operations

| BLK | Read voltage identifier | Individual read voltage | Common read voltage updating block |
|---|---|---|---|
| BLK0 | Ii | Vi0-0 | ○ |
| BLK1 | Icom0 | – | × |
| BLK2 | Ii | Vi0-2 | × |
| BLK3 | Ii | Vi0-3 | ○ |
| BLK4 | Icom0 | – | × |

| Common read voltage identifier | Common read voltage |
|---|---|
| Icom0 | Vc0(2) |

F I G. 11

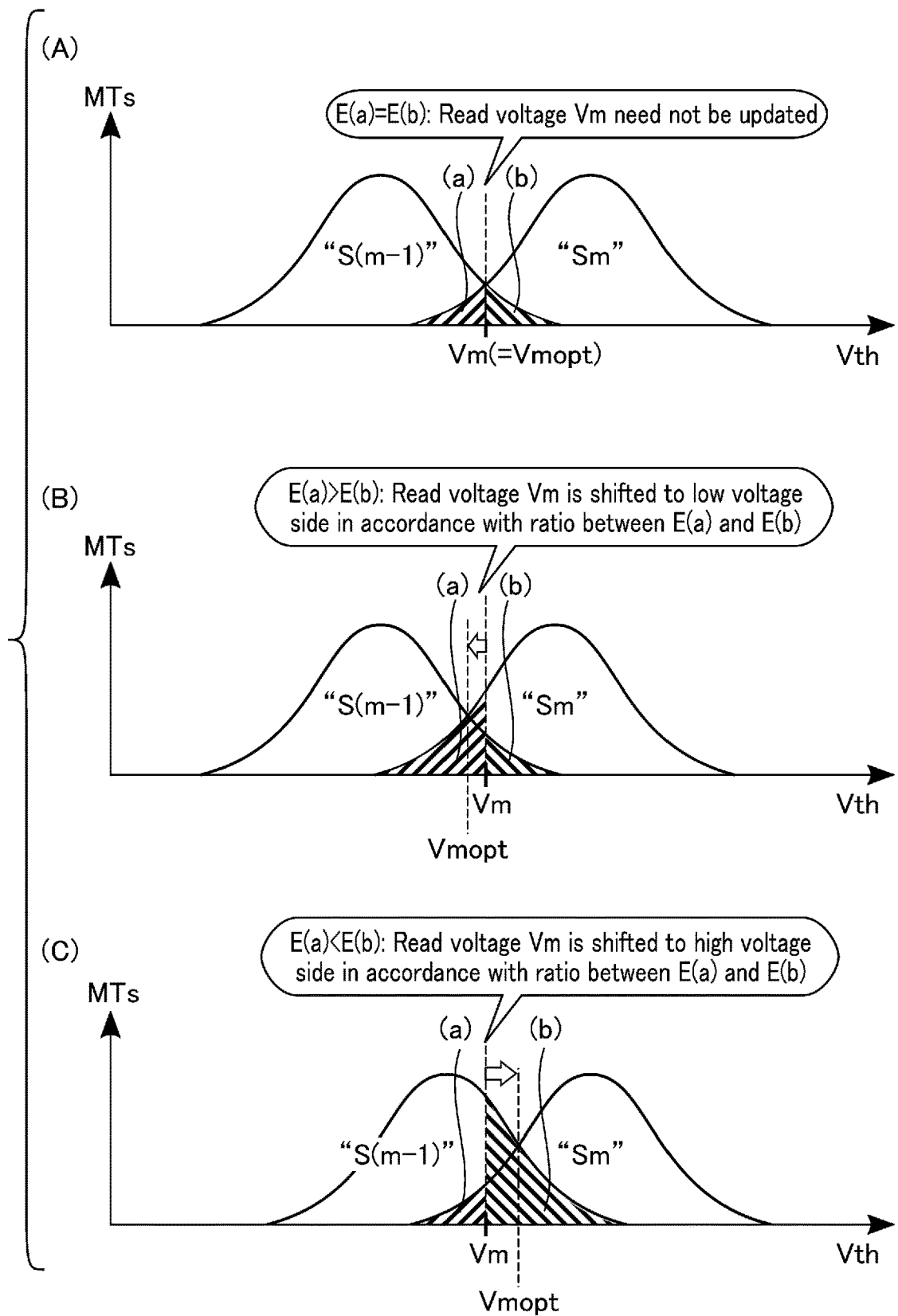
F I G. 13

| Chip | Block | Read voltage identifier | Individual read voltage | Common read voltage updating block | Writing temperature (°C) |
|---|---|---|---|---|---|
| Chip0 | BLK0 | Icom0 | - | ○ | 60 |
| | BLK1 | Icom0 | - | × | 40 |
| | BLK2 | Icom0 | - | × | 85 |
| | BLK3 | Icom0 | - | × | 90 |
| | ⋮ | ⋮ | ⋮ | ⋮ | ⋮ |
| | BLKn | Icom0 | - | × | 40 |
| ⋮ | ⋮ | ⋮ | ⋮ | ⋮ | ⋮ |

F I G. 17

| Chip | Block | Read voltage identifier | Individual read voltage | Common read voltage updating block | Writing temperature (°C) |
|---|---|---|---|---|---|
| Chip0 | BLK0 | Icom0-0 | - | × | 60 |
| | BLK1 | Icom0-0 | - | ○ | 40 |
| | BLK2 | Icom0-1 | - | × | 85 |
| | BLK3 | Icom0-1 | - | × | 90 |
| | ⋮ | ⋮ | ⋮ | ⋮ | ⋮ |
| | BLKn | Icom0-0 | - | × | 40 |
| ⋮ | ⋮ | ⋮ | ⋮ | ⋮ | ⋮ |

F I G. 22

Updating of read voltage information (A) Before first overall operations

| BLK | Read voltage identifier | Individual read voltage | Common read voltage updating block | Condition based on individual read voltage | Common read voltage identifier | Common read voltage |
|---|---|---|---|---|---|---|
| BLK0 | Icom0-0 | — | ○ | — | Icom0-0 | Vc0-0(0) |
| | | | | | Icom0-1 | Vc0-1(0) |

⇨

(B) After first overall operations and before second overall operations

| BLK | Read voltage identifier | Individual read voltage | Common read voltage updating block | Condition based on individual read voltage | Common read voltage identifier | Common read voltage |
|---|---|---|---|---|---|---|
| BLK0 | Ii | Vi0-0(0) | ○ | ○ | Icom0-0 | Vc0-0(1) |
| | | | | | Icom0-1 | Vc0-1(0) |

⇨

(C) After second overall operations

| BLK | Read voltage identifier | Individual read voltage | Common read voltage updating block | Condition based on individual read voltage | Common read voltage identifier | Common read voltage |
|---|---|---|---|---|---|---|
| BLK0 | Ii | Vi0-0(1) | ○ | × | Icom0-0 | Vc0-0(1) |
| | | | | | Icom0-1 | Vc0-1(1) |

F I G. 27

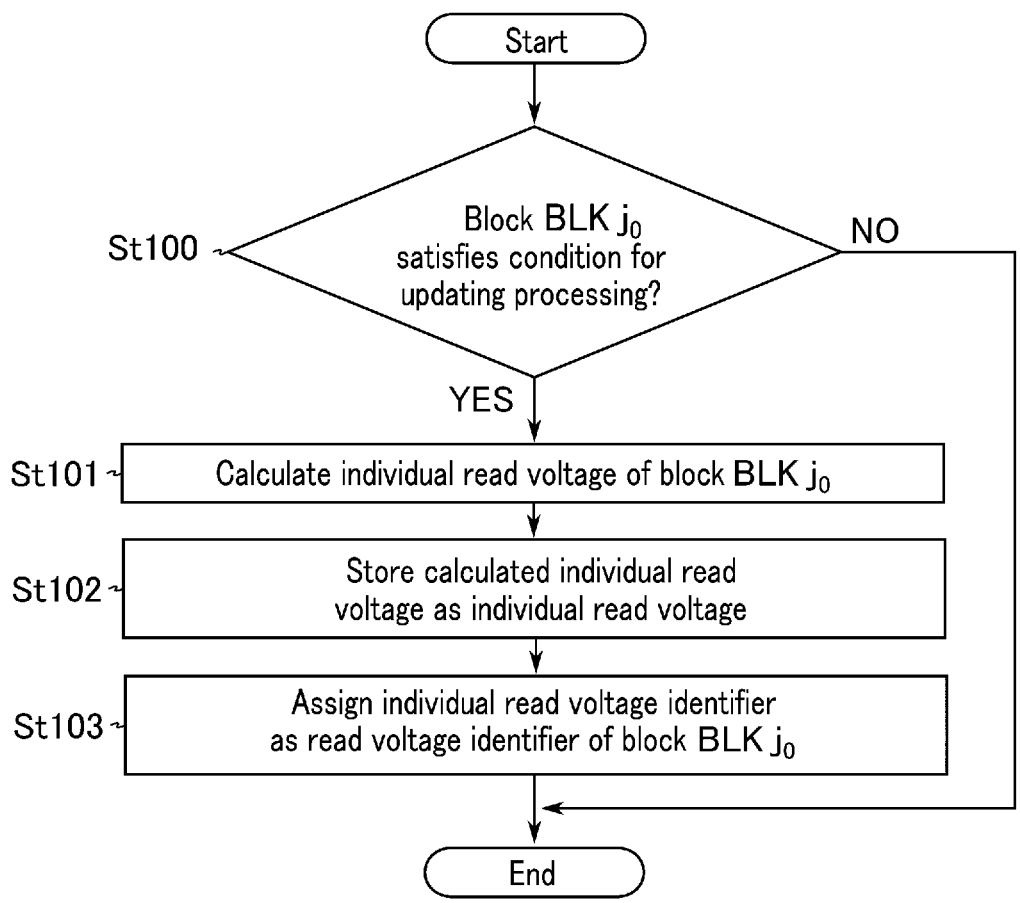
F I G. 30

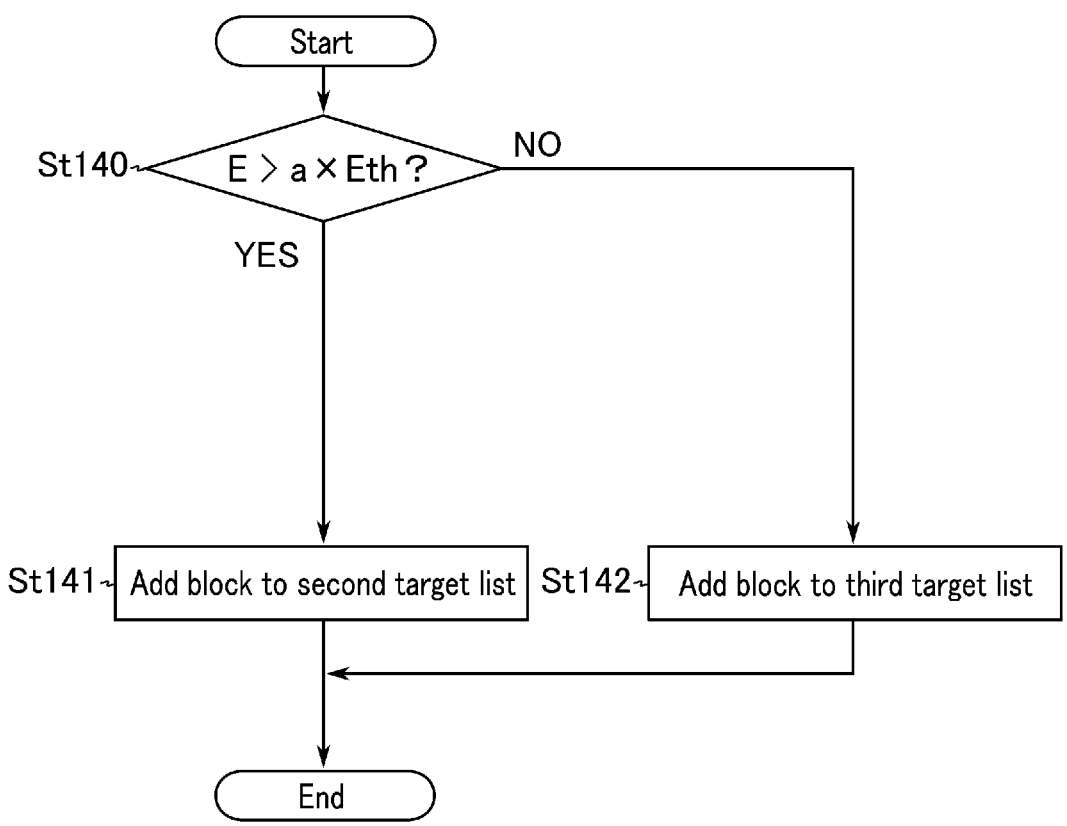
F I G. 33

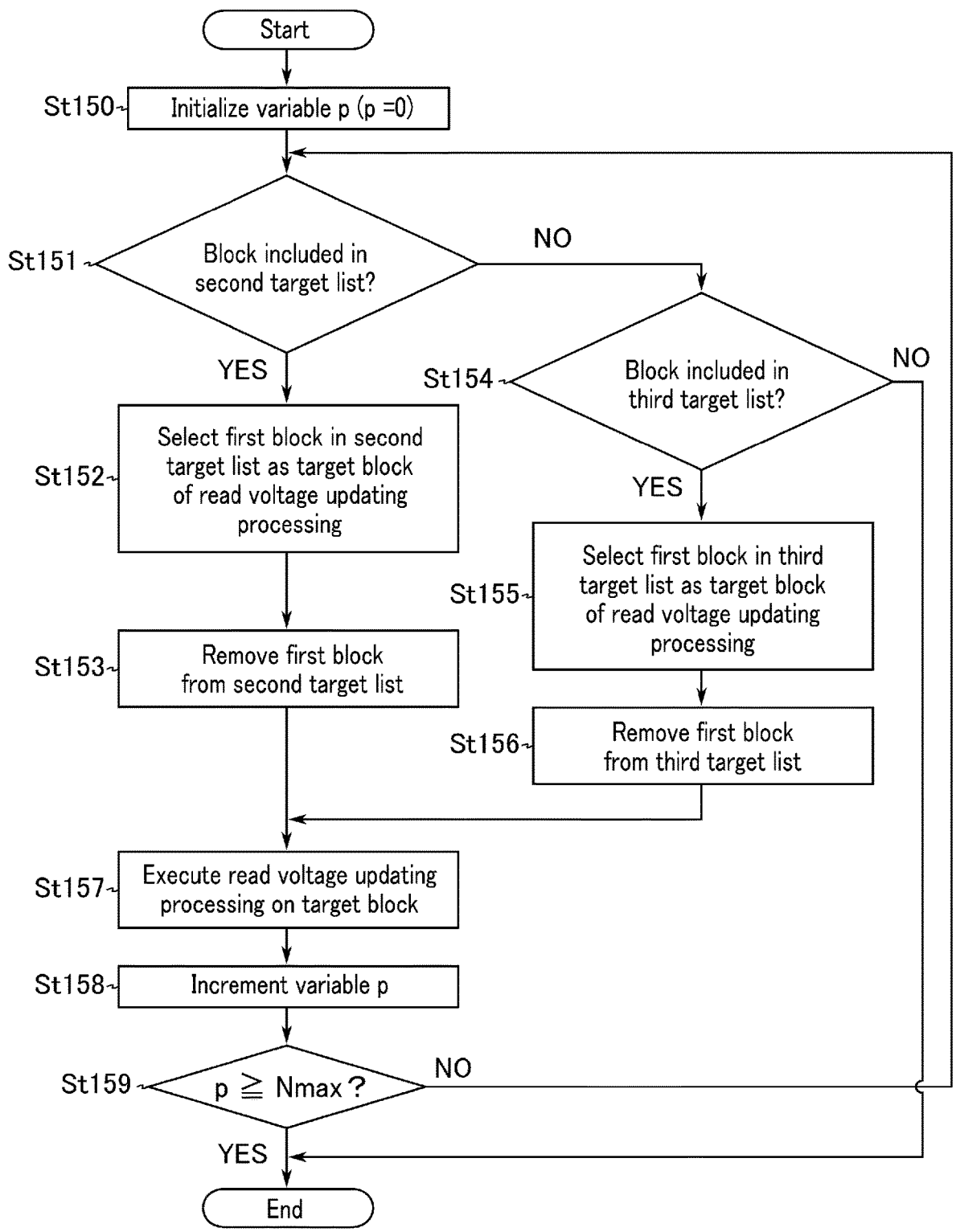
F I G. 34

MEMORY SYSTEM

CROSS-REFERENCE TO RELATED APPLICATION(S)

This application is based upon and claims the benefit of priority from Japanese Patent Application No. 2022-143276, filed Sep. 8, 2022, the entire contents of which are incorporated herein by reference.

FIELD

Embodiments described herein relate generally to a memory system.

BACKGROUND

Memory systems that include a non-volatile memory capable of nonvolatilely storing data, and a memory controller that controls the non-volatile memory have been known.

BRIEF DESCRIPTION OF THE DRAWING(S)

FIG. 3 is a circuit diagram showing a circuit configuration example of a memory cell array of the non-volatile memory according to the first embodiment.

FIG. 4 is a schematic diagram showing an example of a threshold voltage distribution of memory cell transistors in the memory system according to the first embodiment.

FIG. 5 is a diagram showing an example of read voltage information for each block stored by a volatile memory of the memory system according to the first embodiment.

FIG. 6 is a diagram showing an example of common read voltage information stored by the volatile memory of the memory system according to the first embodiment.

FIG. 9 is a diagram for explaining an example of updating of read voltage information in overall operations including write processing of the first operation example of the first embodiment.

FIG. 10 is a diagram for explaining an example of updating of read voltage information in overall operations including write processing of the first operation example of the first embodiment.

FIG. 11 is a diagram for explaining an example of updating of read voltage information in overall operations including write processing of the first operation example of the first embodiment.

FIG. 13 is a schematic diagram for explaining an example of correction amount calculation processing of the first operation example of the first embodiment.

FIG. 17 is a diagram showing an example of read voltage information for each block stored by a volatile memory of a memory system according to a first modification of the first embodiment.

FIG. 22 is a diagram showing an example of read voltage information for each block stored by a volatile memory of a memory system according to a second modification of the first embodiment.

FIG. 27 is a diagram for explaining an example of updating of read voltage information in the second operation example of the second modification of the first embodiment.

FIG. 30 is a flowchart for explaining read voltage updating processing according to the second embodiment.

FIG. 33 is a flowchart showing processing for adding a block to a list of read voltage updating processing in patrol processing using a memory system according to a second modification of the second embodiment.

FIG. 34 is a flowchart for explaining a series of operations including the read voltage updating processing of the memory system according to the second modification of the second embodiment.

DETAILED DESCRIPTION

In general, according to one embodiment, a memory system includes a non-volatile memory including a first sub-memory region, a second sub-memory region, a third sub-memory region, a fourth sub-memory region, and a fifth sub-memory region; and a controller, each of the first sub-memory region, the second sub-memory region, the third sub-memory region, the fourth sub-memory region, and the fifth sub-memory region including a plurality of memory cells, the controller being configured to: calculate a first voltage corresponding to the first sub-memory region in first processing; calculate a second voltage corresponding to the fourth sub-memory region in second processing after the first processing; before the first processing, use a third voltage as a common voltage when reading data from each of the first sub-memory region, the second sub-memory region, the fourth sub-memory region, and the fifth sub-memory region, and use a fourth voltage corresponding to the third sub-memory region when reading data from the third sub-memory region; after the first processing and before the second processing, use the first voltage when reading data from the first sub-memory region, use as the common voltage a fifth voltage calculated by using the first voltage when reading data from each of the second sub-memory region, the fourth sub-memory region, and the fifth sub-memory region, and use the fourth voltage when reading data from the third sub-memory region; and after the second processing, use the first voltage when reading data from the first sub-memory region, use as the common voltage a sixth voltage calculated by using the second voltage when reading data from each of the second sub-memory region and the fifth sub-memory region, use the fourth voltage when reading data from the third sub-memory region, and use the second voltage when reading data from the fourth sub-memory region.

The embodiments will now be described with reference to the drawings. In the description below, structural elements having the same functions and configurations will be denoted by a common reference symbol.

The description will use the same reference symbols for the structural elements having substantially the same functions and configurations. For the purpose of distinguishing between elements having the same or substantially the same configurations, the description may add different characters or numerals after their respective reference symbols.

1 First Embodiment

1.1 Configuration

In the following, a memory system including a non-volatile memory will be described.

1.1.1 Memory System

Figure 1:
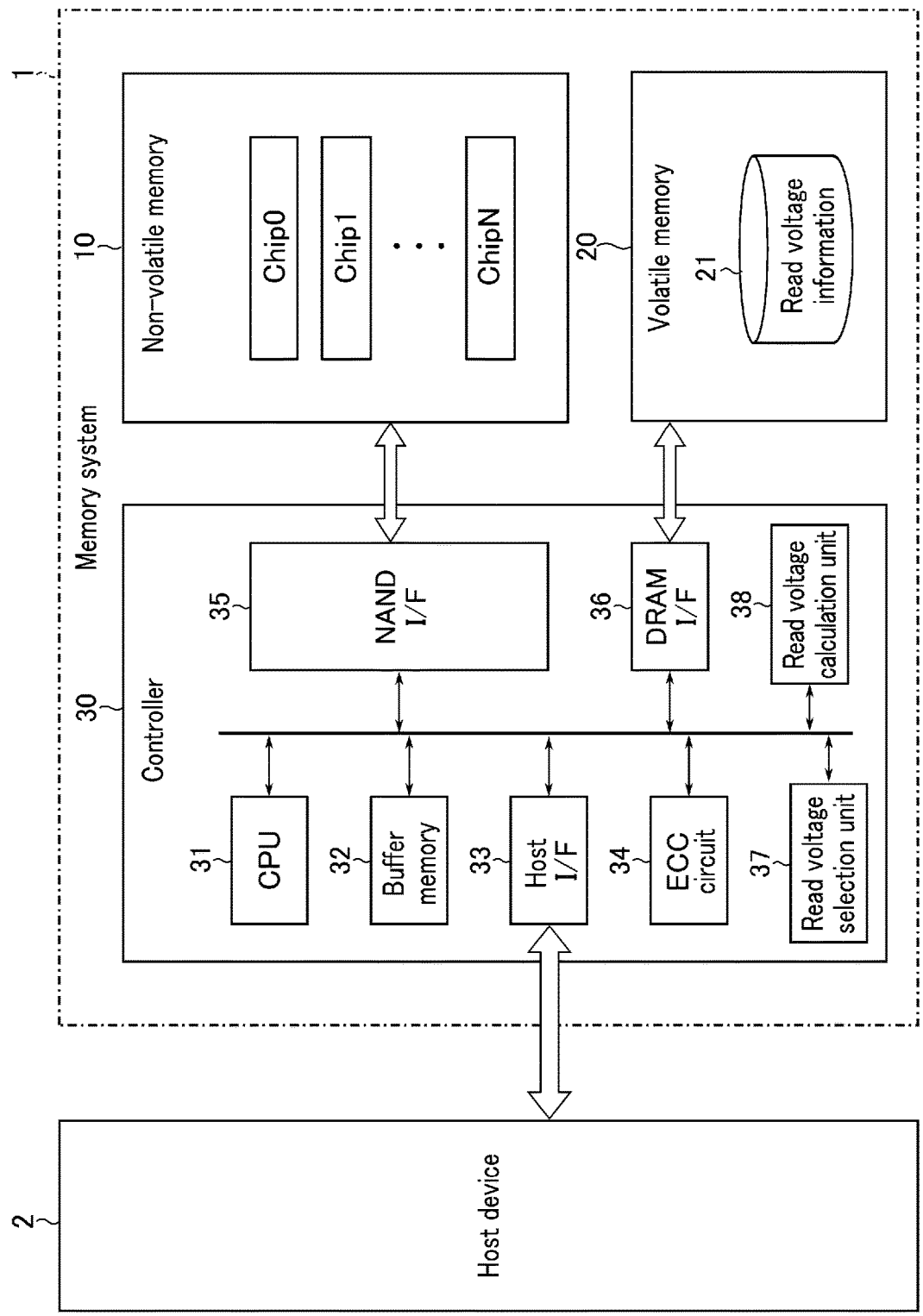
FIG. 1 is a block diagram showing an example of a memory system configuration including a memory system and a host device according to a first embodiment.

First, a configuration including the memory system will be described with reference to FIG. 1. FIG. 1 is a block diagram showing an example of a memory system configuration including the memory system and a host device according to the first embodiment.

A memory system 1 includes a non-volatile memory 10, a volatile memory 20, and a controller 30. For example, the non-volatile memory 10, the volatile memory 20, and the controller 30 may be included in a single semiconductor device. The memory system 1 is, for example, a solid state drive (SSD), an SD™ card, etc. The memory system 1 is coupled to an external host device 2. The memory system 1 stores data supplied from the host device 2. The memory system 1 reads data into the host device 2.

The non-volatile memory 10 is, for example, a semiconductor memory. The semiconductor memory is, for example, a NAND-type flash memory. The non-volatile memory 10 includes chips Chip0 through ChipN. Each of the chips Chip0 through ChipN includes a plurality of memory cells. The non-volatile memory 10 nonvolatilely stores data instructed to be written by the host device 2. Furthermore, the non-volatile memory 10 outputs, to the host device 2 via the controller 30, data read through read processing (host read processing) based on the instruction from the host device 2. In the description below, in the case of not distinguishing the chips Chip0 through ChipN from one another, each of the chips Chip0 through ChipN is simply referred to as the chip.

The volatile memory 20 is, for example, a dynamic random access memory (DRAM). The volatile memory 20 stores firmware to manage the non-volatile memory 10, and various management information. The volatile memory 20 stores, for example, read voltage information 21. The read voltage information 21 is information for executing read processing. The read voltage information 21 includes a read voltage identifier indicating a type of a read voltage for use in executing read processing, and information relating to the read voltage corresponding to the read voltage identifier. Details of the read voltage information 21 will be described later.

The controller 30 is formed of, for example, an integrated circuit such as a system-on-a-chip (SoC). The controller 30 receives instructions from the host device 2. The controller 30 controls the non-volatile memory 10 based on the received instructions. Specifically, based on a write instruction received from the host device 2, the controller 30 writes data, which the host device 2 instructed the controller 30 to write, into the non-volatile memory 10. Furthermore, in host read processing, based on a read instruction received from the host device 2, the controller 30 reads data, which the host device 2 instructed the controller 30 to read, from the non-volatile memory 10 and transmits the read data to the host device 2.

1.1.2 Controller

The controller 30 includes a processor (CPU) 31, a buffer memory 32, a host interface circuit (host I/F) 33, an ECC circuit 34, a NAND interface circuit (NAND I/F) 35, a DRAM interface circuit (DRAM I/F) 36, a read voltage selection unit 37, and a read voltage calculation unit 38. Functions of the respective units in the controller 30 can be realized by dedicated hardware, a processor for executing a program (firmware), and a combination thereof.

The processor 31 executes overall operations of the controller 30 by using a program stored in a read only memory (ROM) in the controller 30. The processor 31 issues, for example, to the non-volatile memory 10, commands for instructing execution of various processing including write processing, read processing, and erase processing.

The buffer memory 32 is, for example, a static random access memory (SRAM). The buffer memory 32 temporarily stores read data read by the controller 30 from the volatile memory 10, and write data received from the host device 2.

The host interface circuit 33 is coupled to the host device 2 via a host bus. The host interface circuit 33 conducts communications between the controller 30 and the host device 2. The host bus is a bus compliant with, for example, an SD™ interface, a serial attached small computer system (SAS) interface (SCSI), a serial advanced technology attachment (ATA) (SATA), or a peripheral component interconnect express (PCIe).

The ECC circuit 34 performs error detection and error correction processing on data stored in the non-volatile memory 10. More specifically, during data writing, the ECC circuit 34 generates an error correction code and assigns the error correction code to write data. The error correction code is, for example, a hard bit decoding code, such as a Bose-Chaudhuri-Hocquenghem (BCH) code or a Reed-Solomon (RS) code, or a soft bit decoding code, such as a Low-Density Parity-Check (LDPC) code. In addition, during data read processing, the ECC circuit 34 decodes the error correction code and detects whether there is an error bit. If an error bit is detected, the ECC circuit 34 specifies a position of the error bit and corrects the error.

The NAND interface circuit 35 is coupled to the non-volatile memory 10 via a NAND bus. The NAND interface circuit 35 performs communications based on NAND interface standards. The NAND interface circuit 35 performs communications with each of the chips Chip0 through ChipN in the non-volatile memory 10 independently. The NAND interface circuit 35 conducts communications with the non-volatile memory 10. The NAND interface circuit 35 transmits data, a command, and an address to the non-volatile memory 10 according to an instruction from the processor 31. The command is a signal for controlling the entire non-volatile memory 10. The data includes read data and write data.

The DRAM interface circuit 36 is coupled to the volatile memory 20. The DRAM interface circuit 36 conducts communications between the controller 30 and the volatile memory 20. The DRAM interface circuit 36 performs communications based on the DRAM interface standards.

The read voltage selection unit 37 extracts a read voltage identifier based on the read voltage information 21. The read voltage selection unit 37 applies a read voltage corresponding to the extracted read voltage identifier as the read voltage.

The read voltage calculation unit 38 assigns the read voltage identifier in the read voltage information 21. The read voltage calculation unit 38 updates the read voltage corresponding to the read voltage identifier. The read voltage calculation unit 38 calculates a read voltage when updating the read voltage.

1.1.3 Chip

Figure 2:
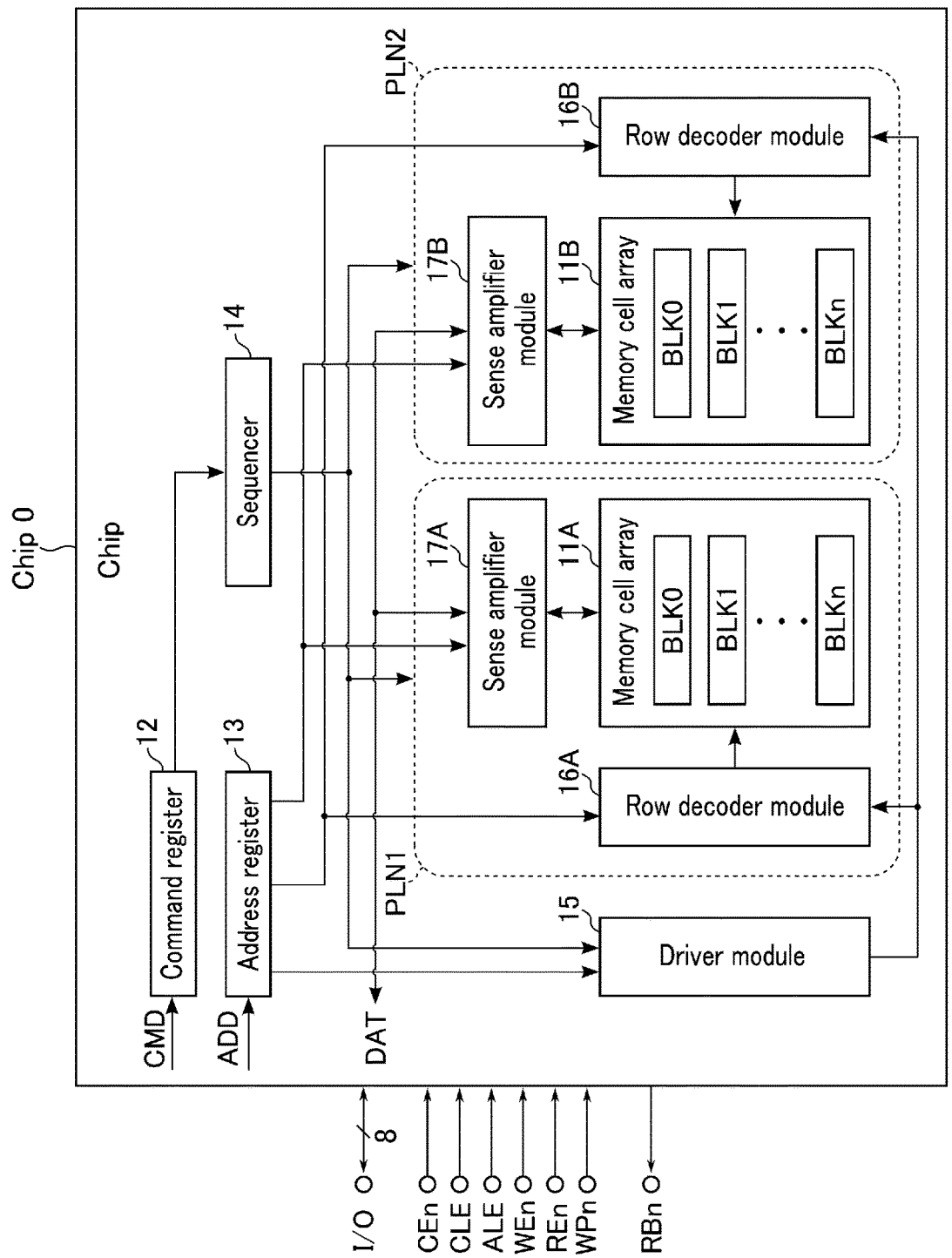
FIG. 2 is a block diagram for explaining an example of a configuration of a non-volatile memory according to the first embodiment.

Next, a configuration of the chips in the non-volatile memory 10 will be described with reference to FIG. 2. FIG. 2 is a block diagram for explaining an example of a configuration of a non-volatile memory according to the first embodiment. FIG. 2 shows an example of a configuration of a chip Chip0. Chips Chip1 through ChipN have the same configurations as that of the chip Chip0.

The chip includes, for example, memory cell arrays 11A and 11B, a command register 12, an address register 13, a sequencer 14, a driver module 15, row decoder modules 16A and 16B, and sense amplifier modules 17A and 17B. In the description below, in the case of not distinguishing between the memory cell arrays 11A and 11B, each of the memory cell arrays 11A and 11B is simply referred to as the memory cell array 11. In the case of not distinguishing between the row decoder modules 16A and 16B, each of the row decoder modules 16A and 16B is simply referred to as the row decoder module 16. In the case of not distinguishing between the sense amplifier modules 17A and 17B, each of the sense amplifier modules 17A and 17B is simply referred to as the sense amplifier module 17.

In the description below, a set of the memory cell array 11A, the row decoder module 16A, and the sense amplifier module 17A is referred to as a plane PLN1. A set of the memory cell array 11B, the row decoder module 16B, and the sense amplifier module 17B is referred to as a plane PLN2. In the example shown in FIG. 2, the chip includes the two planes PLN1 and PLN2, but the embodiment is not limited to this example. Each chip may include one plane PLN or three or more planes PLN.

The memory cell arrays 11A and 11B each store data nonvolatilely. The memory cell arrays 11A and 11B are each provided with a plurality of bit lines and a plurality of word lines. The memory cell arrays 11A and 11B each include blocks BLK0 through BLKn. Each of the blocks BLK0 through BLKn is a set of a plurality of memory cells. Each of the blocks BLK0 through BLKn is used, for example, as a data erase unit. Each memory cell is associated with one bit line and one word line. Details of the memory cell array 11 will be described later. In the description below, in the case of not distinguishing the blocks BLK0 through BLKn from one another, each of the blocks BLK0 through BLKn is simply referred to as the block BLK.

The command register 12 stores a command CMD received by the chip from the controller 30. The command CMD includes, for example, an instruction to instruct the sequencer 14 to execute read processing, write processing, erase processing, or the like.

The address register 13 stores an address ADD received by the chip from the controller 30. The address ADD includes, for example, a block address and a column address. The address register 13 transfers the address ADD to the driver module 15, the row decoder module 16, and the sense amplifier module 17.

The sequencer 14 controls the operation of the entire chip. The sequencer 14 independently controls the plane PLN1 and the plane PLN2. For example, the sequencer 14 executes read processing, write processing, and erase processing for the planes PLN1 and PLN2 based on the command CMD stored in the command register 12.

The driver module 15 generates a voltage necessary for read processing, write processing, and erase processing based on instructions of the sequencer 14. The driver module 15 supplies the generated voltage to the memory cell arrays 11A and 11B, the row decoder modules 16A and 16B, and the sense amplifier modules 17A and 17B.

The row decoder modules 16A and 16B are provided to correspond to the memory cell arrays 11A and 11B, respectively. Based on the block address stored in the address register 13, each row decoder module 16 selects one corresponding block BLK in the memory cell array 11. The voltage generated by the driver module 15 is supplied to the selected block BLK via the row decoder module 16.

The sense amplifier modules 17A and 17B are provided to correspond to the memory cell arrays 11A and 11B, respectively. Each sense amplifier module 17 senses read data read out from a memory cell to a bit line in read processing. Each sense amplifier module 17 transfers the sensed read data to the controller 30. Each sense amplifier module 17 transfers write data written via a bit line in write processing. Furthermore, each sense amplifier module 17 receives a column address from the address register 13. Each sense amplifier module 17 outputs data of the column based on the received column address.

Communications between the non-volatile memory 10 and the controller 30 are performed based on, for example, the NAND interface standards. Various signals based on the NAND interface standards include, for example, signals I/O, CEn, CLE, ALE, WEn, REn, WPn, and RBn.

The signal I/O is, for example, an 8-bit signal. The signal I/O is transmitted and received between the controller 30 and the non-volatile memory 10. The signal I/O includes the address ADD, the command CMD, and data DAT.

The signal CEn is a chip enable signal. The signal CEn is a signal to enable the non-volatile memory 10. The signal CLE is a command latch enable signal. The signal CLE notifies the non-volatile memory 10 that the signal I/O transmitted to the non-volatile memory 10 while the signal CLE is at an "H (high)" level is a command. The signal ALE is an address latch enable signal. The signal ALE notifies the non-volatile memory 10 that the signal I/O transmitted to the non-volatile memory 10 while the signal ALE is at an "H" level is an address. The signal WEn is a write enable signal. The signal WEn instructs the non-volatile memory 10 to fetch the signal I/O. The signal REn is a read enable signal. The signal REn instructs the non-volatile memory 10 to output the signal I/O. The signal RBn is a ready busy signal. The signal RBn is indicative of whether the non-volatile memory 10 is in a ready state or a busy state. The ready state is a state in which an instruction from an external device is acceptable. The busy state is a state in which an instruction from an external device is not acceptable.

1.1.4 Memory Cell Array

Next, a configuration of the memory cell array 11 provided in the non-volatile memory 10 according to the first embodiment will be described with reference to FIG. 3. FIG. 3 is a circuit diagram showing a circuit configuration example of a memory cell array of the non-volatile memory according to the first embodiment. FIG. 3 shows an example of a circuit diagram of one block BLK in the memory cell array 11.

The block BLK includes, for example, four string units SU0 through SU3. In FIG. 3, the configurations of the string units SU2 and SU3 are shown as a simplified diagram. In the description below, in the case of not distinguishing the string units SU0 through SU3 from one another, each of the string units SU0 through SU3 is simply referred to as the string unit SU.

Each string unit SU includes a plurality of NAND strings NS.

Each NAND string NS includes, for example, 16 memory cell transistors MT (MT0 through MT15), and select transistor ST1 and ST2. The number of memory cell transistors MT in each NAND string NS is not limited. Each memory cell transistor MT includes a stacked gate including a control gate and a charge storage layer. In each NAND string NS, the memory cell transistors MT are coupled in series between the select transistors ST1 and ST2.

The gates of the select transistors ST1 of the string units SU0 through SU3 in each block BLK are coupled to select gate lines SGD0 through SGD3, respectively. In the description below, in the case of not distinguishing the select gate lines SGD0 through SGD3 from one another, each of the gate lines SGD0 through SGD3 is simply referred to as the gate line SGD. The gates of the select transistors ST2 of all string units SU in each block BLK are coupled in common to the select gate line SGS. The control gates of the memory cell transistors MT0 through MT15 in the same block BLK are respectively coupled to word lines WL0 through WL15. Thus, the word line WL of the same address is coupled in common to all string units SU in the same block BLK, and the select gate line SGS is coupled in common to all string units SU in the same block BLK. On the other hand, the select gate line SGD is coupled to only one of the string units SU in the same block BLK.

In the memory cell array 11 where the NAND strings NS are arranged in a matrix pattern, the select transistors ST1 in the NAND strings NS, arranged along the same column, have their other ends (ends different from the gates) coupled to one of M bit lines BL (BL0 through BL(M−1). M is a natural number of 2 or more. The bit line BL is coupled in common to the NAND strings NS of the same column in a plurality of blocks BLK.

The select transistors ST2 have their other ends (ends different from the gates) coupled to a source line SL. The source line SL is coupled in common to the NAND strings NS in the blocks BLK.

As described above, data erasure is, for example, performed collectively for the memory cell transistors MT in the same block BLK. In contrast, data read processing or data write processing can be performed collectively for a plurality of memory cell transistors MT which are coupled in common to a given word line WL of a given string unit SU of a given block BLK. The set of the memory cell transistors MT as described above, which are coupled in common to a word line WL in one string unit SU, is called, for example, a cell unit CU. In other words, the cell unit CU is a set of memory cell transistors MT on which the write processing or read processing are performed collectively. In one example, the storage capacity of the cell unit CU, including the memory cell transistors MT each adapted to store 1-bit data, is defined as "1-page data". The 1-page data is used as, for example, a data read unit. The cell unit CU may have a storage capacity of two or more pages in accordance with the number of bits of data stored in the memory cell transistors MT.

1.1.5. Data Allocation

Data allocation in the memory system 1 according to the first embodiment will be described with reference to FIG. 4. FIG. 4 is a schematic diagram showing an example of a threshold voltage distribution of memory cell transistors in the memory system according to the first embodiment. In the threshold voltage distribution shown in FIG. 4, the vertical axis represents the number of memory cell transistors MT, and the horizontal axis represents the threshold voltage of the memory cell transistors MT. In FIG. 4 and the subsequent figures, the number of memory cell transistors MT and the threshold of the memory cell transistors MT may be respectively represented as NMTs and Vth.

As shown in FIG. 4, the memory system 1 according to the first embodiment includes eight states of threshold distribution depending on the threshold voltages of the memory cell transistors MT included in one cell unit CU, for example.

In the following, the eight states are referred to as a state "S0", a state "Si", a state "S2", a state "S3", a state "S4", a state "S5", a state "S6", and a state "S7" in ascending order of the threshold voltage.

To distinguish the eight states "S0" through "S7", seven read voltages V1, V2, V3, V4, V5, V6, and V7 are used.

Further, to turn on all memory cell transistors MT regardless of data to be stored, a voltage VREAD is used. The read voltages V1 through V7 and the voltage VREAD are applied to the gates of the memory cell transistors MT. The read voltages V1 through V7 and the voltage VREAD have a relationship: V1<V2<V3<V4<V5<V6<V7<VREAD.

The threshold voltage of the memory cell transistors MT included in the state "S0" is lower than the read voltage V1. The threshold voltage of the memory cell transistors MT included in the state "S1" is equal to or higher than the read voltage V1 and lower than the read voltage V2. The threshold voltage of the memory cell transistors MT included in the state "S2" is equal to or higher than the read voltage V2 and lower than the read voltage V3. The threshold voltage of the memory cell transistors MT included in the state "S3" is equal to or higher than the read voltage V3 and lower than the read voltage V4. The threshold voltage of the memory cell transistors MT included in the state "S4" is equal to or higher than the read voltage V4 and lower than the read voltage V5. The threshold voltage of the memory cell transistors MT included in the state "S5" is equal to or higher than the read voltage V5 and lower than the read voltage V6. The threshold voltage of the memory cell transistors MT included in the state "S6" is equal to or higher than the read voltage V6 and lower than the read voltage V7. The threshold voltage of the memory cell transistors MT included in the state "S7" is equal to or higher than the read voltage V7 and lower than the read voltage VREAD.

In response to the read voltage V1 being applied to the gates, the memory cell transistors MT that belong to the state "S0" are turned on, whereas the memory cell transistors MT that belong to the states "S1" through "S7" are turned off. In response to the read voltage V2 being applied to the gates, the memory cell transistors MT that belong to the states "S0" and "S1" are turned on, whereas the memory cell transistors MT that belong to the states "S2" through "S7" are turned off. In response to the read voltage V3 being applied to the gates, the memory cell transistors MT that belong to the states "S0" through "S2" are turned on, whereas the memory cell transistors MT that belong to the states "S3" through "S7" are turned off. In response to the read voltage V4 being applied to the gates, the memory cell transistors MT that belong to the states "S0" through "S3" are turned on, whereas the memory cell transistors MT that belong to the states "S4" through "S7" are turned off. In response to the read voltage V5 being applied to the gates, the memory cell transistors MT that belong to the states "S0" through "S4" are turned on, whereas the memory cell transistors MT that belong to the states "S5" through "S7" are turned off. In response to the read voltage V6 being applied to the gates, the memory cell transistors MT that belong to the states "S0" through "S5" are turned on, whereas the memory cell transistors MT that belong to the states "S6" and "S7" are turned off. In response to the read voltage V7 being applied to the gates, the memory cell transistors MT that belong to the states "S0" through "S6" are turned on, whereas the memory cell transistors MT that belong to the state "S7" are turned off. In response to the read voltage VREAD being applied to the gates, the memory cell transistors MT that belong to all of the states "S0" through "S7" are turned on.

Different three-bit data items are allocated to the respective eight states described above. The following is an example of how data allocation is performed for the eight states:

state "S0": "1, 1, 1 (upper bit, middle bit, lower bit)" data
state "S1": "1, 1, 0" data
state "S2": "1, 0, 0" data
state "S3": "0, 0, 0" data
state "S4": "0, 1, 0" data
state "S5": "0, 1, 1" data
state "S6": "0, 0, 1" data
state "S7": "1, 0, 1" data.

If data are allocated in this manner, one-page data (lower-page data) corresponding to lower bits is confirmed by read processing using the read voltages V1 and V5. One-page data corresponding to the middle bit (middle-page data) is confirmed by read processing using the read voltages V2, V4, and V6. One-page data corresponding to the upper bit (upper-page data) is confirmed by read processing using the read voltages V3 and V7. Thus, the lower-page data, the middle-page data, and the upper-page data are confirmed by read processing using the read voltages of two types, three types, and two types, respectively.

1.1.6 Read Voltage Information

Next, the read voltage information 21 stored in the volatile memory 20 according to the first embodiment will be described.

Immediately after write processing, the states "S0" through "S7" are separated from one another in the threshold voltage distribution, for example, as shown in FIG. 4. Therefore, the controller 30 can read correct data by using preset read voltages as the read voltage. The preset read voltages are default values of the read voltages V1 through V7, respectively, immediately after data is written.

However, the threshold voltages of the memory cell transistors MT change due to factors such as disturbance. Therefore, an optimum read voltage may deviate from the preset read voltage as time passes after the write processing.

The variation tendencies of the threshold voltages of the memory cell transistors MT may differ depending on the physical location in the non-volatile memory 10. For example, the amount of deviation of the optimum read voltage from the preset read voltage may differ from one chip to another. Therefore, for example, the memory system 1 is configured to use a common read voltage in the chip as the read voltage at which correct data can be read from each block BLK of the chip, based on the variation tendency common to a plurality of blocks BLK in each chip.

Furthermore, the variation tendencies of the threshold voltages of the memory cell transistors MT may differ even in the same chip, depending on a physical location of the block BLK, the number of cycles of repeated write processing and erase processing, etc. Accordingly, some block BLK may be different from the other blocks BLK in the same chip in the typical amount of deviation of the optimum read voltage from the preset read voltage. For this reason, the memory system 1 is configured to use an individual read voltage for each block BLK in each chip as an optimum read voltage individually calculated. The individual read voltage is used for a block BLK that is, for example, different from the other blocks BLK in the typical amount of deviation of the optimum read voltage from the preset read voltage.

In read processing, it is preferable that the common read voltage or the individual read voltage be selectively applied suitably. The memory system 1 manages information on the read voltage to be applied to each block BLK as the read voltage information 21.

The read voltage information 21 includes, for example, a read voltage identifier in addition to the common read voltage and the individual read voltage. The read voltage identifier is information to identify which of the common read voltage or the individual read voltage is applied to the block BLK. The read voltage identifier includes a common read voltage identifier and an individual read voltage identifier corresponding to each chip.

As described above, the optimum read voltage may deviate from the common read voltage and the individual read voltage as time passes. Therefore, the memory system 1 is configured so that the common read voltage and the individual read voltage can be updated. In a case of updating the common read voltage, the memory system 1 uses at least one particular block BLK which is, for example, included in each chip. In the description below, the particular block BLK is referred to as the common read voltage updating block.

The read voltage information 21 further includes information on whether the block is the common read voltage updating block. Of the information included in the read voltage information 21, the read voltage identifier, the individual read voltage, and information on whether the block is the common read voltage updating block are managed as "read voltage information for each block". Of the information included in the read voltage information 21, the information indicating the relationship between the common read voltage identifier and the common read voltage is managed as "common read voltage information".

In the following, a specific example of the read voltage information 21 will be described with reference to FIGS. 5 and 6. FIG. 5 is a diagram showing an example of read voltage information for each block stored by a volatile memory of the memory system according to the first embodiment. FIG. 6 is a diagram showing an example of common read voltage information stored by the volatile memory of the memory system according to the first embodiment.

As shown in FIG. 5, the read voltage information for each block includes a read voltage identifier, an individual read voltage, and information on whether the block is a common read voltage updating block.

The read voltage identifiers include common read voltage identifiers Icom0 through IcomN, and an individual read voltage identifier Ii. One read voltage identifier of either the common read voltage identifiers Icom0 through IcomN or the individual read voltage identifier Ii is assigned to each block BLK on which read processing has been executed. No read voltage identifier is assigned to a block BLK on which no read processing has been executed. In FIG. 5, a sign "-" indicates a block BLK to which a read voltage identifier has not been assigned.

The common read voltage identifiers Icom0 through IcomN are respectively associated with the chips Chip0 through ChipN. For example, the common read voltage identifier Icom0 is assigned to blocks BLK to which the common read voltage is applied, among all blocks BLK included in the chip Chip0. In the example shown in FIG. 5, the common read voltage identifier Icom0 is assigned to the blocks BLK0, BLK1, . . . and BLKn of the chip Chip0. The common read voltage identifier Icom1 is assigned to blocks BLK to which the common read voltage is applied among all blocks BLK included in the chip Chip1. In the example shown in FIG. 5, the common read voltage identifier Icom1 is assigned to the blocks BLK0 through BLK2, . . . and BLKn of the chip Chip1. Similarly to the case of the common read voltage identifiers Icom0 and Icom1, the common read voltage identifiers Icom2 through IcomN are assigned to blocks BLK to which the common read voltage is applied among all blocks BLK included in each of the chips Chip2 through ChipN, although not shown.

The individual read voltage identifier Ii is assigned to blocks BLK to which the individual read voltage is applied regardless of the chips. In the example shown in FIG. 5, the individual read voltage identifier Ii is assigned to the block BLK2 of the chip Chip0, the block BLK3 of the chip Chip1, etc.

The read voltage information of each block stores an individual read voltage as a read voltage unique to the block BLK to which the individual read voltage identifier Ii is assigned. For example, in the example shown in FIG. 5, the read voltage information of each block stores an individual read voltage Vi0-2 as the read voltage V1 of the block BLK2 of the chip Chip0 to which the individual read voltage identifier Ii is assigned. The read voltage information of each block stores an individual read voltage Vi1-3 as the read voltage V1 of the block BLK3 of the chip Chip1 to which the individual read voltage identifier Ii is assigned. Similarly to the case of the read voltage V1, the read voltage information of each block stores an individual read voltage as the read voltages V2 through V7 of the block BLK to which the individual read voltage identifier Ii is assigned, although not shown. The blocks BLK for which an individual read voltage has not been calculated is considered to be in an unset state. In FIG. 5, the sign "-" indicates the blocks BLK for which an individual read voltage has not been calculated.

Furthermore, the read voltage information of each block includes information on whether the block BLK is a common read voltage updating block. In FIG. 5, a sign "0" is shown for a block BLK which is a common read voltage updating block, and a sign "x" is shown for a block BLK which is not a common read voltage updating block. For example, in the example shown in FIG. 5, the common read voltage updating blocks are the blocks BLK0 and BLK3 of the chip Chip0, the blocks BLK0 and BLK3 of the chip Chip1, etc. The memory system 1 updates the common read voltage corresponding to the chip Chip0 based on, for example, the threshold voltage distribution of the block BLK0 of the chip Chip0 or the threshold voltage distribution of the block BLK3 of the chip Chip0. The memory system 1 also updates the common read voltage corresponding to the chip Chip1 based on, for example, the threshold voltage distribution of the block BLK0 of the chip Chip1 or the threshold voltage distribution of the block BLK3 of the chip Chip1. Updating of the common read voltage will be described later.

FIG. 5 shows a case where each chip has two common read voltage updating blocks, but the embodiment is not limited to this case. In each chip, the read voltage information of each block may store, for example, a predetermined number of blocks BLK as common read voltage updating blocks. More specifically, the read voltage information of each block may store, for example, the blocks BLK0, BLK100, BLK200, . . . in each chip as common read voltage updating blocks.

The common read voltage updating blocks may not be fixed. For example, the common read voltage updating blocks may be changed based on the number of times of executing the write processing in the corresponding chip. More specifically, the read voltage information of each block may store, for example, the blocks on which the 100th, 200th, . . . write processing is executed, as common read voltage updating blocks. Alternatively, for example, the common read voltage updating blocks may be changed based on the time that has passed since the common read voltage was updated in the corresponding chip. More specifically, the read voltage information of each block may store the block BLK on which first write processing is executed each time a period of, for example, one day, one month, etc. has passed, as common read voltage updating blocks.

FIG. 5 shows a case where some of the blocks BLK in each chip are common read voltage updating blocks, but the embodiment is not limited to this case. For example, all of the blocks BLK in each chip may be common read voltage updating blocks. In this case, the read voltage information 21 may not include information on whether each block is a common read voltage updating block in each chip.

Next, common read voltage information will be described.

The read voltages of the blocks BLK to which the same common read voltage identifier is assigned are the same with respect to each of the read voltages V1 through V7. For example, a common read voltage Vc0 is applied as the read voltage V1 of the blocks BLK0, BLK1, . . . BLKn to which the common read voltage identifier Icom0 is assigned in the chip Chip0. A common read voltage Vc1 is applied as the read voltage V1 of the blocks BLK0 through BLK2, . . . BLKn to which the common read voltage identifier Icom1 is assigned in the chip Chip1.

Although not shown, the common read voltage is similarly applied with respect to the other read voltages, namely, the read voltages V2 through V7.

FIGS. 5 and 6 and the above explanations concern a case where the volatile memory 20 stores the common read voltages and the individual read voltages, but the embodiment is not limited to this case. The volatile memory 20 may be configured to, for example, store a difference between a common read voltage and a preset read voltage, or a difference between an individual read voltage and a preset read voltage.

1.2 Operations

An operation of the memory system 1 according to the first embodiment will be described.

1.2.1 First Operation Example

In the first operation example described below, write processing is executed on a common read voltage updating block while the common read voltage is being updated, and an individual read voltage is stored as a read voltage for the common read voltage updating block.

1.2.1.1 Overall Operations

Overall operations in the first operation example, including the write processing, will be described.

The overall operations in the first operation example, including the write processing, include first processing and second processing. The first processing includes write processing on a write target block BLK and processing of applying a common read voltage as a read voltage in the block BLK. The second processing is executed in a case where, for example, the write target block BLK is a common read voltage updating block and a second processing start condition is satisfied. The second processing start condition includes that a preset time has passed since the write processing (hereinafter referred to as the time condition). The second processing includes calculation processing of an individual read voltage for the write target block BLK, and processing of updating the common read voltage based on the result of the calculation processing. The second processing may be executed when a preset time has passed since the processing of updating the common read voltage. The preset time is, for example, 30 minutes or longer and 36 hours or shorter. In this case, the second processing may be periodically executed a plurality of times for the common read voltage updating block which is a write target block.

The second processing start condition may include, for example, that the controller 30 detects that the temperature of the non-volatile memory 10 satisfies a predetermined temperature condition (hereinafter referred to as the temperature condition). A temperature condition is, for example, that the non-volatile memory 10 has a predetermined temperature or higher. Another temperature condition is, for example, that the non-volatile memory 10 has a predetermined temperature or lower. Still another temperature condition is, for example, that the non-volatile memory 10 has a temperature that is higher by a temperature difference from the temperature of the non-volatile memory 10 when write processing was executed on the common read voltage updating block in the first processing.

The second processing start condition may include, for example, that the controller 30 detects that the number of fail bits when write processing was executed for the block BLK on which the write processing was executed in the first processing is equal to or more than a predetermined value (hereinafter referred to as the number-of-fail-bits condition). The predetermined value is, for example, 40% or more of a maximum number of fail bits for which error correction processing can be executed for each block BLK.

The second processing start condition may include, for example, at least one of the time condition, the temperature condition, and the number-of-fail-bits condition described above.

Figure 7:
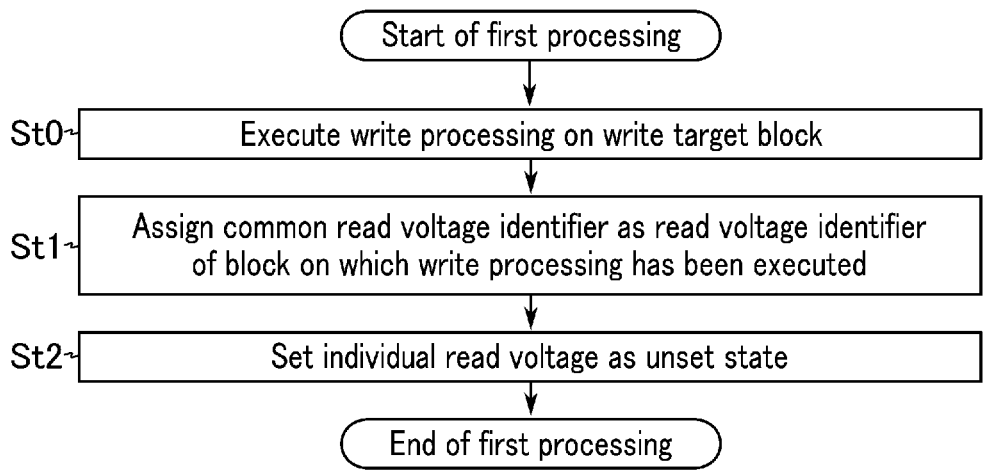
FIG. 7 is a flowchart for explaining first processing of a first operation example of the first embodiment.
Figure 8:
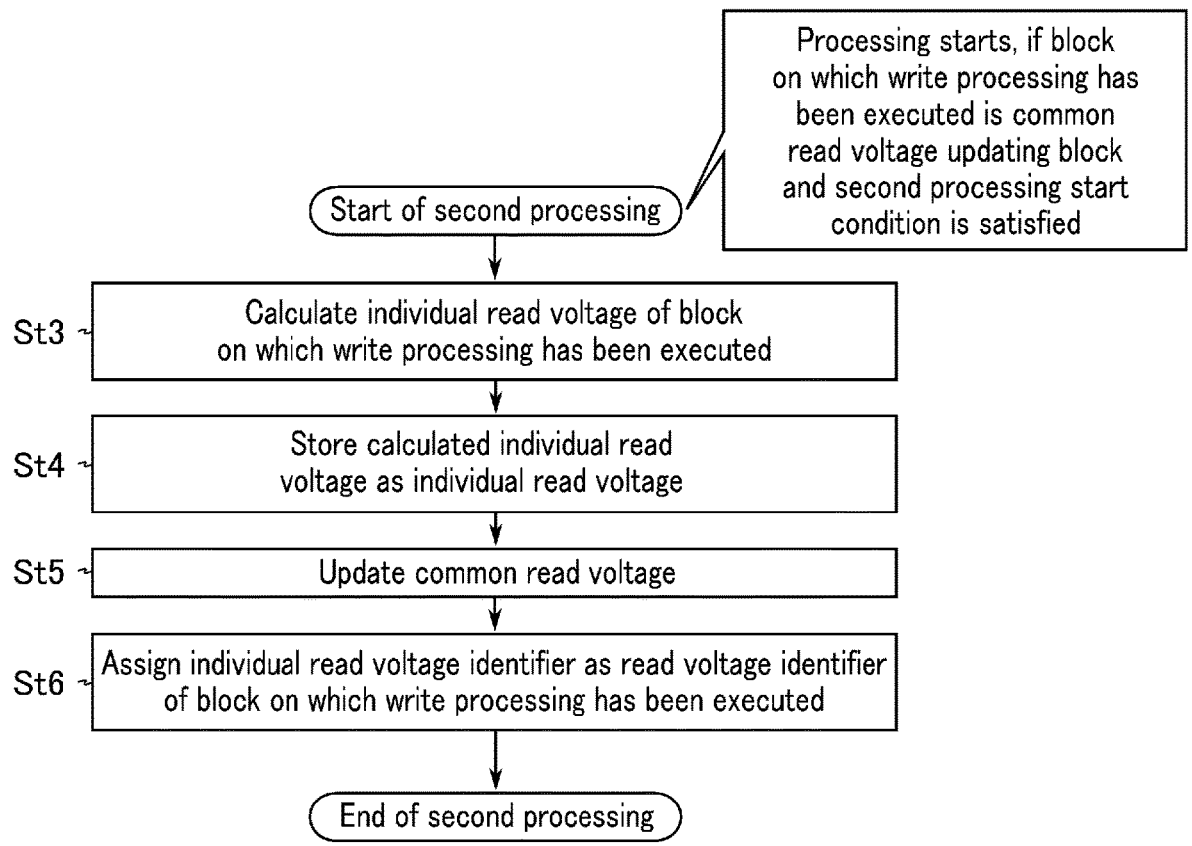
FIG. 8 is a flowchart for explaining second processing of the first operation example of the first embodiment.

Overall operations in the first operation example, including the write processing, will be described below with reference to FIGS. 7 and 8. FIG. 7 is a flowchart for explaining the first processing of the first operation example of the first embodiment. FIG. 8 is a flowchart for explaining the second processing of the first operation example of the first embodiment.

First, operations in the first processing will be described with reference to FIG. 7.

Upon receipt of a write order from the host device 2 (Start of first processing), the controller 30 causes the non-volatile memory 10 to execute write processing on a write target block BLK (St0).

Upon completion of the write processing, the read voltage calculation unit 38 assigns a common read voltage identifier corresponding to the block BLK, on which the write processing has been executed, as a read voltage identifier of the block BLK (St1). Thus, the read voltage of the block BLK is set as the common read voltage.

The read voltage calculation unit 38 determines the individual read voltage corresponding to the block BLK on which the write processing has been executed, as the unset state in the read voltage information 21 (St2). If the individual read voltage corresponding to the block BLK on which the processing of St2 is being executed, the controller 30 maintains the individual read voltage corresponding to the block BLK as the unset state.

Thus, the first processing ends (End of first processing).

Next, operations in the second processing will be described with reference to FIG. 8.

If the block BLK on which the write processing has been executed is a common read voltage updating block (Start of second processing), the read voltage calculation unit 38 calculates an individual read voltage corresponding to the block BLK when a predetermined time has passed since the execution of the write processing on the block BLK (St3). In the processing of calculating the individual read voltage, the individual read voltage relating to each of the read voltages V1 through V7 between the adjacent two of the states "S1" through "S7" is calculated for blocks BLK on which the write processing has been executed. The calculation of the individual read voltage will be described later. The volatile memory 20 stores series data of individual read voltages corresponding to the number of times of execution of the processing of St3 for each common read voltage identifier, for example, based on instructions of the controller 30. If the block BLK on which the write processing has been executed is not a common read voltage updating block, the second processing is not executed.

After the processing of St3, the read voltage calculation unit 38 stores the individual read voltage calculated by the processing of St3 in an area for storing the individual read voltage of the block BLK of the read voltage information 21 (St4). Then, the processing proceeds to St5.

Using the individual read voltage of the block BLK, the read voltage calculation unit 38 updates the common read voltage corresponding to the common read voltage identifier assigned to the block BLK on which the write processing has been executed (St5). Thus, the updated common read voltage is applied as read voltages of all blocks BLK to which the common read voltage identifier is assigned. The updated common read voltage is an average value or a central value of the individual read voltages calculated by using, for example, all individual read voltages of the series data. The updated common read voltage may be an average value or a central value of individual read voltages calculated by using, for example, a predetermined number of the latest individual read voltages of the series data, instead of an average value or a central value of the individual read voltages calculated by using all individual read voltages included in the series data. Then, the processing proceeds to St6.

The read voltage calculation unit 38 assigns the individual read voltage identifier Ii as the read voltage identifier of the block BLK on which the write processing has been executed (St6).

Through the processing described above, the operations of the second processing end (End of second processing).

As described above, in the first operation example, if the block BLK on which the write processing has been executed is the common read voltage updating block, the read voltage calculation unit 38 stores the individual read voltage calculated in the processing of St3 as the individual read voltage of the write target block BLK in the second processing. The read voltage calculation unit 38 assigns the individual read voltage identifier as the read voltage identifier of the write target block BLK. Furthermore, the read voltage calculation unit 38 updates the common read voltage using the individual read voltage of the write target block BLK.

In the first operation example, the orders of the processing in the first processing and the second processing may be changed. For example, in the first processing, the processing of St1 and the processing of St2 may be exchanged. In the second processing, the processing of St5 and the processing of St6 may be exchanged.

1.2.1.2 Updating of Read Voltage Information

Updating of the read voltage information 21 in the overall operations including the write processing of the first operation example will be described in more detail with reference to FIGS. 9 through 11. FIGS. 9 through 11 are diagrams for explaining an example of updating of read voltage information in the overall operations including the write processing of the first operation example of the first embodiment. FIGS. 9 through 11 show the read voltage identifiers, the individual read voltages, and information on whether the block is a common read voltage updating block for the blocks BLK0 through BLK4 of the chip Chip0, and common read voltages corresponding to the common read voltage identifier Icom0. In the operation example described below, the blocks BLK0 through BLK4 of the chip Chip0 are also referred to simply as the blocks BLK0 through BLK4.

In the following, an example will be described which relates to updating of the read voltage information 21 after the first overall operations including the write processing for the block BLK0 are executed and when the second overall operations including the write processing for the block BLK3 are executed. In the first operation example, the blocks BLK0 and BLK3 are common read voltage updating blocks. Accordingly, the first processing as well as the second processing are executed on the block BLK0. In addition, the first processing as well as the second processing are executed on the block BLK3.

FIG. 9 shows the read voltage information 21 before the first processing in the first overall operations is executed. FIG. 10 shows the read voltage information 21 before second overall operations are executed after the second processing has been executed after the first overall operations. FIG. 11 shows the read voltage information 21 after the second overall operations have been executed.

As shown in FIG. 9, before the first overall operations are executed, the read voltage identifiers of the blocks BLK0, BLK1, BLK 3, and BLK4, respectively, are the common read voltage identifier Icom0. The read voltage identifier of the block BLK2 is the individual read voltage identifier Ii. The common read voltage corresponding to the common read voltage identifier Icom0 is a voltage Vc0(0). In the first operation example, the voltage Vc0(0) is, for example, a preset read voltage. A read voltage Vi0-2 is stored as the individual read voltage of the block BLK2.

After the first overall operations including the write processing for the block BLK0 have been executed, a voltage Vi0-0 is stored as the individual read voltage of the block BLK0, as shown in FIG. 10. The common read voltage is updated from the voltage Vc0(0) to a voltage Vc0(1) using the voltage Vi0-0. In addition, the individual read voltage identifier Ii is assigned as the read voltage identifier of the block BLK0. More specifically, for example, when the controller 30 detects that a predetermined time has passed since the write processing for the block BLK0 was executed in the first processing of the first overall operations, the second processing of the first overall operations is executed. Accordingly, in the processing of St3, St4, St5, and St6, respectively, the individual read voltage of the block BLK0 is calculated, the individual read voltage is stored, the common read voltage is updated, and the individual read voltage identifier Ii is assigned to the block BLK0.

After the second overall operations including the write processing for the block BLK3 have been executed, a voltage Vi0-3 is stored as the individual read voltage of the block BLK3, as shown in FIG. 11. The common read voltage is updated from the voltage Vc0(1) to a voltage Vc0(2) using the voltage Vi0-3. In addition, the individual read voltage identifier Ii is assigned as the read voltage identifier of the block BLK3. The second overall operations are the same as first overall operations except that the processing relating to the block BLK3 is executed instead of the processing relating to the block BLK0 in the first overall operations.

In the operation example described above, the common read voltage identifier is assigned as a read voltage identifier of the block BLK for which the first processing is to be executed before the first processing is executed; however, the embodiment is not limited to this example. A read voltage identifier of the block BLK for which the first processing is to be executed may not be assigned before the first processing is executed. Alternatively, the individual read voltage identifier Ii may be assigned as the read voltage identifier, and the individual read voltage may be stored as the read voltage of the block BLK. Even in these cases, the read voltage information 21 after the overall operations have been executed can be equivalent to the read voltage information shown in FIGS. 10 and 11.

1.2.1.3 Calculation of Individual Read Voltage

The calculation of the individual read voltage in the processing of St3 will be described.

The calculation of the individual read voltage is executed by using, for example, tracking read processing or correction amount calculation processing. In the following, examples of calculation of the individual read voltage using the tracking read processing or the correction amount calculation processing will be described.

(Tracking Read Processing)

Figure 12:
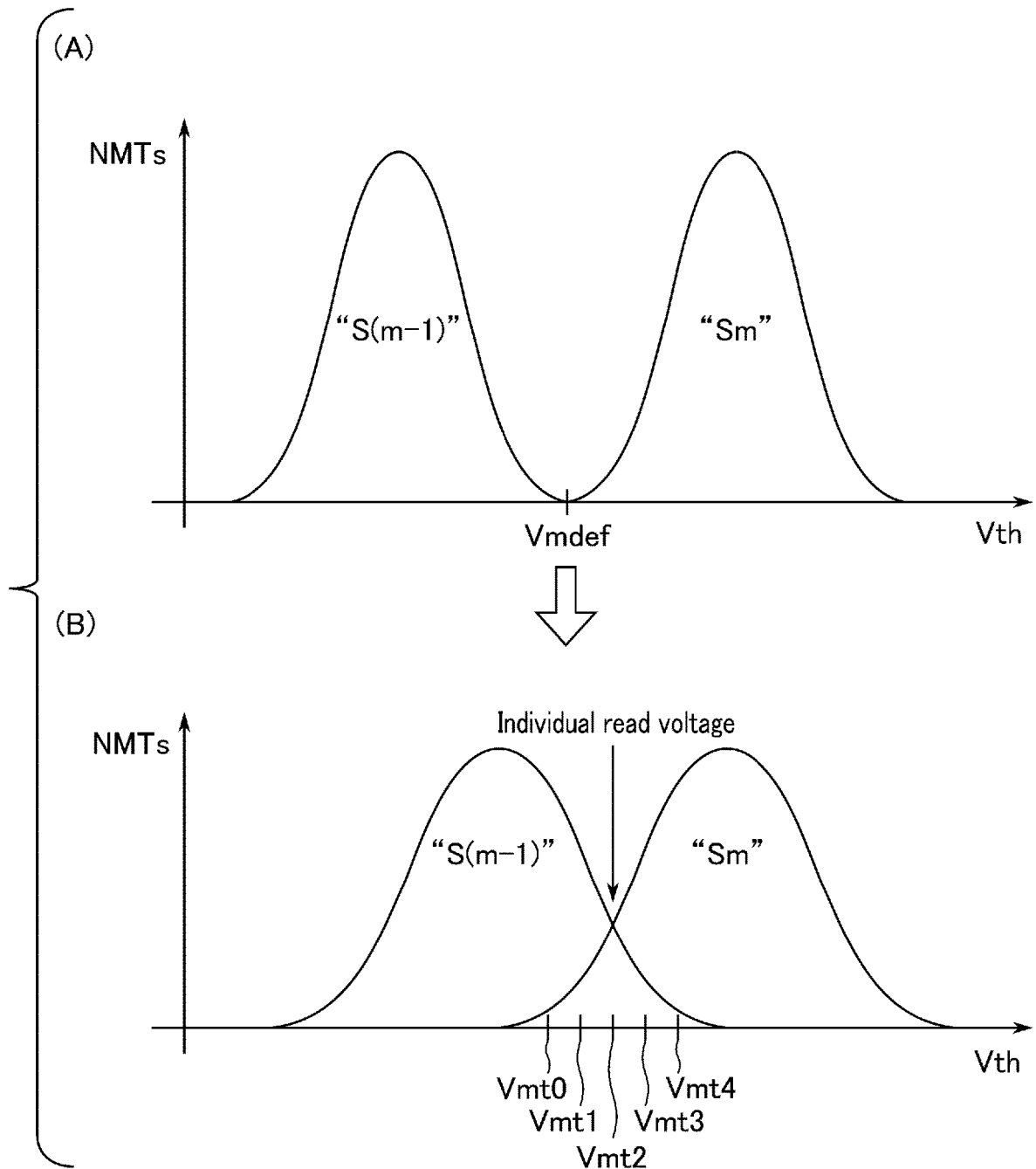
FIG. 12 is a schematic diagram for explaining an example of tracking read processing of the first operation example of the first embodiment.

An example of the calculation of the individual read voltage using the tracking read processing will be described with reference to FIG. 12. FIG. 12 is a schematic diagram for explaining an example of the tracking read processing of the first operation example of the first embodiment.

As shown in FIG. 12 (A), in a threshold voltage distribution immediately after the write processing, states "S(m−1)" and "Sm" are separated from each other. However, the distribution width, such as full width at half maximum, of the threshold voltage distributions of the respective states "S0" through "S7", may change due to an occurrence of a change in threshold voltages of the memory cell transistors MT as described above. Accordingly, as shown in FIG. 12 (B), the threshold voltage distributions of the states "S(m−1)" and "Sm" may overlap. Furthermore, the optimum read voltage may deviate from the preset read voltage as described above. From these matters, the number of fail bits may increase in the read processing using the preset read voltage, in which case correction of an error may be difficult.

To avoid this, the memory system 1 according to the first embodiment executes tracking read processing as shown in FIG. 12 (B). In the tracking read processing, read processing using a plurality of tracking voltages is executed to search for an individual read voltage at which the number of fail bits is reduced.

For example, in the tracking read corresponding to the read voltage Vm, read processing respectively using tracking voltages Vmt0, Vmt1, Vmt2, Vmt3, and Vmt4 is sequentially executed.

The tracking voltages Vmt0 through Vmt4 are respectively set to any values and differences between the adjacent tracking voltages are set to be substantially identical. The tracking voltages Vmt0, Vmt1, Vmt2, Vmt3, and Vmt4 are higher in ascending order (Vmt0<Vmt1<Vmt2<Vmt3<Vmt4). The preset read voltage Vmdef is higher than the tracking voltage Vmt0 and lower than the tracking voltage Vmt4 (Vmt0<Vmdef<Vmt4).

The number of tracking voltages is not limited to five, but may be set to any number. Differences between the adjacent tracking voltages may vary between read voltages.

In tracking read processing corresponding to the read voltage Vm, the sequencer 14 estimates an individual read voltage to separate the state "S(m−1)" and "Sm" based on, for example, the number of on-cells of the memory cell transistors MT in the read processing using the tracking voltage Vmt0, the number of on-cells of the memory cell transistors MT in the read processing using the tracking voltage Vmt1, . . . , and the number of on-cells of the memory cell transistors MT in the read processing using the tracking voltage Vmt4. The sequencer 14 estimates a voltage at which the number of on-cells of the memory cell transistors MT is a minimum. The sequencer 14 determines, for example, the estimated voltage as the individual read voltage.

(Correction Amount Calculation Processing)

An example of the calculation of the individual read voltage using the correction amount calculation processing will be described with reference to FIG. 13. FIG. 13 is a schematic diagram for explaining an example of the correction amount calculation processing of the first operation example of the first embodiment. FIG. 13 shows an example in which a correction amount of the read voltage Vm is calculated.

The ECC circuit 34 compares a state at data writing and a state at data reading, for example, with respect to each column of read data. More specifically, for example, the ECC circuit 34 calculates the number of memory cells E(a) from which data written as the state "Sm" is erroneously read as the state "S(m−1)". The ECC circuit 34 also calculates the number of memory cells E(b) from which data written as the state "S(m−1)" is erroneously read as the state "Sm".

In FIG. 13, the number of memory cells E(a) from which data written as the state "Sm" is erroneously read as the state "S(m−1)" corresponds to the area of a region (a) in FIGS. 13 (A) through 13 (C). The number of memory cells E(b) from which data written as the state "S(m−1)" is erroneously read as the state "Sm" corresponds to the area of a region (b) in FIGS. 13 (A) through 13 (C).

FIG. 13 (A) shows a case in which the read voltage Vm is equal to a voltage Vmopt at a position where the two threshold voltage distributions corresponding to the state "S(m−1)" and the state "Sm" intersect. In the case of FIG. 13 (A), the number of memory cells E(a) is equal to the number of memory cells E(b). In this case, it is expected that the number of fail bits E that occur between the state "S(m−1)" and the state "Sm" is a minimum. The number of fail bits E is equal to the sum of the number of memory cells E(a) and the number of memory cells E(b) (E=E(a)+E(b)). Therefore, the read voltage calculation unit 38 determines that the read voltage Vm need not be updated. In other words, the read voltage calculation unit 38 sets the correction amount ΔVm of the read voltage Vm to "0" (ΔVm=0).

FIG. 13 (B) shows a case in which the read voltage Vm is higher than the voltage Vmopt. In the case of FIG. 13 (B), the number of memory cells E(a) is larger than the number of memory cells E(b). In this case, the number of fail bits E is larger than the number of fail bits E in the case of FIG. 13 (A). Therefore, the read voltage calculation unit 38 shifts the read voltage Vm to a low voltage side so as to be closer to the voltage Vmopt. In other words, the read voltage calculation unit 38 calculates a negative correction amount ΔVm (ΔVm<0).

FIG. 13 (C) shows a case in which the read voltage Vm is lower than the voltage Vmopt. In the case of FIG. 13 (C), the number of memory cells E(a) is smaller than the number of memory cells E(b). In this case, the number of fail bits E is larger than the number of fail bits E in the case of FIG. 13 (A). Therefore, the read voltage calculation unit 38 shifts the read voltage Vm to a high voltage side so as to be closer to the voltage Vmopt. In other words, the read voltage calculation unit 38 calculates a positive correction amount ΔVm (ΔVm>0).

It is expected that the difference between the number of memory cells E(a) and the number of memory cells E(b) will increase as the difference between the read voltage Vm and the voltage Vmopt increases. Therefore, the read voltage calculation unit 38 determines the correction amount ΔVm in accordance with the magnitude of the ratio between the number of memory cells E(a) and the number of memory cells E(b). Accordingly, it is possible to determine an appropriate correction amount in accordance with the degree of overlapping of the threshold voltage distributions, and to calculate a correction amount ΔVm closer to the voltage Vmopt.

The read voltage calculation unit 38 determines a voltage, for example, obtained by adding the correction amount ΔVm calculated as described above to the preset read voltage Vmdef, as an individual read voltage.

1.2.2 Second Operation Example

In the second operation example described below, write processing is executed on a common read voltage updating block, and thereafter, while the common read voltage is being updated, a common read voltage is applied as a read voltage for the common read voltage updating block. In the following, a case will be described in which the common read voltage is updated when a preset time has passed since the write processing was executed.

1.2.2.1 Overall Operations

Figure 14:
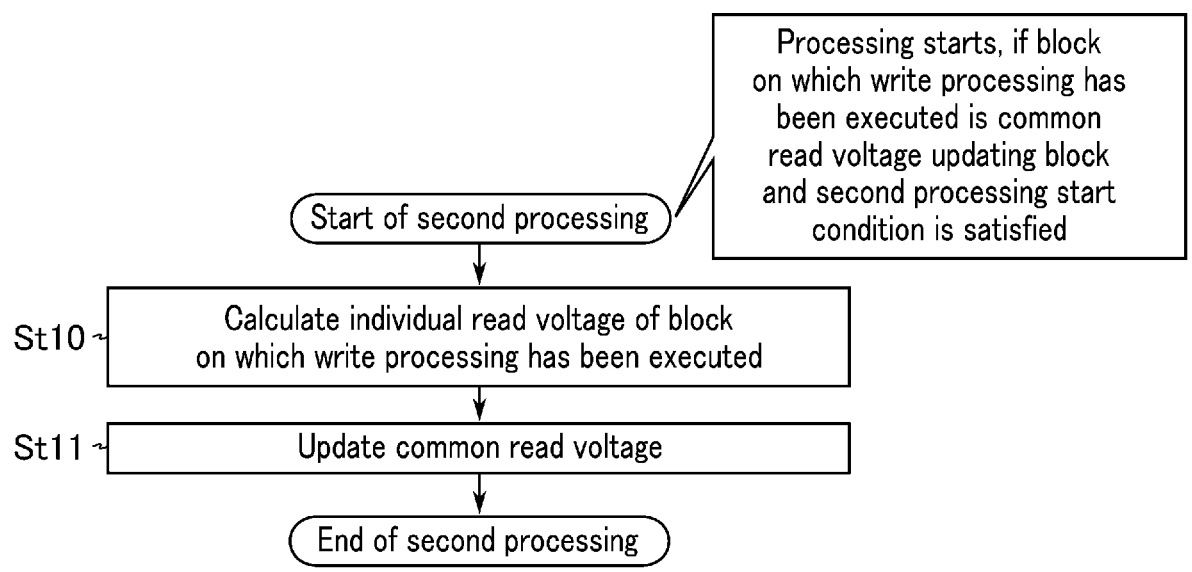
FIG. 14 is a flowchart for explaining second processing of a second operation example of the first embodiment.

Overall operations in the second operation example, including the write processing, will be described with reference to FIG. 14. FIG. 14 is a flowchart for explaining the second processing of the second operation example of the first embodiment. In the description below, differences in the overall operations in the second operation example from those of the overall operations in the first operation example will be mainly described.

The overall operations in the second operation example, including the write processing, include first processing and second processing.

The first processing in the second operation example is the same as the first processing in the first operation example. The second processing in the second operation example includes processing of St10 and Stn. The processing of St10 and St11 is the same as the processing of St3 and St5 of the second processing in the first operation example.

Similarly to the second processing in the first operation example, the second processing in the second operation example is executed in a case where, for example, the write target block BLK is a common read voltage updating block and the second processing start condition described above is satisfied. If the write target block BLK is not a common read voltage updating block, the second processing is not executed, similarly to the first operation example of the first embodiment.

As described above, in the second processing in the second operation example, a common read voltage identifier is assigned as a read voltage identifier of the write target block BLK. Furthermore, similarly to the first operation example, the read voltage calculation unit 38 updates the common read voltage using the individual read voltage of the write target block BLK.

If the block BLK on which the write processing of the first processing has been executed is a common read voltage updating block, similarly to the first operation example, the memory system 1 may be configured to, for example, periodically execute the second processing a plurality of times.

1.2.2.2 Updating of Read Voltage Information

Figure 15:
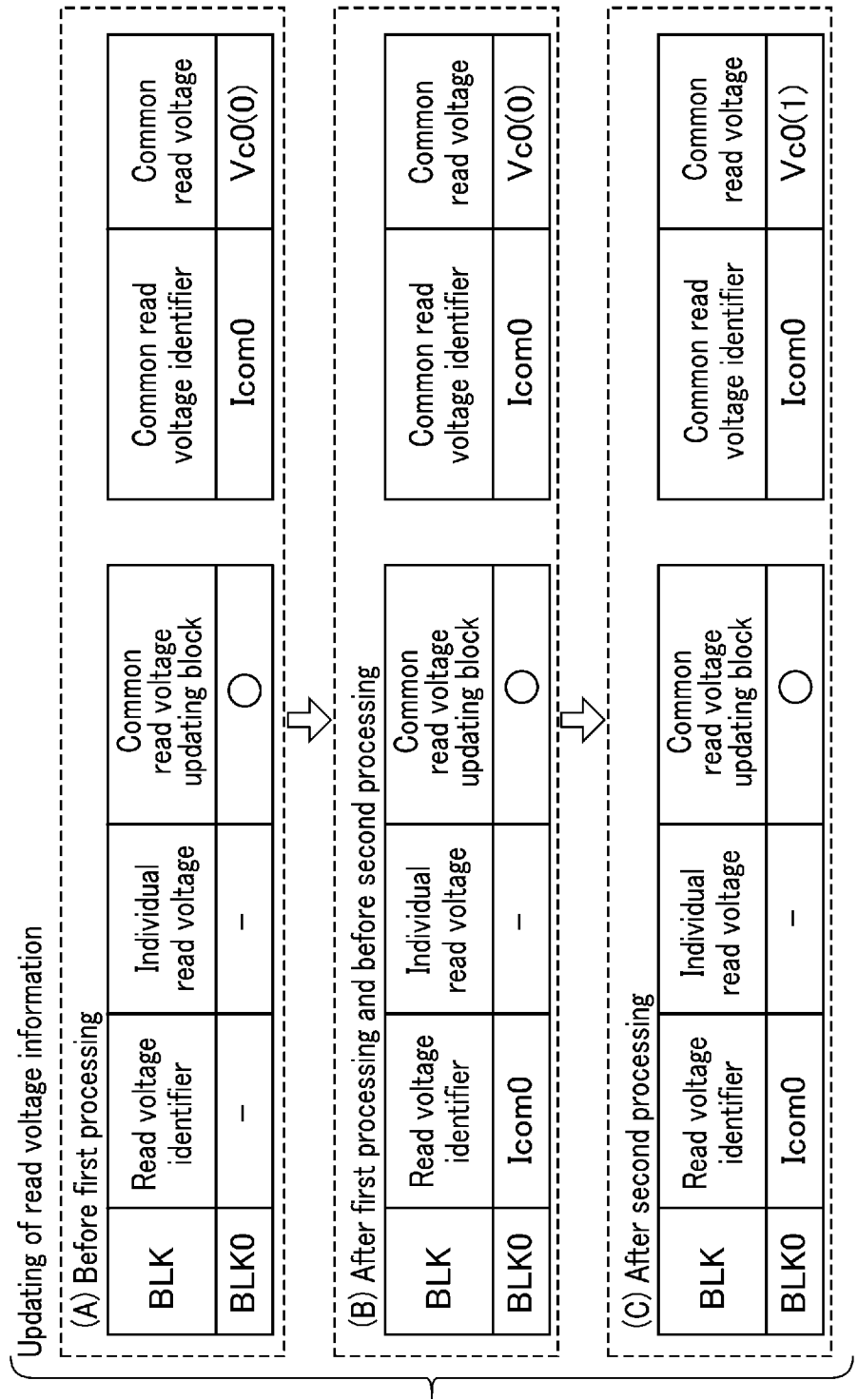
FIG. 15 is a diagram for explaining an example of updating of read voltage information in overall operations including write processing of the second operation example of the first embodiment.

Updating of the read voltage information 21 in the overall operations including the write processing of the second operation example will be described in more detail with reference to FIG. 15. FIG. 15 is a diagram for explaining an example of updating of read voltage information in overall operations including write processing of the second operation example of the first embodiment. To simplify the explanation, FIG. 15 shows the read voltage identifiers, the individual read voltages, and the information on whether the block is a common read voltage updating block for the block BLK0 of the chip Chip0, and common read voltages corresponding to the identifier Icom0.

The following shows an example of updating of the read voltage information 21 in a case where overall operations including write processing on the block BLK0 are executed. In the second operation example, the block BLK0 is a common read voltage updating block. Therefore, the first processing as well as the second processing are executed on the block BLK0.

FIG. 15 (A) shows the read voltage information 21 before the first processing is executed. FIG. 15 (B) shows the read voltage information 21 after the first processing is executed and before the second processing is executed. FIG. 15 (C) shows the read voltage information 21 after the second processing is executed.

Before the execution of the first processing on the block BLK0, write processing has not be executed on the block BLK0. That is, as shown in FIG. 15 (A), the read voltage identifier for the block BLK0 and the individual read voltage for the block BLK0 are in an unset state. The common read voltage corresponding to the common read voltage identifier Icom0 is a voltage Vc0(0). In the second operation example, the voltage Vc0(0) is, for example, a preset read voltage.

In the processing St1 of the first processing, write processing on the block BLK0 is executed. Then, as shown in FIG. 15 (B), the first processing for the block BLK0 is executed, so that the common read voltage identifier Icom0 is assigned as the read voltage identifier of the block BLK0.

In the processing of St11 of the second processing, the read voltage calculation unit 38 updates the common read voltage corresponding to the common read voltage identifier Icom0. Accordingly, as shown in FIG. 15 (C), after the second processing has been executed, the common read voltage corresponding to the common read voltage identifier Icom0 is updated from the voltage Vc0(0) to the voltage Vc0(1). Although not shown, the read voltages of all blocks BLK to which the common read voltage identifier Icom0 is assigned become the voltage Vc0(1).

1.2.3 Third Operation Example

In the third operation example, a case will be described in which read processing is executed on each block BLK.

Figure 16:
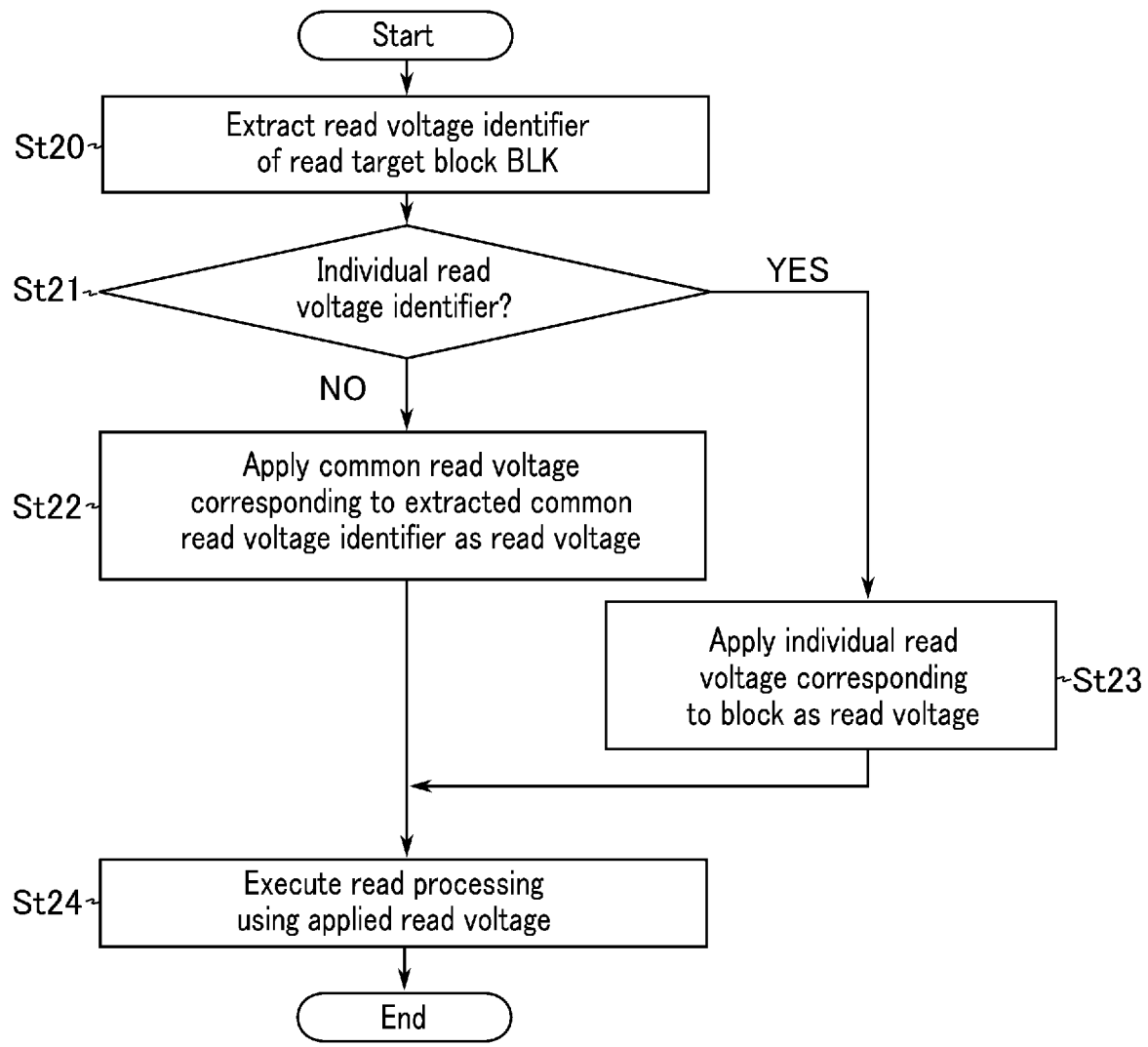
FIG. 16 is a flowchart for explaining read processing of a third operation example of the first embodiment.

Overall operations in the third operation example will be described with reference to FIG. 16. FIG. 16 is a flowchart for explaining read processing of the third operation example of the first embodiment.

Upon receipt of an instruction for read processing from the host device 2 (Start), the read voltage selection unit 37 extracts a read voltage identifier of a read target block BLK based on the read voltage information 21 (St20). The read target block BLK is a block BLK storing effective data.

The controller 30 determines whether the read voltage identifier extracted in the processing of St20 is an individual read voltage identifier (St21). If the read voltage identifier extracted in the processing of St20 is determined to be an individual read voltage identifier (St21; YES), the processing proceeds to St23. If the read voltage identifier extracted in the processing of St20 is determined not to be an individual read voltage identifier (St21; NO), the processing proceeds to St22. That is, if the read voltage identifier extracted in the processing of St20 is a common read voltage identifier, the processing proceeds to St22.

If the read voltage identifier extracted in the processing of St20 is a common read voltage identifier (St21; NO), the read voltage selection unit 37 applies a common read voltage corresponding to the common read voltage identifier as a read voltage (St22). Then, the processing proceeds to St24.

If the read voltage identifier extracted in the processing of St20 is determined to be an individual read voltage identifier (St21; YES), the read voltage selection unit 37 applies an individual read voltage corresponding to the read target block BLK as a read voltage based on the read voltage identifier (St23). Then, the processing proceeds to St24.

The controller 30 executes read processing using the read voltage applied in the processing of St22 or the read voltage applied in the processing of St23 (St24).

Through the operations described above, the overall operations of the third operation example end (End).

1.3 Advantageous Effects of First Embodiment

The memory system 1 according to the first embodiment can suppress an increase in latency of the read processing. Read latency is a delay time of the read processing.

The memory system 1 of the first embodiment includes the controller 30, and the non-volatile memory 10 including a plurality of chips. In the first operation example of the first embodiment, the controller 30 uses the voltage Vc0(0) as a common read voltage in a case of reading data from each of the blocks BLK0, BLK1, BLK3, and BLK4 of the chip Chip0 before the first overall operations. In a case of reading data from the block BLK2, the controller 30 uses the voltage Vi0-2 associated with the block BLK2. In the first overall operations, in response to calculation of the voltage Vi0-0 associated with the block BLK0, the controller 30 updates the common read voltage to Vc0(1) from Vc0(0) based on the voltage Vi0-0. After the first overall operations, in a case of reading data from the block BLK0, the controller 30 uses the voltage Vi0-0. In a case of reading data from each of the blocks BLK1, BLK3, and BLK4, the controller 30 uses the voltage Vc0(1) as the common read voltage. Furthermore, in a case of reading data from the block BLK2, the controller 30 uses the voltage Vi0-2. In the second overall operations, in response to calculation of the voltage Vi0-3 associated with the block BLK3, the controller 30 updates the common read voltage to Vc0(2) from Vc0(1) based on the voltage Vi0-3. After the second overall operations, in a case of reading data from the block BLK0, the controller 30 uses the voltage Vi0-0. The controller 30 uses the voltage Vc0(2) as the common read voltage in a case of reading data from each of the blocks BLK1 and BLK4, and uses the voltage Vi0-2 in a case of reading data from the block BLK2. Furthermore, the controller 30 uses the voltage Vi0-3 in a case of reading data from the block BLK3. As described above, the controller 30 is configured to update the common read voltage a plurality of times in one chip; therefore, in the case of reading data from each block BLK, it is possible to suppress the increase in the number of fail bits without using a read voltage calculated independently for the block BLK. Thus, the increase in the number of fail bits can be suppressed, while the frequency of processing of calculating an optimum read voltage of each block BLK is reduced. Therefore, the increase in read latency can be suppressed by suppressing the increase in additional processing, such as read voltage updating processing or re-reading processing for a block in which the number of fail bits is increased.

As described above, the threshold voltages of the memory cell transistors MT may change after the write processing, which causes the optimum read voltage to change. Moreover, the blocks BLK included in each chip may have a similar variation tendency for the optimum read voltage. According to the memory system 1 of the first embodiment, the variation tendency of the optimum read voltage in each chip is reflected on the common read voltage, thereby suppressing the increase in difference between the common read voltage and the optimum read voltage of each block BLK. That is, even if the optimum read voltage is not calculated for all blocks BLK, the influence of a change in the read voltage due to a change of the threshold voltages of the memory cell transistors MT can be suppressed.

Furthermore, when reading data from each of the blocks BLK included in each chip, the controller 30 uses common read voltages associated with the respective chips. The common read voltages respectively associated with the chips are independent of one another. With the configurations described above, the increase of the read latency in each of the chips can be suppressed.

1.4 First Modification of First Embodiment

In the first and second operation examples of the first embodiment described above, the common read voltage is updated regardless of the write processing condition. However, the embodiment is not limited to these examples. The controller 30 may execute processing for determining whether to update the common read voltage based on the write processing condition.

In the following, differences in configurations and operations of a memory system 1 of the first modification of the first embodiment from those of the memory system of the first embodiment will be mainly described.

1.4.1 Configuration

The configurations of a non-volatile memory 10 and a controller 30 of the first modification of the first embodiment are the same as those of the non-volatile memory and the controller in the first embodiment. A volatile memory 20 of the first modification of the first embodiment stores read voltage information 21 similarly to the volatile memory of the first embodiment. In the following, differences in read voltage information 21 stored in the volatile memory 20 according to the first modification of the first embodiment from the read voltage information stored in the volatile memory 20 according to the first embodiment will be mainly described.

The read voltage information 21 according to the first modification of the first embodiment will be described with reference to FIG. 17. FIG. 17 is a diagram showing an example of read voltage information for each block stored by the volatile memory of the memory system according to the first modification of the first embodiment. In the first modification of the first embodiment, the table showing the relationship between a common read voltage identifier and a common read voltage is substantially the same as the table of the first embodiment shown in FIG. 6, and explanations and illustrations thereof are omitted. The read voltage information on the chips Chip1 through ChipN is the same as the read voltage information on the chip Chip0.

The volatile memory 20 of the first modification of the first embodiment stores, in the read voltage information 21, a temperature at execution of the latest write processing on each block BLK in addition to the read voltage identifier, the individual read voltage, and the information on whether the block is a common read voltage updating block. In FIG. 17 and the following description, the temperature of the non-volatile memory 10 at execution of the latest write processing on each block BLK is simply referred to as a writing temperature. The read voltage identifier, the individual read voltage, and the information on whether the block is a common read voltage updating block in the first modification of the first embodiment are the same as the read voltage identifier, the individual read voltage, and the information on whether the block is a common read voltage updating block in the first embodiment, and descriptions thereof are omitted.

1.4.2 Operations

An operation of the memory system 1 according to the first modification of the first embodiment will be described.

1.4.2.1 First Operation Example of First Modification of First Embodiment

In the first operation example of the first modification of the first embodiment described below, write processing is executed on a common read voltage updating block, and thereafter while the common read voltage is being updated, if the block BLK satisfies a common read voltage updating condition, the common read voltage is applied as a read voltage for the common read voltage updating block.

1.4.2.1.1 Overall Operations

Figure 18:
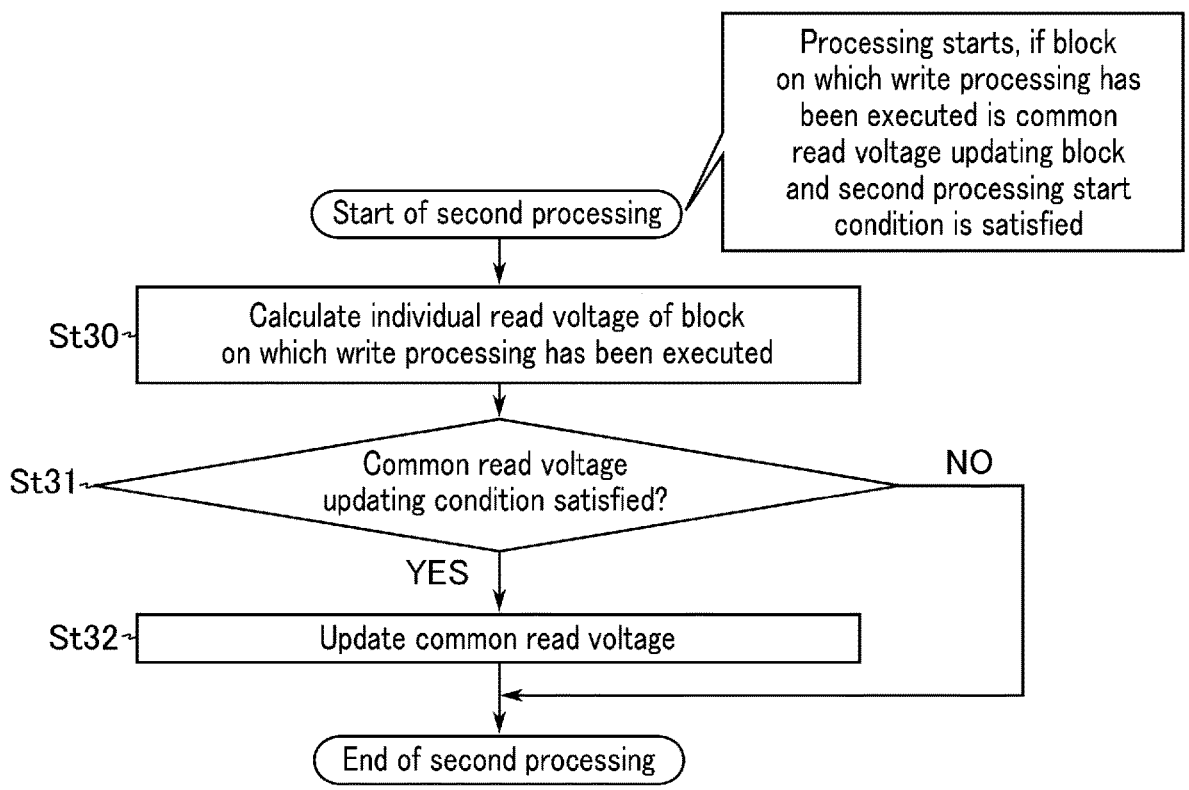
FIG. 18 is a flowchart for explaining overall operations including write processing of a first operation example of the first modification of the first embodiment.

Overall operations in the first operation example of the first modification of the first embodiment, including the write processing, will be described with reference to FIG. 18. FIG. 18 is a flowchart for explaining overall operations including the write processing of the first operation example of the first modification of the first embodiment. In the following, differences from the first and second operation examples of the first embodiment will be mainly described.

The first operation example of the first modification of the first embodiment includes first processing and second processing.

In the first processing, the controller 30 executes processing similar to the processing of St0 through St2 of the first operation example of the first embodiment. The controller 30 causes the volatile memory 20 to store a writing temperature associated with the write target block BLK.

Similarly to the second processing in the first operation example of the first embodiment and the second operation example of the first embodiment, the second processing in the first operation example in the first modification of the first embodiment is executed in a case where, for example, the write target block BLK is a common read voltage updating block and the second processing start conditions described above are satisfied. In a case where the write target block BLK is not a common read voltage updating block, the second processing is not executed, similarly to the first operation example of the first embodiment and the second operation example of the first embodiment.

In the second processing, the processing of St30 is the same as the processing of St3 of the first operation example of the first embodiment and the processing of St10 of the second operation example of the first embodiment. In addition, the processing of St32 is the same as the processing of St5 of the first operation example of the first embodiment and the processing of St11 of the second operation example of the first embodiment.

After the processing of St30, the controller 30 determines whether the write target block BLK satisfies a common read voltage updating condition (St31). A common read voltage updating condition is, for example, that the writing temperature corresponding to the write target block BLK is lower than 70° C. If the write target block BLK satisfies the common read voltage updating condition (St31; YES), the processing proceeds to St32. If the write target block BLK does not satisfy the common read voltage updating condition (St31; NO), the operations of the second processing end (End of the second processing).

In response to execution of the processing of St32, the operations of the second processing end (End of the second processing).

In the overall operations, the order of the processing of St31 may be changed wherever possible. For example, in FIG. 18, the processing of St31 and the processing of St30 may be exchanged.

Furthermore, the first modification is a case in which the common read voltage updating condition is based on the writing temperature, but the embodiment is not limited to this case. The common read voltage updating condition may be based on, for example, the number of fail bits E in each block BLK. Specifically, the common read voltage updating condition may be, for example, that the block BLK on which the write processing has been executed is a block BLK in which the number of fail bits E is smaller than a predetermined number. In this case, the volatile memory 20 stores, in the read voltage information 21, the number of fail bits E of each block BLK in addition to the read voltage identifier, the individual read voltage, and the information on whether the block is the common read voltage updating block.

The common read voltage updating condition may also be based on, for example, a difference between an individual read voltage calculated for a block BLK and a common read voltage corresponding to the block BLK, or a difference between the individual read voltage and another common read voltage or an individual read voltage corresponding to another block BLK. More specifically, the common read voltage updating condition may be, for example, that the block BLK on which write processing has been executed is a block BLK in which the aforementioned difference is smaller than a preset value in the block BLK.

Alternatively, the common read voltage updating condition may be, for example, that the block BLK on which write processing has been executed falls within blocks BLK of a predetermined range. The blocks BLK of the predetermined range include a plurality of blocks BLK that are determined in advance to be usable to, for example, common read voltage updating. The blocks BLK may be determined in accordance with physical locations or logical locations in, for example, the memory cell array 11.

Furthermore, the common read voltage updating condition may be a condition based on, for example, the number of program loops executed in write processing. More specifically, the common read voltage updating condition is, for example, that the number of program loops is smaller than a preset number. In a case where the common read voltage updating condition is not satisfied, the controller 30 determines that, for example, the write target block BLK is a block BLK that is more difficult to write as compared to the other blocks BLK, or a block BLK having a characteristic different from those of the other blocks BLK. In this case, updating of the common read voltage is not executed.

In the first operation example of the first modification of the first embodiment, the common read voltage updating condition is based on the writing temperature, but the condition is not limited to this. The common read voltage updating condition may be a condition based on the temperature of the non-volatile memory 10 for calculating an individual read voltage in the processing of St30, instead of the writing temperature.

1.4.2.1.2 Updating of Read Voltage Information

Figure 19:
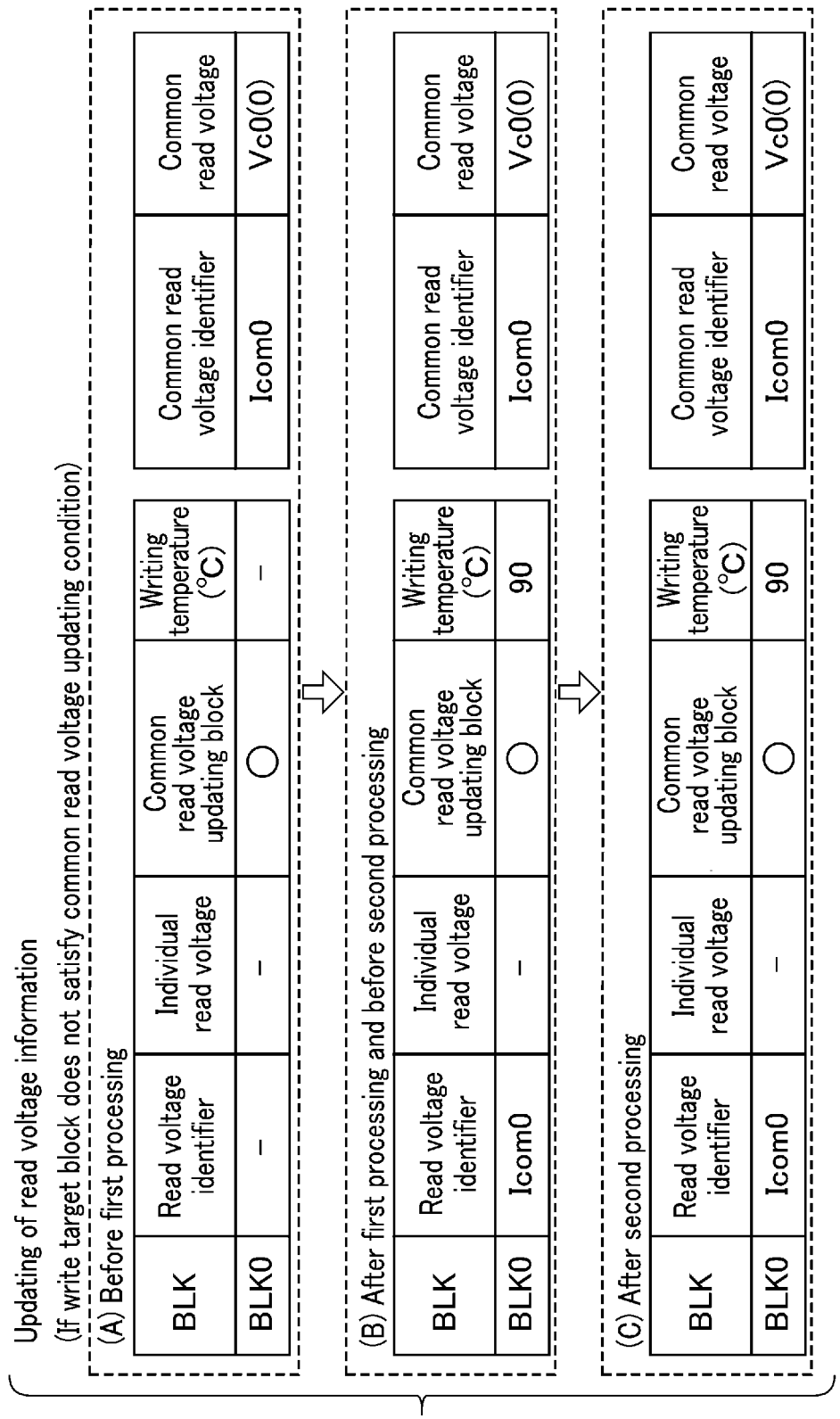
FIG. 19 is a diagram for explaining an example of updating of read voltage information in overall operations including write processing of the first operation example of the first modification of the first embodiment.

Updating of the read voltage information 21 in the overall operations including the write processing of the first operation example of the first modification of the first embodiment will be described in more detail with reference to FIG. 19. FIG. 19 is a diagram for explaining an example of updating of the read voltage information in the overall operations including the write processing of the first operation example of the first modification of the first embodiment. To simplify the explanation, FIG. 19 shows the read voltage identifiers, the individual read voltages, and the information on whether the block is a common read voltage updating block, and a writing temperature for the block BLK0, and a common read voltage corresponding to the common read voltage identifier Icom0.

The following shows an example of updating of the read voltage information 21 in a case where overall operations including write processing on the block BLK0 are executed at the writing temperature of 90° C. In the first operation example of the first modification of the first embodiment, the block BLK0 of the chip Chip0 is a common read voltage updating block. Therefore, the first processing as well as the second processing are executed on the block BLK0.

FIG. 19 (A) shows the read voltage information 21 before the first processing is executed. FIG. 19 (B) shows the read voltage information 21 after the first processing is executed and before the second processing is executed. FIG. 19 (C) shows the read voltage information 21 after the second processing is executed.

As shown in FIGS. 19 (A) and 19 (B), the read voltage information 21 before the first processing is executed and the read voltage information 21 after the first processing is executed and before the second processing is executed are the same as those shown in FIGS. 15 (A) and 15 (B) of the first embodiment except for the writing temperature. As shown in FIG. 19 (A), before the first processing is executed, the writing temperature is in an unset state (represented by the sign "-" in FIG. 19). The writing temperature in the first operation example of the first modification of the first embodiment is 90° C. Accordingly, as shown in FIG. 19 (B), the temperature of the non-volatile memory 10 during the write processing on the block BLK0 is stored in the first processing.

Since the writing temperature of the block BLK0 in the processing of St31 of the second processing is 70° C. or higher, the controller 30 determines that the writing temperature of the block BLK0 on which the write processing has been executed does not satisfy the common read voltage updating conditions. Thus, after the second processing has been executed, as shown in FIG. 19 (C), the controller 30 does not update the common read voltage.

The updating of the read voltage information 21 in a case where the write target block BLK0 satisfies the common read voltage updating conditions is the same as the updating of the read voltage information in the second operation example of the first embodiment shown in FIG. 15 except that the writing temperature is stored.

1.4.2.2 Second Operation Example of First Modification of First Embodiment

In the second operation example of the first modification of the first embodiment described below, write processing is executed on a common read voltage updating block, and thereafter while the common read voltage is being updated, if the block BLK satisfies a common read voltage updating condition, the individual read voltage is stored as a read voltage for the common read voltage updating block.

1.4.2.2.1 Overall Operations

Figure 20:
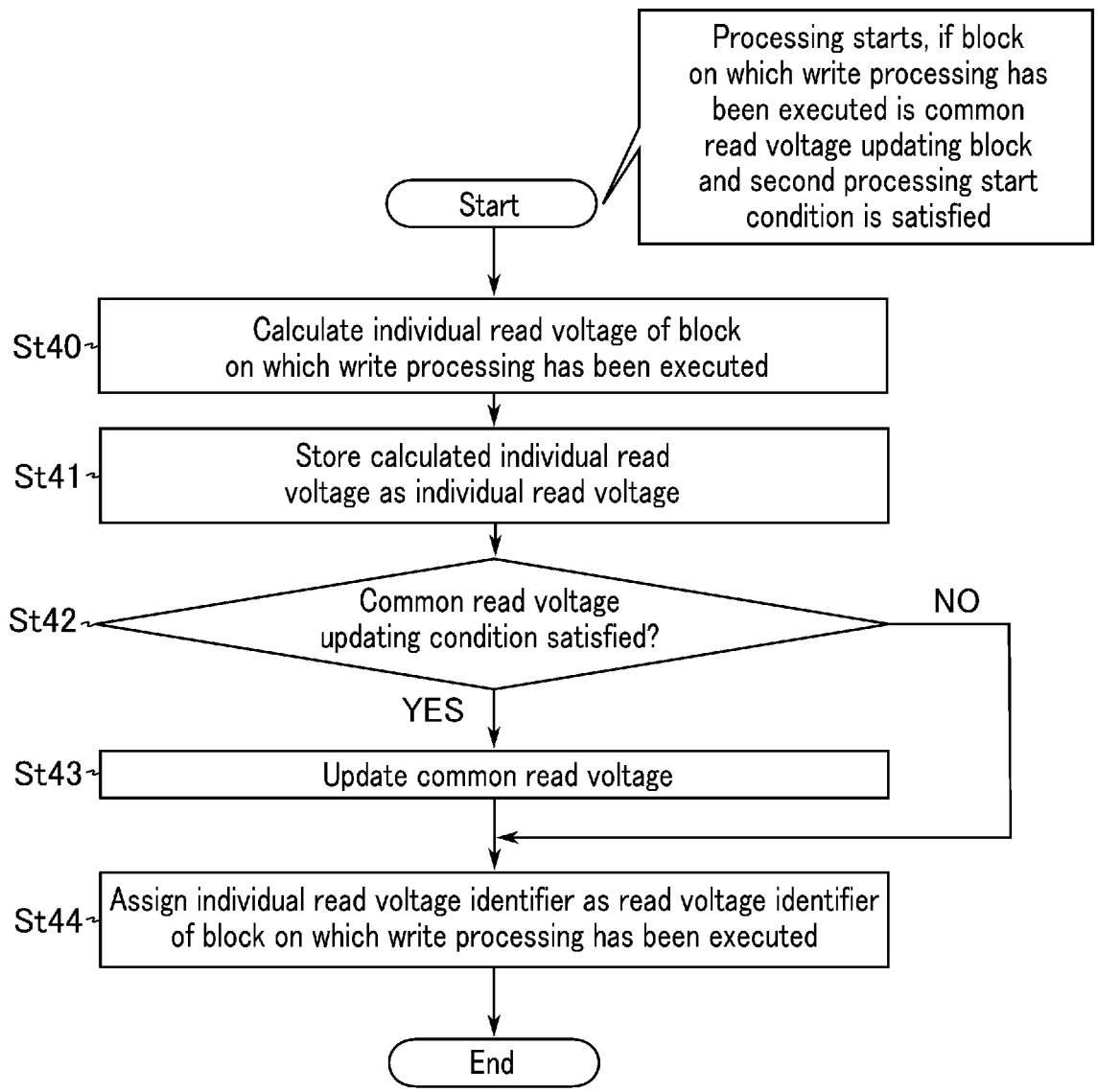
FIG. 20 is a flowchart for explaining overall operations including write processing of a second operation example of the first modification of the first embodiment.

Overall operations in the second operation example of the first modification of the first embodiment, including the write processing, will be described with reference to FIG. 20. FIG. 20 is a flowchart for explaining overall operations including the write processing of the second operation example of the first modification of the first embodiment. In the following, differences from the second operation example of the first embodiment and the first operation example of the first modification of the first embodiment will be mainly described.

The overall operations in the second operation example of the first modification of the first embodiment include first processing and second processing.

The first processing in the second operation example of the first modification of the first embodiment is the same as the first processing in the first operation example of the first modification of the first embodiment.

Similarly to the second processing in the first operation example of the first embodiment, the second operation example of the first embodiment, and the first operation example of the first modification of the first embodiment, the second processing in the second operation example in the first modification of the first embodiment is executed in a case where, for example, the write target block BLK is a common read voltage updating block and the second processing start conditions described above are satisfied. In a case where the write target block BLK is not a common read voltage updating block, the second processing is not executed, similarly to the first operation example of the first embodiment, the second operation example of the first embodiment, and the first operation example of the first modification of the first embodiment.

In the second processing, the processing of St40 is the same as the processing of St3 in the first operation example of the first embodiment, the processing of St10 in the second operation example of the first embodiment, and the processing of St30 in the first operation example of the first modification of the first embodiment. The processing of St41 is the same as the processing of St4 in the first operation example of the first embodiment. The processing of St43 is the same as the processing of St5 in the first operation example of the first embodiment, the processing of St11 in the second operation example of the first embodiment, and the processing of St32 in the first operation example of the first modification of the first embodiment. The processing of St44 is the same as the processing of St6 in the first operation example of the first embodiment.

Similarly to the processing of St31 in the first operation example of the first modification of the first embodiment, after the processing of St41, the controller 30 determines whether the write target block BLK satisfies the common read voltage updating conditions (St42). If the write target block BLK satisfies the common read voltage updating condition (St42; YES), the processing proceeds to St43. If the write target block BLK does not satisfy the common read voltage updating condition (St42; NO), the processing proceeds to St44.

In the overall operations, the order of the processing of determining whether the common read voltage updating condition is satisfied may be changed, wherever possible. For example, in FIG. 20, the processing of St42 may be executed before the processing of St40.

1.4.2.2.2 Updating of Read Voltage Information

Figure 21:
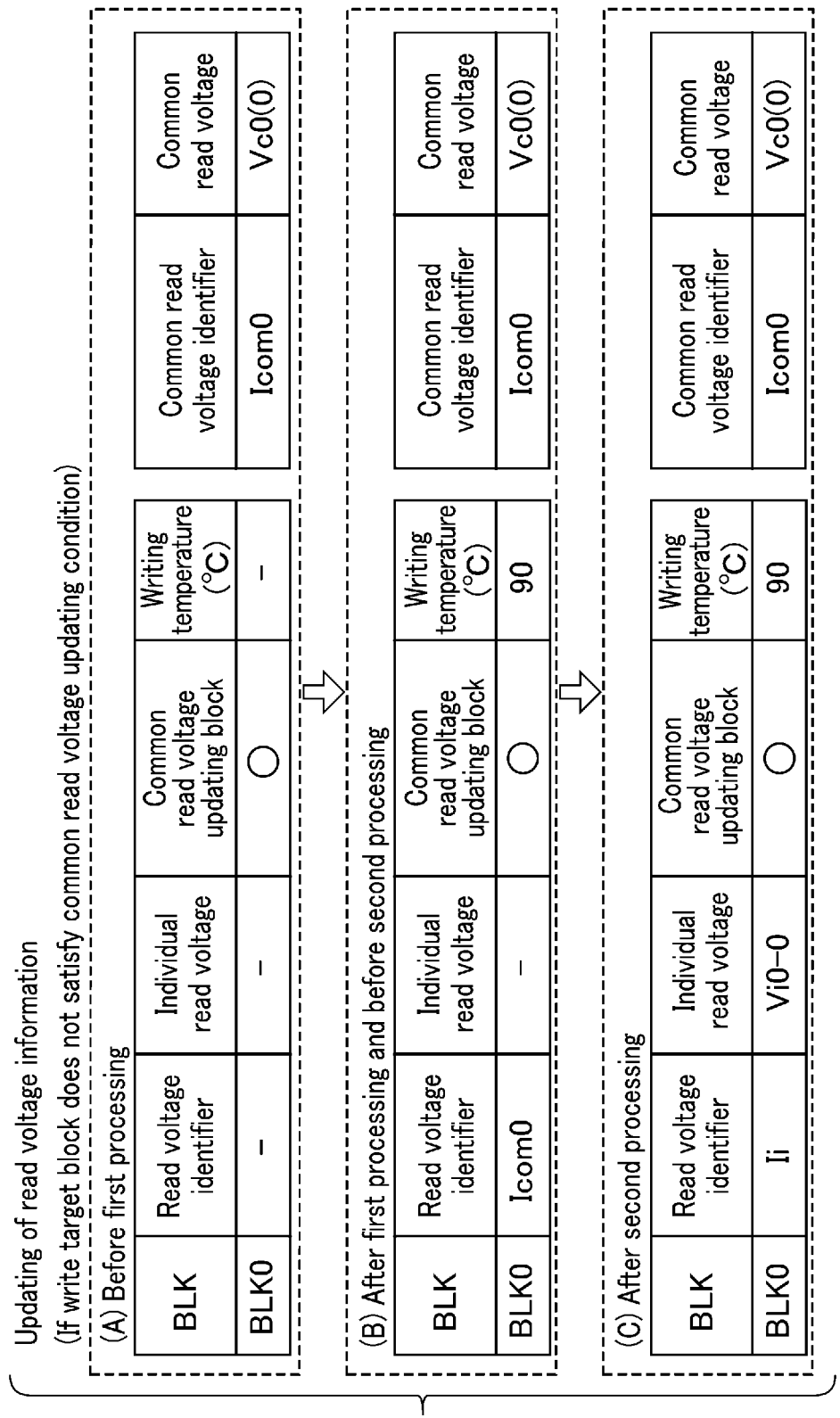
FIG. 21 is a diagram for explaining an example of updating of read voltage information in overall operations including write processing of the second operation example of the first modification of the first embodiment.

Updating of the read voltage information 21 in the overall operations including the write processing of the second operation example of the first modification of the first embodiment will be described in more detail with reference to FIG. 21. FIG. 21 is a diagram for explaining an example of updating of the read voltage information in the overall operations including the write processing of the second operation example of the first modification of the first embodiment. To simplify the explanation, FIG. 21 shows the read voltage identifiers, the individual read voltages, and the information on whether the block is a common read voltage updating block, and a writing temperature for the block BLK0 of the chip Chip0, and a common read voltage corresponding to the common read voltage identifier Icom0.

The following shows an example of updating of the read voltage information in a case where overall operations including write processing on the block BLK0 are executed, if the write processing is executed on the block BLK at the writing temperature of 90° C. In the second operation example of the first modification of the first embodiment, the block BLK0 of the chip Chip0 is a common read voltage updating block. Therefore, the first processing as well as the second processing are executed.

FIG. 21 (A) shows the read voltage information 21 before the first processing is executed. FIG. 21 (B) shows the read voltage information 21 after the first processing is executed and before the second processing is executed. FIG. 21 (C) shows the read voltage information 21 after the second processing is executed. The read voltage information 21 shown in FIG. 21 (A) and the read voltage information 21 shown in FIG. 21 (B) are respectively the same as the read voltage information shown in FIG. 19 (A) and the read voltage information shown FIG. 19 (B) in the first operation example of the first modification of the first embodiment. Therefore, explanations thereof are omitted.

If the write target block BLK0 does not satisfy the common read voltage updating condition, the updating of the read voltage information 21 in the second operation example is the same as the updating of the read voltage information in the first operation example of the first modification of the first embodiment, except that the voltage Vi0-0 is stored as the individual read voltage in the read voltage information 21 after the second processing is executed as shown in FIG. 21 (C) and that the individual read voltage identifier Ii is assigned as the read voltage identifier. That is, in the second operation example of the first modification of the first embodiment, the individual read voltage of the block BLK0 is stored through the processing of St41. In addition, the individual read voltage identifier Ii is assigned as the read voltage identifier of the block BLK0 through the processing of St44. Updating of the common read voltage is not executed.

If the write target block BLK0 satisfies the common read voltage updating condition, the updating of the read voltage information 21 is the same as the updating of the read voltage information in the second operation example of the first embodiment shown in FIG. 15, except that the writing temperature is stored.

According to the first modification of the first embodiment, the same advantageous effects as those of the first embodiment can also be obtained.

1.5 Second Modification of First Embodiment

In the first embodiment and the first modification of the first embodiment described above, the case has been described in which one common read voltage is set for each chip, but the embodiment is not limited to this case. A plurality of common read voltages may be set for each chip.

In the following, differences in configurations and operations of a memory system 1 according to the second modification of the first embodiment from those of the memory system according to the first embodiment will be mainly described.

1.5.1 Configuration

The configurations of a non-volatile memory 10 and a controller 30 of the second modification of the first embodiment are the same as those of the non-volatile memory and the controller in the first embodiment. A volatile memory 20 of the second modification of the first embodiment stores read voltage information 21 similarly to the volatile memory of the first embodiment. In the following, differences in read voltage information 21 in the second modification of the first embodiment from the read voltage information in the first embodiment will be mainly described.

The read voltage information 21 according to the second modification of the first embodiment will be described with reference to FIG. 22. FIG. 22 is a diagram showing an example of read voltage information for each block stored by the volatile memory of the memory system according to the second modification of the first embodiment. In the second modification of the first embodiment, the table showing the relationship between a common read voltage identifier and a common read voltage is substantially the same as the table of the first embodiment shown in FIG. 6, except that the number of common read voltage identifiers corresponding to the chip Chip0 is increased. Therefore, explanations thereof are omitted.

In the second modification of the first embodiment, the read voltage calculation unit 38 can set two common read voltage identifiers Icom0-0 and Icom0-1 in the chip Chip0. More specifically, the read voltage calculation unit 38 assigns the common read voltage identifier Icom0-0 to a block BLK of a writing temperature lower than 70° C. as a common read voltage identifier. The read voltage calculation unit 38 assigns the common read voltage identifier Icom0-1 to a block BLK of a writing temperature of 70° C. or higher as a common read voltage identifier. For example, in the case shown in FIG. 22, the common read voltage identifier Icom0-0 is assigned to blocks BLK0, BLK1, BLKn, etc. of a writing temperature lower than 70° C. as a read voltage identifier. Furthermore, the common read voltage identifier Icom0-1 is assigned to blocks BLK2, BLK3, etc. of a writing temperature of 70° C. or higher as a read voltage identifier.

1.5.2 Operations

An operation of the memory system 1 according to the second modification of the first embodiment will be described.

In the following, an operation example in a case where a write processing is executed on the common read voltage updating block will be described.

1.5.2.1 First Operation Example of Second Modification of First Embodiment

The first operation example of the second modification of the first embodiment described below is an operation example in which different common read voltage identifiers are assigned depending on whether the block BLK on which the write processing has been executed satisfies a condition.

1.5.2.1.1 Overall Operations

Overall operations in the first operation example of the second modification of the first embodiment, except for the processing of assigning a common read voltage identifier, can be, for example, the same as the overall operations of the first operation example of the first embodiment described with reference to FIGS. 7 and 8 or the overall operations of the second operation example of the first embodiment described with reference to FIG. 14.

Figure 23:
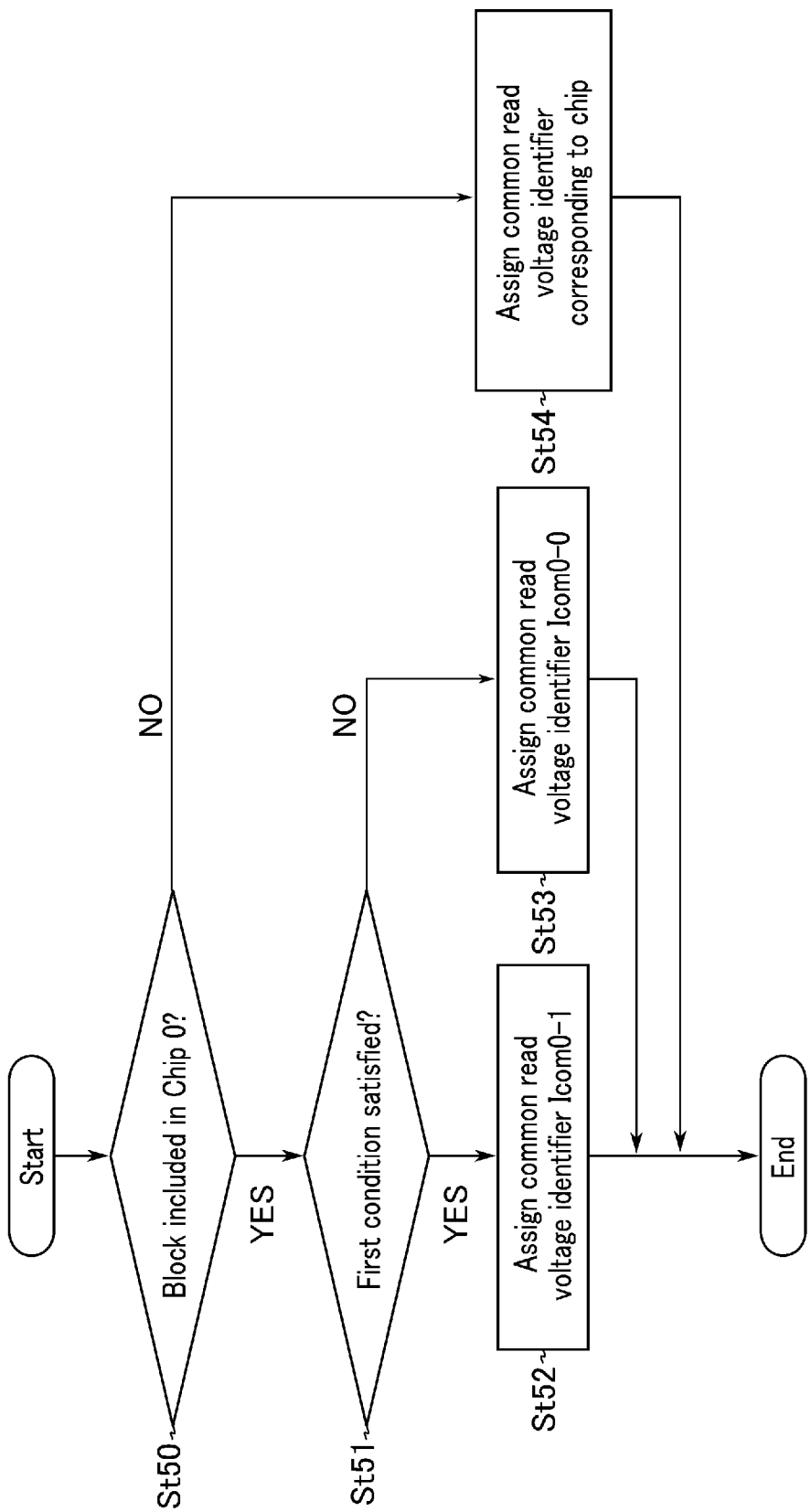
FIG. 23 is a flowchart for explaining an operation of assigning a common read voltage identifier corresponding to a block among a plurality of common read voltage identifiers in the memory system according to a first operation example of the second modification of the first embodiment.

Processing of assigning the common read voltage identifier will be described below with reference to FIG. 23. FIG. 23 is a flowchart for explaining an operation of assigning a common read voltage identifier corresponding to a block among a plurality of common read voltage identifiers in the memory system according to the second modification of the first embodiment. The processing corresponds to the processing of St1 in the first operation example of the first embodiment.

In response to execution of write processing for a write target block BLK (Start), the controller 30 determines whether the block BLK on which the write processing has been executed is a block BLK included in the chip Chip0 (St50). If the block BLK on which the write processing has been executed is determined to be a block BLK included in the chip Chip0 (St50; YES), the processing proceeds to St51. If the block BLK on which the write processing has been executed is determined not to be a block BLK included in the chip Chip0 (St50; NO), the processing proceeds to St54.

If the block BLK on which the write processing has been executed is determined to be a block BLK included in the chip Chip0 (St50; YES), the controller 30 determines whether a first condition is satisfied (St51). The first condition is based on, for example, a writing temperature of the block BLK. More specifically, the first condition is that the writing temperature of the block is 70° C. or higher. If it is determined that the first condition is satisfied (St51; YES), the processing proceeds to St52. If it is determined that the first condition is not satisfied (St51; NO), the processing proceeds to St53.

If the first condition is satisfied (St51; YES), the common read voltage identifier Icom0-1 is assigned as a common read voltage identifier.

If the first condition is not satisfied (St51; NO), the common read voltage identifier Icom0-0 is assigned as a common read voltage identifier.

If the block BLK on which the write processing has been executed is not a block BLK included in the chip Chip0 (St50; NO), the common read voltage identifier corresponding to the chip including the block BLK is assigned (St54). If a plurality of common read voltages are applied in the chip, the controller 30 can assign the read voltage identifiers in St54 similarly to the processing of St51 through St53.

Through the operations described above, the operations for assigning the common read voltage identifier end (End).

As described above, in the first processing of the overall operations, selection of the common read voltage is executed on the block BLK on which the write processing has been executed.

Processing similar to that shown in FIG. 23 may be further executed, for example, in the second processing of the first operation example of the first embodiment. More specifically, processing similar to that shown in FIG. 23 may be executed, for example, before the processing of St3 in the second processing of the first operation example of the first embodiment. In this case, updating of the common read voltage is executed on, for example, the block BLK on which the write processing has been executed, based on the common read voltage identifier selected in the second processing.

Furthermore, instead of the processing shown in FIG. 23, processing similar to that shown in FIG. 23 may be executed, for example, in the second processing of the first operation example of the first embodiment. In this case, the selection of the common read voltage identifier is executed only on the common read voltage updating block.

The first operation example of the second modification of the first embodiment can be carried out in the first operation example and the second operation example of the first modification of the first embodiment. Specifically, in the first processing of the first operation example of the second modification of the first embodiment, when updating the common read voltage using the read voltage updating blocks to which the common read voltage identifiers Icom0-0 and Icom0-1 are respectively assigned, whether the common read voltage updating condition is satisfied or not may be determined in the same manner as in the first operation example and the second operation example of the first modification of the first embodiment.

Processing similar to that shown in FIG. 23 may be further executed, for example, in the first operation example and the second operation example of the first modification of the first embodiment. More specifically, processing similar to that shown in FIG. 23 may be executed, for example, between St31 and St32 in the second processing of the first operation example of the first modification of the first embodiment. Alternatively, processing similar to that shown in FIG. 23 may be executed, for example, between St42 and St43 in the second processing of the second operation example of the first modification of the first embodiment. Furthermore, instead of the processing shown in FIG. 23, processing similar to that shown in FIG. 23 may be executed, for example, in the second processing of each of the first operation example and the second operation example of the first modification of the first embodiment.

1.5.2.1.2 Updating of Read Voltage Information

Figure 24:
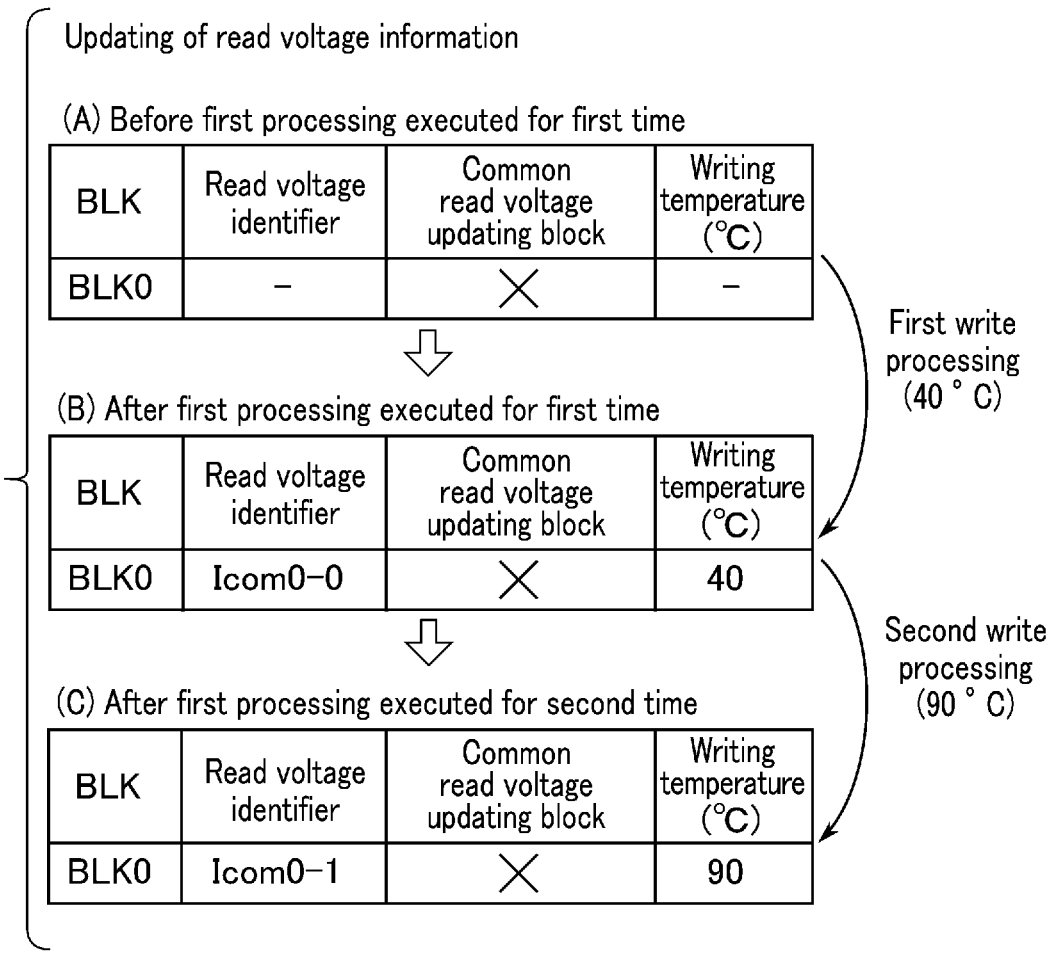
FIG. 24 is a diagram for explaining an example of updating of read voltage information in the first operation example of the second modification of the first embodiment.

Updating of the read voltage information 21 in the first operation example of the second modification of the first embodiment will be described with reference to FIG. 24. FIG. 24 is a diagram for explaining an example of updating of the read voltage information in the first operation example of the second modification of the first embodiment.

In the following, an example of updating of the read voltage information 21 for the block BLK0 of the chip Chip0 will be described, in a case where the overall operations including write processing at a writing temperature of 40° C. and the overall operations including write processing at a writing temperature of 90° C. are sequentially executed. To simplify the explanation, FIG. 24 shows the read voltage identifiers, the information on whether the block is a common read voltage updating block, and a writing temperature for the block BLK0.

In the example shown in FIG. 24, the block BLK0 is not a common read voltage updating block. Therefore, in the overall operations including the write processing, the second processing is not executed and only the first processing for the block BLK0 is executed.

FIG. 24 (A) shows the read voltage information 21 before the overall operations including the first write processing are executed. FIG. 24 (B) shows the read voltage information 21 after the overall operations including the first write processing are executed and before the overall operations including the second write processing are executed. FIG. 24 (C) shows the read voltage information 21 after the overall operations including the second write processing are executed.

Before execution of the first processing including the first write processing in the example shown in FIG. 24, no write processing has been executed on the block BLK0. Therefore, as shown in FIG. 24 (A), the read voltage identifier and the writing temperature are in an unset state.

The writing temperature of the first write processing is 40° C. Thus, the writing temperature of the first write processing does not satisfy the first condition. Accordingly, as shown in FIG. 24 (B), after the write processing on the block BLK0 has been executed in the first processing for the first time, the read voltage calculation unit 38 assigns the common read voltage identifier Icom0-0 as the read voltage identifier of the block BLK0 through the processing of St53.

The writing temperature of the write processing for the second time is 90° C. Thus, the writing temperature of the write processing for the second time satisfies the first condition. Accordingly, as shown in FIG. 24 (C), after the write processing on the block BLK0 has been executed in the first processing for the second time, the read voltage calculation unit 38 assigns the common read voltage identifier Icom0-1 as the read voltage identifier of the block BLK0 through the processing of St52.

In the second modification of the first embodiment described above, the case has been described in which the common read voltage identifier is assigned based on the writing temperature of the block BLK, but the embodiment is not limited to this case. For example, the read voltage calculation unit 38 may assign the common read voltage based on a wear state of each block BLK. In this case, the read voltage information 21 stores the number of times of execution of write processing on each block BLK in addition to, for example, the read voltage identifier, the individual read voltage, and the information on whether the block is the common read voltage updating block. In the following description, the number of times of execution of write processing on each block BLK is also referred to as the degree of wear.

In the case where the read voltage calculation unit 38 assigns the common read voltage based on the wear state of each block BLK, the two common read voltage identifiers Icom0-0 and Icom0-1 may be assigned in accordance with the degree of wear in the chip Chip0. More specifically, the common read voltage identifier Icom0-0 is assigned to the blocks BLK1, BLK3, BLKn, etc. in which the degree of wear is, for example, less than 1000. Further, the common read voltage identifier Icomn0-1 is assigned to the blocks BLK0, BLK2, etc. in which the degree of wear is, for example, 1000 or more.

The controller 30 may apply, based on status information acquired during the latest write processing of each block BLK, a common read voltage corresponding to the block BLK among a plurality of common read voltages. Here, the status information is, for example, the number of program loops executed in the write processing.

The controller 30 may assign, for example, based on a value calculated using series data of the individual read voltage of each block BLK, a common read voltage identifier corresponding to the block BLK among a plurality of common read voltage identifiers. The value calculated using the series data of the individual read voltage is, for example, an average value or a central value of the individual read voltages. More specifically, if the difference between the value calculated using the series data of the individual read voltage and the preset read voltage is less than a predetermined value, the controller 30 estimates that the block BLK is a block BLK in which characteristics of the write processing and the read processing are not deteriorated. If the aforementioned difference is equal to or larger than the predetermined value, the controller 30 estimates that the block BLK is a block BLK in which characteristics of the write processing and the read processing are deteriorated. The controller 30 assigns the common read voltage identifier Icom0-0 as a read voltage identifier to the block BLK in which the aforementioned difference is less than the predetermined value. Also, the controller 30 assigns the common read voltage identifier Icom0-1 as a read voltage identifier to the block BLK in which the aforementioned difference is equal to or larger than the predetermined value. Thus, the controller 30 can assign different common read voltage identifiers separately to the block BLK having deteriorated characteristics and the block BLK not having deteriorated characteristics.

Alternatively, the controller 30 may assign, for example, based on a physical position or a logical position of each block BLK, the common read voltage identifier corresponding to the block BLK among a plurality of common read voltage identifiers. Specifically, the memory system 1 may be configured to assign the common read voltage identifier Icom0-0 to a block BLK in a predetermined first range in each chip, and the common read voltage identifier Icom0-1 to a block BLK in a predetermined second range different from the first range.

1.5.2.2 Second Operation Example of Second Modification of First Embodiment

The second operation example of the second modification of the first embodiment described below is an operation example in which, in the case where a plurality of common read voltages are set to each chip, a common read voltage corresponding to one of two common read voltage identifiers is updated in accordance with whether the common read voltage updating block on which the write processing has been executed satisfies a condition.

1.5.2.2.1 Overall Operations

Overall operations in the second operation example of the second modification of the first embodiment include first processing and second processing. Timing for executing the second processing is the same as the timing for executing the second processing in the first operation example of the first embodiment.

Figure 25:
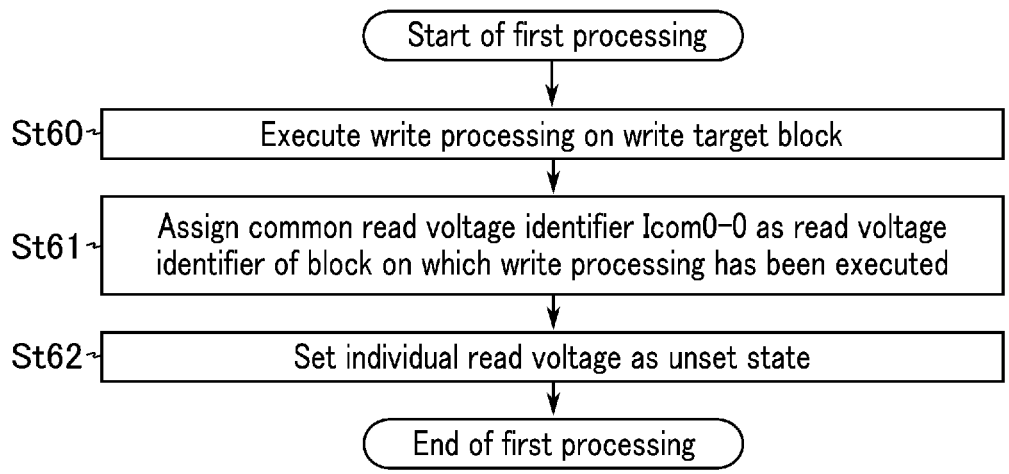
FIG. 25 is a flowchart for explaining first processing of a second operation example of the second modification of the first embodiment.
Figure 26:
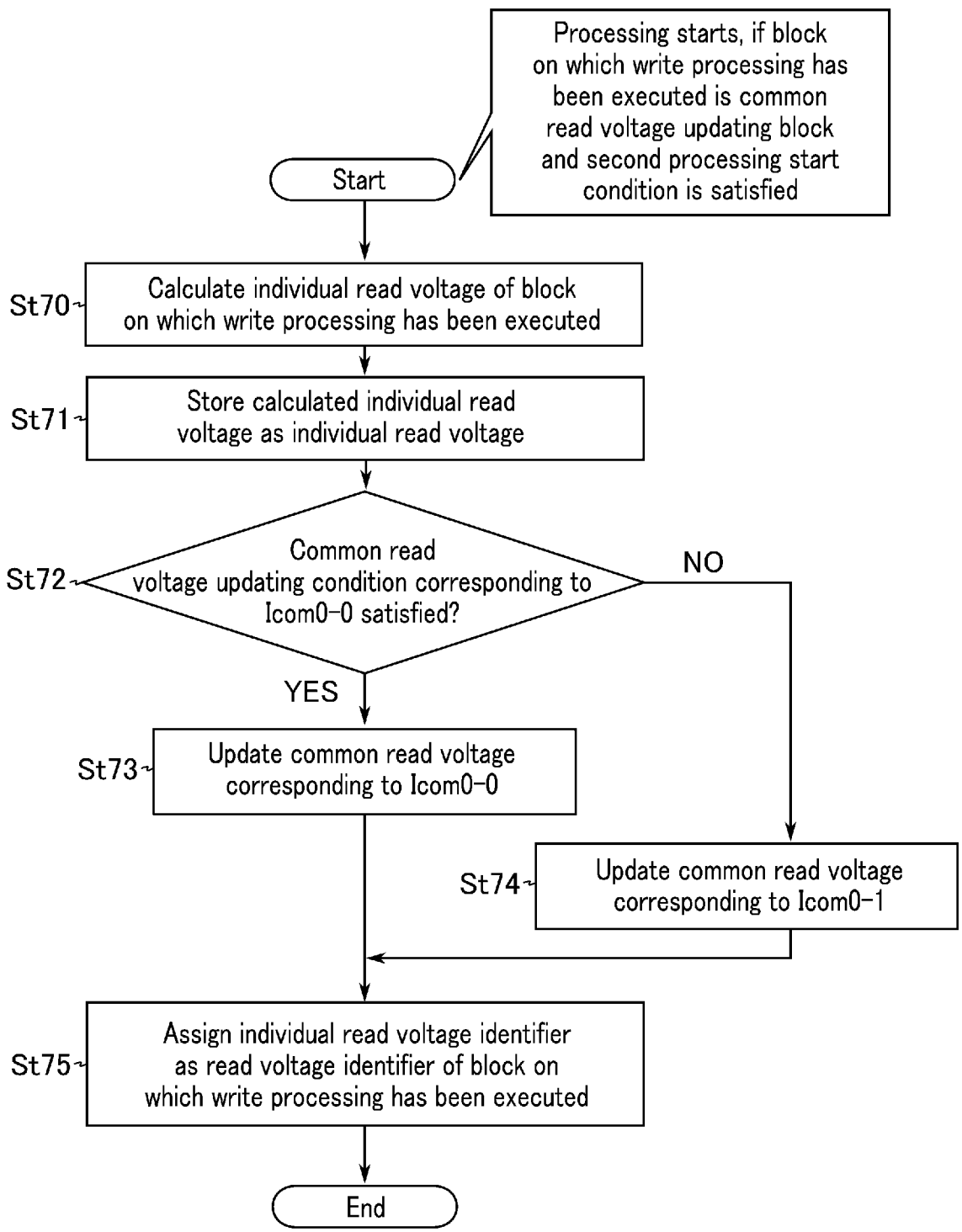
FIG. 26 is a flowchart for explaining second processing of the second operation example of the second modification of the first embodiment.

Overall operations in the second operation example of the second modification of the first embodiment will be described with reference to FIGS. 25 and 26. FIG. 25 is a flowchart for explaining the first processing of the second operation example of the second modification of the first embodiment. FIG. 26 is a flowchart for explaining the second processing of the second operation example of the second modification of the first embodiment.

First, the first processing of the second operation example of the second modification of the first embodiment will be described.

As shown in FIG. 25, the processing of St60 and St62 is the same as the processing of St0 and St2 in the first processing of the first operation example of the first embodiment.

In processing of St61, the common read voltage identifier Icom0-0 is assigned as a read voltage identifier of the block BLK on which the write processing has been executed. More generally, in a case of assigning, for example, two common read voltage identifiers in each chip, either one of the common read voltage identifiers is assigned.

Thus, the first processing ends.

Next, second processing in the second operation example of the second modification of the first embodiment will be described.

Similarly to the second processing in the first operation example of the first embodiment, the second operation example of the first embodiment, the first operation example of the first modification of the first embodiment, the second operation example of the first modification of the first embodiment, and the first operation example of the second modification of the first embodiment, the second processing in the second operation example of the second modification of the first embodiment is executed, in a case where, for example, the write target block BLK is a common read voltage updating block and the second processing start conditions described above are satisfied. In a case where the write target block BLK is not a common read voltage updating block, the second processing is not executed, similarly to the first operation example of the first embodiment, the second operation example of the first embodiment, the first operation example of the first modification of the first embodiment, the second operation example of the first modification of the first embodiment, and the first operation example of the second modification of the first embodiment.

The processing of St70 is the same as the processing of St3 in the first operation example of the first embodiment, the processing of St10 in the second operation example of the first embodiment, the processing of St30 in the first operation example of the first modification of the first embodiment, and the processing of St40 in the second operation example of the first modification of the first embodiment. The processing of St71 is the same as the processing of St4 in the first operation example of the first embodiment and the processing of St41 in the second operation example of the first modification of the first embodiment. The processing of St75 is the same as the processing of St6 in the first operation example of the first embodiment and the processing of St44 in the second operation example of the first modification of the first embodiment.

After the processing of St71, the controller 30 determines whether the write target block BLK satisfies the common read voltage updating condition corresponding to the common read voltage identifier Icom0-0 (St72). If the write target block BLK satisfies the common read voltage updating condition corresponding to the common read voltage identifier Icom0-0 (St72; YES), the processing proceeds to St73. If the write target block BLK does not satisfy the common read voltage updating condition corresponding to the common read voltage identifier Icom0-0 (St72; NO), the processing proceeds to St74. Here, the common read voltage updating condition corresponding to the common read voltage identifier Icom0-0 is a condition based on the individual read voltage calculated in, for example, the processing of St70. In the description below, the common read voltage updating condition corresponding to the common read voltage identifier Icom0-0 is simply referred to as an individual read voltage condition. More specifically, the individual read voltage condition is, for example, that the difference between the individual read voltage calculated for the write target block BLK and the common read voltage corresponding to the block BLK, or the difference between the individual read voltage and another common read voltage or an individual read voltage corresponding to another block BLK is less than a predetermined value. The common read voltage corresponding to the block BLK is a common read voltage corresponding to, for example, the common read voltage identifier Icom0-0.

The processing of St73 is the same as the processing of St5 in the first operation example of the first embodiment, the processing of St11 in the second operation example of the first embodiment, the processing of St32 in the first operation example of the first modification of the first embodiment, and the processing of St43 in the second operation example of the first modification of the first embodiment, except that the common read voltage corresponding to the common read voltage identifier Icom0-0 is updated.

The processing of St74 is the same as the processing of St5 in the first operation example of the first embodiment, the processing of St11 in the second operation example of the first embodiment, the processing of St32 in the first operation example of the first modification of the first embodiment, and the processing of St43 in the second operation example of the first modification of the first embodiment, except that the common read voltage corresponding to the common read voltage identifier Icom0-1 is updated.

In the operation examples described above, the individual read voltage of the block BLK on which the write processing has been executed is stored, but the operation examples are not limited to this case. For example, similarly to the first operation example of the first modification of the first embodiment, the individual read voltage need not be stored when the common read voltage is updated using the individual read voltage of the write target block BLK. In this case, the common read voltage identifier Icom0-1 may be assigned to the write target block BLK, after the common read voltage identifier is updated, for example, in the processing of St74.

1.5.2.2.2 Updating of Read Voltage Information

Updating of the read voltage information 21 in the second operation example of the second modification of the first embodiment will be described with reference to FIG. 27. FIG. 27 is a diagram for explaining an example of updating of the read voltage information in the second operation example of the second modification of the first embodiment.

The following shows an example of updating of the read voltage information 21 in a case where the second overall operations are executed on the block BLK0 of the chip Chip0. To simplify the explanation, FIG. 27 shows the read voltage identifiers, the individual read voltages, the information on whether the block is a common read voltage updating block, and information on whether a condition based on the individual read voltage is satisfied for the block BLK0, and common read voltages respectively corresponding to the common read voltage identifier Icom0-0 and the Icom0-1. In FIG. 27, a sign "0" is shown in a box corresponding to the condition based on the individual read voltage, in a case where the condition based on the individual read voltage is satisfied. In FIG. 27, a sign "x" is shown in a box corresponding to the condition based on the individual read voltage, in a case where the condition based on the individual read voltage is not satisfied.

In the following, an example will be described in which the condition based on the individual read voltage is that the difference between an individual read voltage calculated for the write target block BLK and a common read voltage corresponding to the common read voltage identifier Icom0-0 is less than a predetermined value.

In the example shown in FIG. 27, the block BLK0 is a common read voltage updating block. With this configuration, the first processing and the second processing are executed in the overall operations.

FIG. 27 (A) shows the read voltage information 21 before the first overall operations are executed. FIG. 27 (B) shows the read voltage information 21 after the first overall operations are executed and before the second overall operations are executed. FIG. 27 (C) shows the read voltage information 21 after the second overall operations are executed.

Before execution of the first processing including the first write processing in the example shown in FIG. 27, the common read voltage identifier Icom0-0 is assigned as the read voltage identifier of the block BLK0. A voltage Vc0-0(0) is stored as the common read voltage corresponding to the common read voltage identifier Icom0-0. A voltage Vc0-1(0) is stored as the common read voltage corresponding to the common read voltage identifier Icom0-1.

In the processing of St71 in the first overall operations, a voltage Vi0-0(0) is stored as the individual read voltage of the block BLK0. The difference between the voltage Vi0-0(0) as the individual read voltage of the block BLK0 and the voltage Vc0-0(0) as the common read voltage corresponding to the common read voltage identifier Icom0-0 is, for example, less than a predetermined value. Thus, in the processing of St72, the condition based on the individual read voltage is satisfied. Therefore, as shown in FIG. 27 (B), the common read voltage corresponding to the common read voltage identifier Icom0-0 is updated from the voltage Vc0-0(0) to the voltage Vc0-0(1) through the processing of St73. Further, in the processing of St75, the individual read voltage identifier Ii is assigned to the block BLK0.

In the processing of St71 in the second overall operations, a voltage Vi0-0(1) is stored as the individual read voltage of the block BLK0. The difference between the voltage Vi0-0(1) as the individual read voltage of the block BLK0 and the voltage Vc0-0(1) as the common read voltage corresponding to the common read voltage identifier Icom0-0 is, for example, equal to or larger than a predetermined value. Thus, in the processing of St72, the condition based on the individual read voltage is not satisfied. Therefore, as shown in FIG. 27 (C), the common read voltage corresponding to the common read voltage identifier Icom0-1 is updated from the voltage Vc0-1(0) to the voltage Vc0-1(1) through the processing of St74. Further, in the processing of St75, the individual read voltage identifier Ii is assigned to the block BLK0.

According to the second modification of the first embodiment, the same advantageous effects as those of the first embodiment and the first modification of the first embodiment can also be obtained.

2 Second Embodiment

In the first embodiment, the first modification of the first embodiment, and the second modification of the first embodiment, examples have been described in which the read voltage is updated based on the time that has passed since the execution of the write processing. However, the embodiment is not limited to this case. A controller 30 may update the read voltage at timing when it is determined that the read voltage should be updated in the internal processing of the memory system 1, regardless of the instructions for write processing or the like from a host device 2 or the like.

A configuration and an operation of the memory system according to the second embodiment will be described below.

2.1 Configuration

Figure 28:
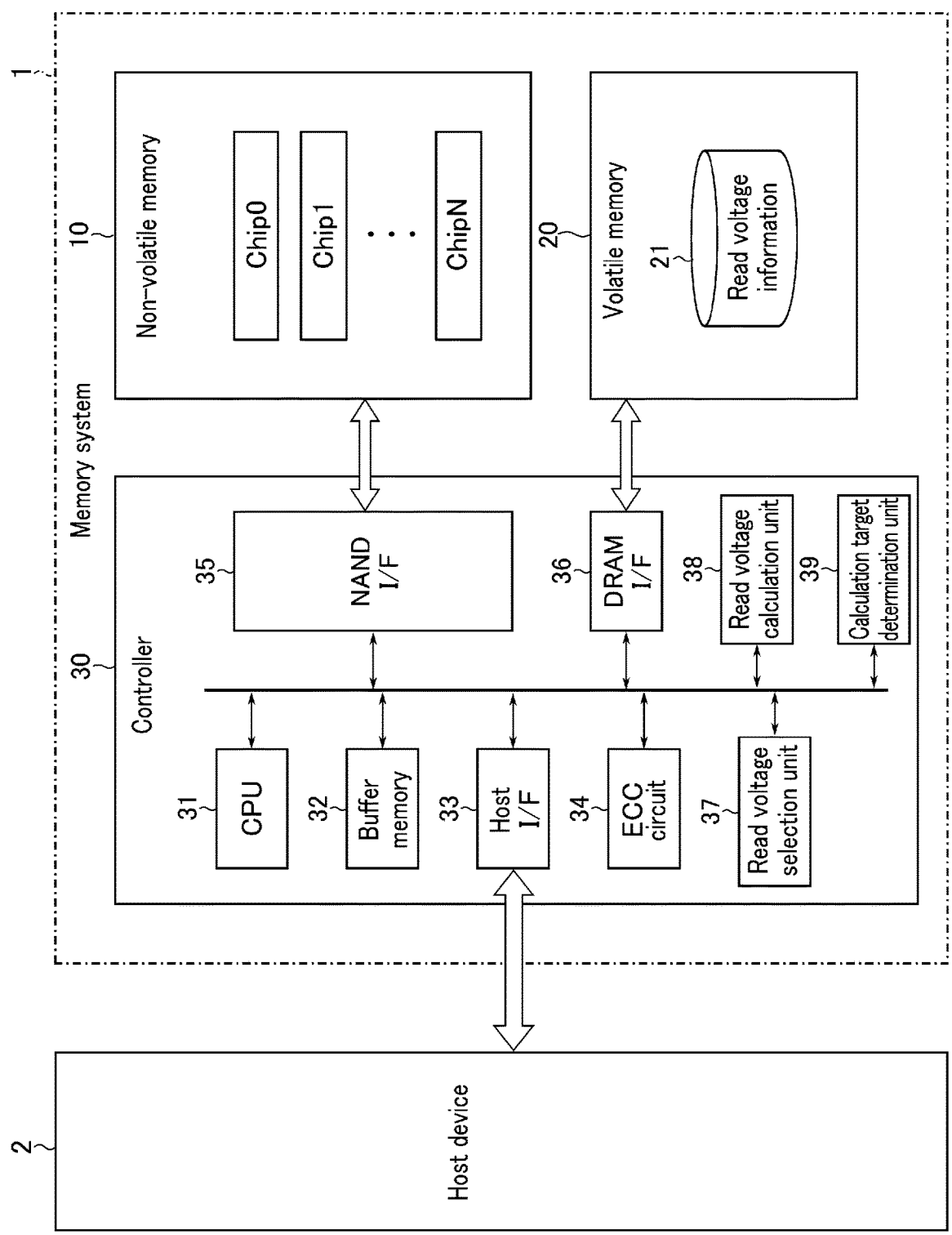
FIG. 28 is a block diagram for explaining an example of a configuration of a non-volatile memory according to a second embodiment.

A configuration of the memory system 1 according to the second embodiment will be described with reference to FIG. 28. FIG. 28 is a block diagram for explaining an example of a configuration of a non-volatile memory according to the second embodiment.

Configurations of a non-volatile memory 10 and a volatile memory 20 of the memory system 1 according to the second embodiment are substantially the same as those of the non-volatile memory 10 and the volatile memory 20 of the memory system 1 according to the first embodiment.

The controller 30 of the memory system 1 according to the second embodiment includes a CPU 31, a buffer memory 32, a host interface circuit 33, an ECC circuit 34, a NAND interface circuit 35, a DRAM interface circuit 36, a read voltage selection unit 37, a read voltage calculation unit 38, and a calculation target determination unit 39. In the controller 30 of the memory system 1 according to the second embodiment, the configurations of the CPU 31, the buffer memory 32, the host interface circuit 33, the ECC circuit 34, the NAND interface circuit 35, the DRAM interface circuit 36, the read voltage selection unit 37, and the read voltage calculation unit 38 are the same as those in the memory system 1 according to the first embodiment.

The calculation target determination unit 39 determines whether the read voltage of each block BLK should be updated based on the number of fail bits E in, for example, patrol processing. The patrol processing is internal processing periodically executed, for example, with respect to an effective block. In the patrol processing, the controller 30 patrols, for example, a plurality of pages in the non-volatile memory 10, thereby determining whether error correction processing can be performed. Based on the determination result, the controller 30 maintains a read voltage in an optimum state.

2.2 Operations

An operation of the memory system 1 according to the second embodiment will be described.

2.2.1 Operation Example of Second Embodiment

An operation example of the second embodiment will be described, in which a read voltage of a block BLK is updated, in a case where the number of fail bits E in the block is determined to be many, but does not exceed a maximum number of fail bits Eth such that error correction processing in a patrol operation is able to be performed.

2.2.1.1 Patrol Processing

Figure 29:
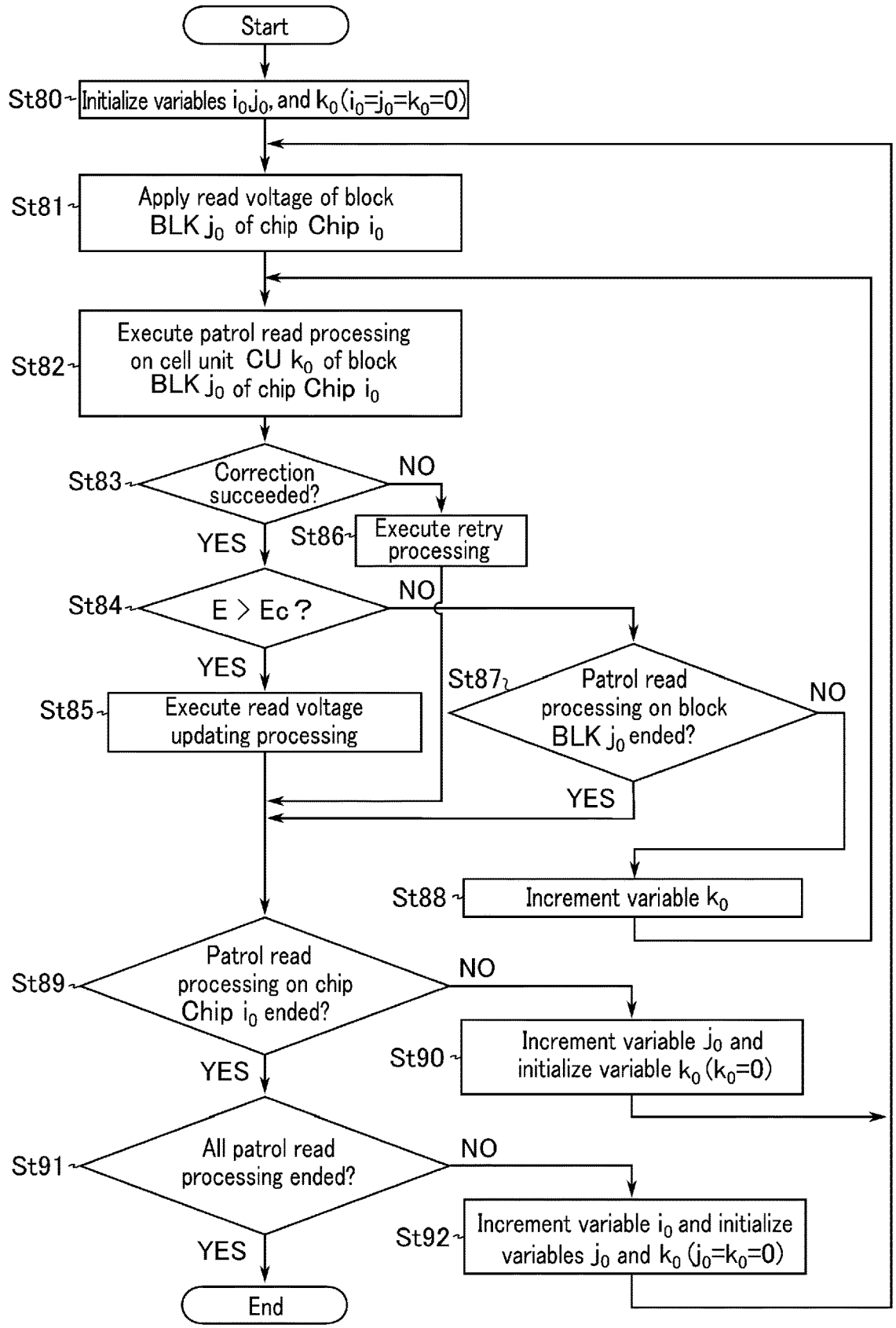
FIG. 29 is a flowchart for explaining patrol processing in a memory system according to an operation example of the second embodiment.

First, the patrol processing in the memory system 1 according to the second embodiment will be described with reference to FIG. 29. FIG. 29 is a flowchart for explaining the patrol processing in the memory system according to the operation example of the second embodiment. To simplify the explanation, a case in which each chip includes one plane PLN will be described.

In the processing of St80, the controller 30 initializes a variables $i_0$, $j_0$, and $k_0$ ($i_0=j_0=k_0=0$).

Based on a read voltage identifier assigned to a block $BLKj_0$ of a chip $Chipi_0$, the read voltage selection unit 37 applies a read voltage corresponding to the read voltage identifier as a read voltage of the block BLK (St81). The processing of applying the read voltage is substantially the same as the processing of St20 through St23 of the third operation example of the first embodiment.

The controller 30 executes patrol read processing using the determined read voltage mentioned above on a cell unit $CUk_0$ of the block $BLKj_0$ of the chip $Chipi_0$ (St82). More specifically, the controller 30 issues a command set to the effect that patrol read processing is to be executed, and transmits the command set to the non-volatile memory 10. Upon receipt of the command set, the non-volatile memory 10 reads data from the cell unit $CUk_0$ using the determined read voltage mentioned above. The read data is transmitted to the controller 30.

In the following description, a case will be described in which the non-volatile memory 10 reads data from all pages stored in the cell unit $CUk_0$ and outputs the read data to the controller 30 in the patrol read processing, but the embodiment is not limited to this case. For example, the non-volatile memory 10 may read data from specific one or more pages stored in the cell unit $CUk_0$ and may output the read data to the controller 30.

The ECC circuit 34 in the controller 30 performs error detection and error correction processing using the read data. The controller 30 determines whether the error correction has succeeded (St83). If it is determined that the error correction has succeeded (St83; YES), the processing proceeds to St84. If it is determined that the error correction has failed (St83; NO), the processing proceeds to St86.

The calculation target determination unit 39 determines, using the detection result mentioned above, whether the number of fail bits E of the cell unit $CUk_0$ of the block $BLKj_0$ of the chip $Chipi_0$ is larger than a predetermined reference value Ec (St84). The reference value Ec is smaller than the maximum number of fail bits Eth such that error correction processing is able to be performed, for example, with respect to a cell unit CU. The reference value Ec is a value of, for example, 40% or more of the number of fail bits Eth. If it is determined that the number of fail bits E of the cell unit $CUk_0$ is larger than the reference value Ec (St84; YES), the processing proceeds to St85. If it is determined that the number of fail bits E of the cell unit $CUk_0$ of the block $BLKj_0$ of the chip $Chipi_0$ is equal to or smaller than the reference value Ec (St84; NO), the processing proceeds to St87.

If it is determined that the number of fail bits E of the cell unit $CUk_0$ is larger than the reference value Ec (St84; YES), the controller 30 executes read voltage updating processing (St85). Details of the read voltage updating processing will be described later. Then, the processing proceeds to St89.

If it is determined that the error correction has failed (St83; NO), the controller 30 executes other retry processing (St86). Then, the processing proceeds to St89.

If it is determined that the number of fail bits E of the cell unit $CUk_0$ of the block $BLKj_0$ of the chip $Chipi_0$ is equal to or smaller than the reference value Ec (St84; NO), the controller 30 determines whether the patrol read processing of the cell unit CU of the block $BLKj_0$ of the chip $Chipi_0$ has ended (St87). If it is determined that the patrol read processing of the cell units CU of the block $BLKj_0$ of the chip $Chipi_0$ has ended (St87; YES), the processing proceeds to St89. If it is determined that the block $BLKj_0$ of the chip $Chipi_0$ still includes a cell unit CU for which the patrol read processing should be executed (St87; NO), the processing proceeds to St88.

If it is determined that the block $BLKj_0$ of the chip $Chipi_0$ still includes a cell unit CU for which the patrol read processing should be executed (St87; NO), the controller 30 increments the variable $k_0$ (St88). Then, the processing proceeds to St82. Thus, the processing of St82 through St88 is repeated until the patrol read processing has been completed for all cell units CU in the block $BLKj_0$ of the chip $Chipi_0$.

If the processing of St85 is executed and if it is determined that the patrol read processing has been executed for all cell units CU of the block $BLKj_0$ of the chip $Chipi_0$ (St87; YES), the controller 30 determines whether the patrol read processing has been executed for all blocks BLK of the chip $Chipi_0$ (St89). If it is determined that the patrol read processing has been executed for all blocks BLK of the chip $Chipi_0$ (St89; YES), the processing proceeds to St91. If it is determined that the chip $Chipi_0$ still includes a block BLK for which the patrol read processing should be executed (St89; NO), the processing proceeds to St90.

If it is determined that the chip $Chipi_0$ still includes a block BLK for which the patrol read processing should be executed (St89; NO), the controller 30 increments the variable $j_0$ (St90). The controller 30 initializes the variable $k_0$ ($k_0$=0). Then, the processing proceeds to St81. Thus, the processing of St81 through St90 is repeated until the patrol read processing has been completed for all blocks BLK of the chip $Chipi_0$.

If it is determined that the patrol read processing has been executed for all blocks BLK of the chip $Chipi_0$ (St89; YES), the controller 30 determines whether the patrol read processing has been executed for all chips (St91). If it is determined that the patrol read processing has been executed for all chips (St91; YES), the patrol processing ends. If it is determined that the memory still includes a chip for which the patrol read processing should be executed (St91; NO), the processing proceeds to St92.

If it is determined that the memory still includes a chip for which the patrol read processing should be executed (St91; NO), the controller 30 increments the variable $i_0$ (St92). Further, the controller 30 initializes the variables $j_0$ and $k_0$ ($j_0$=$k_0$=0). Then, the processing proceeds to St81. Thus, the processing of St81 through St92 is repeated until the patrol read processing has been completed for all chips.

Through the processing described above, the patrol processing ends.

The flow of the patrol processing described above is a mere example, and is not limited thereto.

The patrol read processing may be executed for one or more representative cell units CU selected in advance from each block BLK. The number of representative cell units CU may vary from block BLK to block BLK.

For example, the patrol read processing may be executed for one or more representative blocks BLK selected from each chip. The number of representative blocks BLK may vary from chip to chip.

Furthermore, for example, the controller 30 may exclude a portion of the memory area in the non-volatile memory 10 from the target of patrol processing. More specifically, the controller 30 may exclude an unused block BLK in which no data is written, an invalid BLK in which effective data is not written and which cannot be referred to, etc., from the target of patrol read processing.

Further, for example, the patrol processing may be executed in parallel for a plurality of chips.

Furthermore, FIG. 29 shows a case in which each chip includes one plane PLN, but the embodiment is not limited to this case. If each chip includes a plurality of planes PLN, the patrol processing may be executed for a plurality of planes PLN.

2.2.1.2 Read Voltage Updating Processing

The read voltage updating processing of St85 will be described with reference to FIG. 30. FIG. 30 is a flowchart for explaining the read voltage updating processing according to the second embodiment.

If it is determined that the number of fail bits E of the cell unit $CUk_0$ of the block $BLKj_0$ of the chip $Chipi_0$ is larger than the reference value Ec (St84; YES), the controller 30 determines whether the block $BLKj_0$ of the chip $Chipi_0$ satisfies a condition for the updating processing (St100). The condition for the updating processing is, for example, that the block BLK is an effective block BLK. Alternatively, the condition for the updating processing is, for example, that the number of times where the block BLK is a target of the read voltage updating processing is smaller than a predetermined time. Alternatively, the condition for the updating processing is, for example, that no block BLK is included in a first target list within a preset period. The preset period is, for example, a period up to the present from the time when the write processing on the block BLK was executed, a period determined most recently, or the like. If it is determined that the block BLK satisfies the condition for the updating processing (St100; YES), the processing proceeds to St101. If it is determined that the block BLK does not satisfy the condition for the updating processing (St100; NO), the read voltage updating processing ends.

The read voltage calculation unit 38 calculates an individual read voltage of the block $BLKj_0$ of the chip $Chipi_0$ (St101). The processing of calculating the individual read voltage is the same as, for example, the processing of St3 in the first operation example of the first embodiment or the processing of St10 in the second operation example of the first embodiment, except for executing the processing related to a block BLK including a cell unit CU in which the number of fail bits E is determined to be larger than the reference value Ec instead of executing the processing related to a block BLK on which the write processing has been executed. Then, the processing proceeds to St102.

The individual read voltage calculated by the read voltage calculation unit 38 in the processing of St101 is stored as an individual read voltage of the block $BLKj_0$ of the chip $Chipi_0$ (St102). Then, the processing proceeds to St103.

The read voltage calculation unit 38 assigns the individual read voltage identifier Ii as a read voltage identifier of the block $BLKj_0$ of the chip $Chipi_0$ (St103). Thus, the read voltage updating processing ends (End).

Through the operations described above, the read voltage updating processing is executed.

According to the memory system 1 of the second embodiment, the same advantageous effects as those of the first embodiment, the first modification of the first embodiment, and the second modification of the first embodiment can also be obtained.

Furthermore, according to the operation example of the second embodiment, in the patrol processing, the read voltage updating processing of a block BLK including a large number of fail bits E can be executed before the number of fail bits E reaches the maximum number of fail bits Eth such that error correction processing is able to be performed. As a result, for example, the frequency of retry processing can be reduced. Accordingly, the increase in read latency due to the increase in number of fail bits E can be suppressed.

In St100, the condition for updating processing is, for example, that the block BLK that is the target of the read voltage updating processing is an effective block BLK. Therefore, it is possible to avoid execution of processing on an invalid block BLK when executing the read voltage updating processing. This can also suppress the increase in read latency.

Further, in St100, the condition for updating processing is that the number of times where the block BLK that is a target of the read voltage updating processing is selected as a target of the read voltage updating processing is smaller than a predetermined number of times. The block that is selected as a target a number of times greater than the predetermined number of times may be a block from which an appropriated read voltage cannot be calculated due to, for example, breakage of data in the block. Therefore, it is possible to suppress the increase in load of processing on the system due to the repeated read voltage updating processing.

2.3 First Modification of Second Embodiment

In the second embodiment, the case has been described in which the read voltage updating processing is executed during the patrol processing, but the embodiment is not limited to this case. The read voltage updating processing may be executed after the completion of the patrol processing. In the following, differences in configurations and operations of a memory system according to the first modification of the second embodiment from those of the memory system according to the second embodiment will be mainly described.

2.3.1 Configuration

In the first modification of the second embodiment, a volatile memory 20 stores a first target list (not shown) based on instructions from a controller 30. To execute read voltage updating processing, the first target list stores blocks BLK that are targets of the read voltage updating processing. A read voltage calculation unit 38 executes read voltage updating processing on a block BLK stored in the first target list.

The configurations of a non-volatile memory 10, a controller 30, and a host device 2 of the first modification of the second embodiment are substantially the same as those of the non-volatile memory 10, the controller 30, and the host device 2 of the second embodiment. The configuration of a volatile memory 20 of the first modification of the second embodiment is the same as that of the volatile memory 20 of the second embodiment except for storing the first target list as described above.

2.3.2 Operations

In the following, differences in operations of the memory system 1 according to the first modification of the second embodiment from those of the memory system according to the operation example of the second embodiment will be mainly described.

2.3.2.1 Patrol Processing

Figure 31:
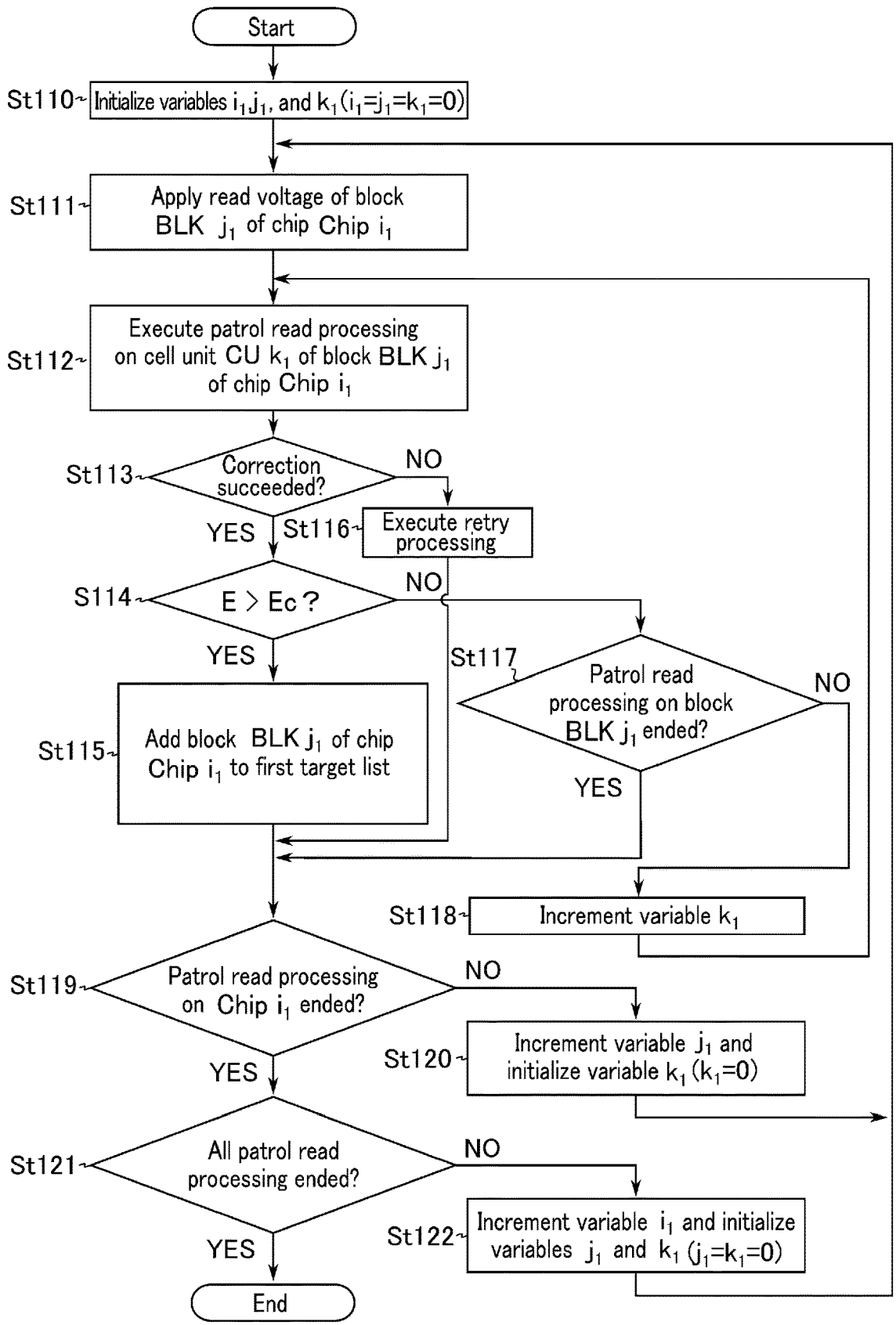
FIG. 31 is a flowchart for explaining patrol processing in a memory system according to a first modification of the second embodiment.

Patrol processing in the memory system 1 according to the first modification of the second embodiment will be described with reference to FIG. 31. FIG. 31 is a flowchart for explaining the patrol processing in the memory system according to the first modification of the second embodiment.

In the patrol processing of the first modification of the second embodiment, the processing of St110 through St114 and the processing of St116 through st122 are substantially the same as those of the processing of St80 through St84 and the processing of St86 through St92 in the operation examples of the second embodiment except for using variables $i_1$, $j_1$, and $k_1$ instead of the variables $i_0$, $j_0$, and $k_0$. In the following, differences in the patrol processing according to the first modification of the second embodiment from those of the operation examples of the patrol processing according to the second embodiment will be mainly described.

If it is determined that the number of fail bits E of a cell unit $CUk_1$ of a block $BLK_j1$ of a chip $Chipi_1$ is larger than the reference value Ec (St114; YES), the controller 30 adds the block $BLK_j1$ to the first target list (St115). Then, the processing proceeds to St119. Blocks BLK are added to the first target list in the order in which the number of fail bits E of a cell unit $CUk_1$ is determined to be larger than the reference value Ec in the processing of St114.

As described above, the patrol processing of the first modification of the second embodiment is completed by repeating the processing of Still through St122 until it is determined in the processing of step St121 that all patrol read processing has ended.

The controller 30 executes read voltage updating processing based on the first target list, for example, after the patrol processing described above and before next patrol processing.

In the description above, the case has been described in which all blocks BLK where the number of fail bits E is larger than the reference value Ec are added to the first target list, but the embodiment is not limited to this case. The number of blocks BLK to be added to the first target list may be one or any other predetermined number with respect to each chip. If one block BLK is added to the first target list with respect to each chip, the block BLK may be a block BLK where the number of fail bits E is the largest in each chip.

In a case of executing patrol processing on a plurality of planes PLN, the number of blocks BLK to be added to the first target list may be one or any other predetermined number with respect to each plane PLN. If one block BLK is added to the first target list with respect to each plane PLN, the block BLK may be a block BLK where the number of fail bits E is the largest in each plane PLN.

2.3.2.2 Read Voltage Updating Processing

Figure 32:
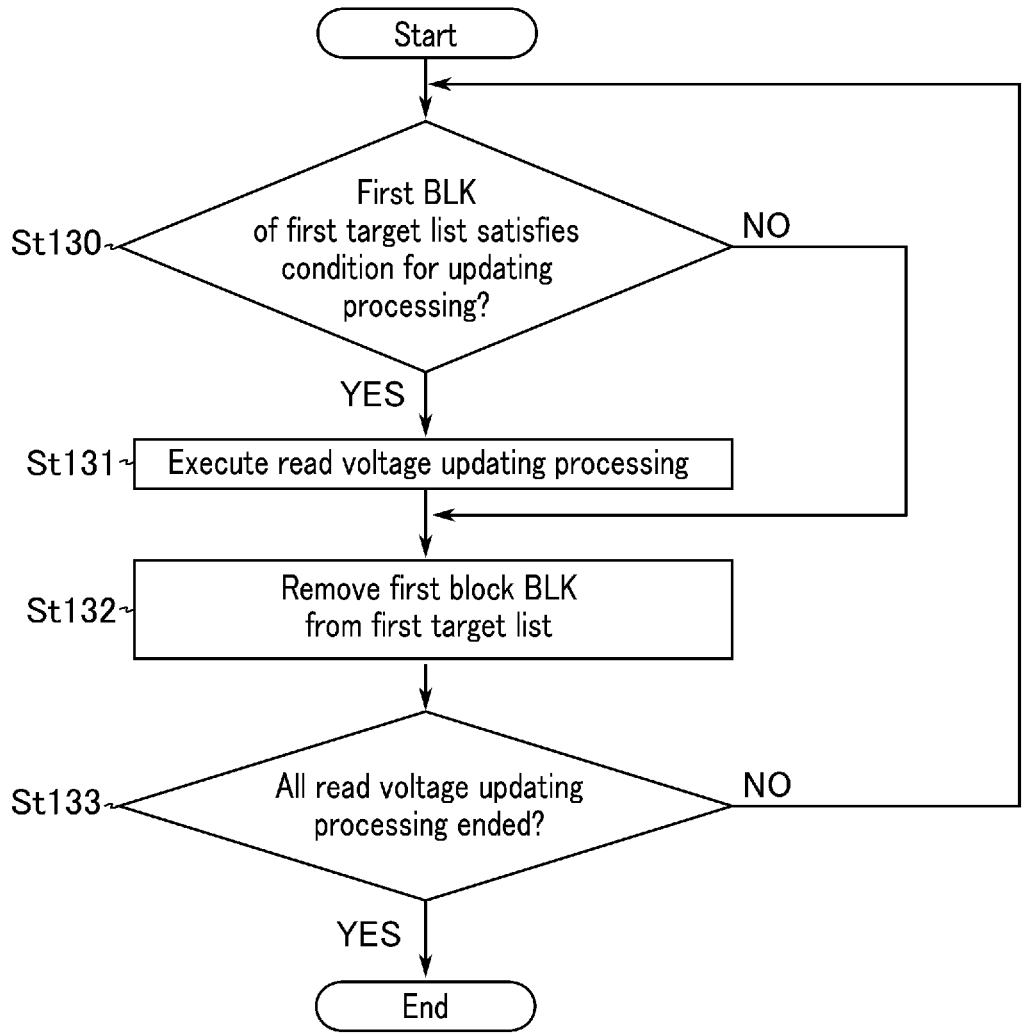
FIG. 32 is a flowchart for explaining a series of operations including read voltage updating processing of the memory system according to the first modification of the second embodiment.

Next, a series of operations including the read voltage updating processing of the memory system 1 according to the first modification of the second embodiment will be described with reference to FIG. 32. FIG. 32 is a flowchart for explaining the series of operations including the read voltage updating processing of the memory system according to the first modification of the second embodiment.

For example, upon receipt of an instruction for read voltage updating processing from the host device 2 (Start), the controller 30 determines whether the first block BLK in the first target list prepared in the aforementioned patrol processing satisfies the condition for updating processing (St130). The processing of St130 is the same as the processing of St100 except that the processing is executed on the first block BLK in the first target list, instead of the block $BLKj_0$, when the number of fail bits E of the cell unit $CUk_0$ of the block $BLKj_0$ of the chip $Chipi_0$ is determined to be larger than the reference value Ec. If it is determined that the first block BLK satisfies the condition for the updating processing (St130; YES), the processing proceeds to St131. If it is determined that the first block BLK does not satisfy the condition for updating processing (St130; NO), the processing proceeds to St132.

If it is determined that the first block BLK satisfies the condition for updating processing (St130; YES), the memory system 1 executes read voltage updating processing on the first block BLK (St131). The read voltage updating processing is the same as the processing of St85 of the operation example of the second embodiment except that the processing is executed on the first block BLK. Then, the processing proceeds to St132.

After execution of the read voltage updating processing (St131) and if it is determined that the first block BLK does not satisfy the condition for updating processing again (St130; NO), the controller 30 removes the first block BLK from the first target list (St132). Then, the processing proceeds to St133.

The controller 30 determines whether all read voltage updating processing has been completed (St133). Specifically, it is determined whether there is a block BLK included in the first target list. If it is determined that all read voltage updating processing has been completed (St133; YES), the processing ends. If it is determined that there is a block BLK included in the first target list (St133; NO), the processing proceeds to St130.

Thus, the series of operations including the read voltage updating processing ends (End).

According to the memory system 1 of the first modification of the second embodiment, the same advantageous effects as those of the first embodiment, the first modification of the first embodiment, the second modification of the first embodiment, and the second embodiment can also be obtained.

2.4 Second Modification of Second Embodiment

In the first modification of the second embodiment, the case has been described in which the read voltage updating processing is executed on blocks BLK in which the number of fail bits E is larger than the reference value Ec in the order of the first target list in the series of operations including the read voltage updating processing. However, the embodiment is not limited to this case. In the series of operations including the read voltage updating processing, the read voltage updating processing for some of the blocks BLK in which the number of fail bits E is larger than the reference value Ec may be preferentially executed.

In the following, differences in configurations and operations of a memory system according to the second modification of the second embodiment from those of the memory system according to the first modification of the second embodiment will be mainly described.

2.4.1 Configuration

In the second modification of the second embodiment, a volatile memory 20 stores a second target list and a third target list for executing read voltage updating processing. Each of the second target list and the third target list stores blocks BLK that are targets of read voltage updating processing. The number of fail bits E of the blocks BLK included in the second target list is larger than the number of fail bits E of the blocks BLK included in the third target list. A read voltage calculation unit 38 executes read voltage updating processing based on the second target list and the third target list.

The configurations of a non-volatile memory 10, a controller 30, and a host device 2 according to the second modification of the second embodiment are substantially the same as those of the non-volatile memory 10, the controller 30, and the host device 2 according to the first modification of the second embodiment. The configuration of the volatile memory 20 according to the second modification of the second embodiment is the same as that of the volatile memory 20 according to the first modification of the second embodiment except for storing the second target list and the third target list as described above.

2.4.2 Operations

Differences in operations of a memory system 1 according to the second modification of the second embodiment from those of the memory system according to the first modification of the second embodiment will be mainly described.

2.4.2.1 Patrol Processing (Overall Operations)

Regarding the patrol processing in the memory system 1 according to the second modification of the second embodiment, differences from the patrol processing in the memory system according to the first modification of the second embodiment will be described.

In the patrol processing of the second modification of the second embodiment, the controller 30 executes processing similar to the processing of St110 through St114 and the processing of St116 through St122 of the first modification of the second embodiment. In the following, differences in the patrol processing according to the first modification of the second embodiment from the patrol processing according to the second modification of the second embodiment will be mainly described.

In the second modification of the second embodiment, the controller 30 adds a block $BLKj_1$ of a chip $Chipi_1$ to either the second target list or the third target list based on the number of fail bits E. Details of the processing will be described later.

After the patrol processing of the second modification of the second embodiment and before the next patrol processing, the controller 30 executes read voltage updating processing based on the second target list and the third target list. Read voltage updating processing of the second modification of the second embodiment will be described later.

(Generation of Second Target List and Third Target List)

As described above, the controller 30 adds the block $BLKj_1$ to the second target list or the third target list based on the number of fail bits E. In the following, processing of adding the block $BLKj_1$ to the second target list or the third target list will be described with reference to FIG. 33. FIG. 33 is a flowchart showing processing for adding a block to a list of read voltage updating processing in the patrol processing using the memory system according to the second modification of the second embodiment.

If it is determined that the number of fail bits E in the cell unit $CUk_1$ is larger than the reference value Ec (St114; YES), the calculation target determination unit 39 determines whether the number of fail bits E in the cell unit $CUk_1$ of the block $BLKj_1$ is larger than a value (a×Eth) obtained by multiplying the maximum number of fail bits Eth such that error correction processing by a constant a is able to be performed (St140). The constant a is a positive number smaller than 1. The value (a×Eth) is larger than the reference value Ec. The reference value Ec in the second modification of the second embodiment is a value (b×Eth) obtained by multiplying the maximum number of fail bits Eth such that error correction processing by a constant b is able to be performed. The constant b is a positive number smaller than the constant a. If it is determined that the number of fail bits E of the cell unit $CUk_1$ is larger than the value (a×Eth) (St140; YES), the processing proceeds to St141. If it is determined that the number of fail bits E of the cell unit $CUk_1$ is equal to or smaller than the value (a×Eth) (St140; NO), the processing proceeds to St142.

If it is determined that the number of fail bits E of the cell unit $CUk_1$ is larger than the value (a×Eth) (St140; YES), the calculation target determination unit 39 adds the block $BLKj_1$ to the second target list (St141). Then, the processing ends. Blocks BLK are added to the second target list in the order in which the number of fail bits E of the cell unit $CUk_1$ is determined to be larger than the value (a×Eth) in the processing of St140.

If it is determined that the number of fail bits E of the cell unit $CUk_1$ is equal to or smaller than the value (a×Eth) (St140; NO), the controller 30 adds the block $BLKj_1$ to the third target list (St142). Then, the processing ends. Blocks BLK are added to the third target list in the order in which the number of fail bits E of the cell unit $CUk_1$ is determined to be equal to or smaller than the value (a×Eth) in the processing of St140.

Through the operations described above, the second target list and the third target list relating to the read voltage updating processing are generated.

2.4.2.2 Read Voltage Updating Processing

Next, a series of operations including the read voltage updating processing of the memory system 1 according to the second modification of the second embodiment will be described with reference to FIG. 34. FIG. 34 is a flowchart for explaining the series of operations including the read voltage updating processing of the memory system according to the second modification of the second embodiment.

For example, upon receipt of an instruction for read voltage updating processing from the host device 2 (Start), the controller 30 initializes a variable p (p=0) in St150.

The controller 30 determines whether a block BLK is included in the second target list (St151). If it is determined that a block BLK is included in the second target list (St151; YES), the processing proceeds to St152. If it is determined that no block BLK is included in the second target list (St151; NO), the processing proceeds to St154.

The controller 30 selects a first block BLK in the second target list as a target block BLK of the read voltage updating processing (St152). Then, the processing proceeds to St153.

The controller 30 removes the first block BLK in the second target list from the second target list (St153). Then, the processing proceeds to St157.

The controller 30 determines whether a block BLK is included in the third target list (St154). If it is determined that a block BLK is included in the third target list (St154; YES), the processing proceeds to St155. If it is determined that no block BLK is included in the third target list (St154; NO), the processing ends.

The controller 30 selects a first block BLK in the third target list as a target block BLK of the read voltage updating processing (St155). Then, the processing proceeds to St156.

The controller 30 removes the first block BLK in the third target list from the third target list (St156). Then, the processing proceeds to St157.

The memory system 1 executes the read voltage updating processing on the block BLK selected as a target of the read voltage updating processing in the processing of St152 or St155 (St157). The read voltage updating processing is the same as the processing of St85 of the operation example of the second embodiment and the processing of St131 of the second modification of the second embodiment except that the processing is executed on the block BLK selected as the target of the read voltage updating processing in the processing of St152 or St155. Then, the processing proceeds to St158.

The controller 30 increments the value of the variable p (St158). Then, the processing proceeds to St159.

The controller 30 determines whether the variable p is equal to or larger than a maximum permissible number of times Nmax (St159). If it is determined that the variable p is equal to or larger than the maximum permissible number of times Nmax (St159; YES), the processing ends. If it is determined that the variable p is smaller than the maximum permissible number of times Nmax (St159; NO), the processing proceeds to step St151. Thus, the processing of St151 through St159 is repeated until the read voltage updating processing has been executed the maximum permissible number of times Nmax.

Thus, the series of operations including the read voltage updating processing ends (End).

According to the memory system 1 of the second modification of the second embodiment, the same advantageous effects as those of the first embodiment, the first modification of the first embodiment, the second modification of the first embodiment, the second embodiment, and the first modification of the second embodiment can also be obtained.

In addition, according to the second modification of the second embodiment, the read voltage updating processing is executed based on the second target list and the third target list, thereby preferentially executing read voltage updating processing of the blocks BLK included in the second target list in which the number of fail bits is larger than that in the blocks BLK included in the third target list. As a result, the occurrence of blocks BLK exceeding the correction limit of the ECC circuit 34 can be efficiently suppressed. Furthermore, even if there is no block BLK included in the second target list, the read voltage updating processing on a block BLK included in the third target list can be executed, thereby suppressing the increase in the number of fail bits.

2.5 Third Modification of Second Embodiment

In the second embodiment, the case has been described in which the read voltage updating processing is executed in the patrol processing. However, the embodiment is not limited to this case. The read voltage updating processing may be executed based on an instruction from outside.

The configuration of a memory system 1 of the third modification of the second embodiment is substantially the same as that of the memory system of the second embodiment. In the following, differences in operations of the memory system 1 according to the third modification of the second embodiment from those of the memory system 1 according to the second embodiment will be mainly described.

Figure 35:
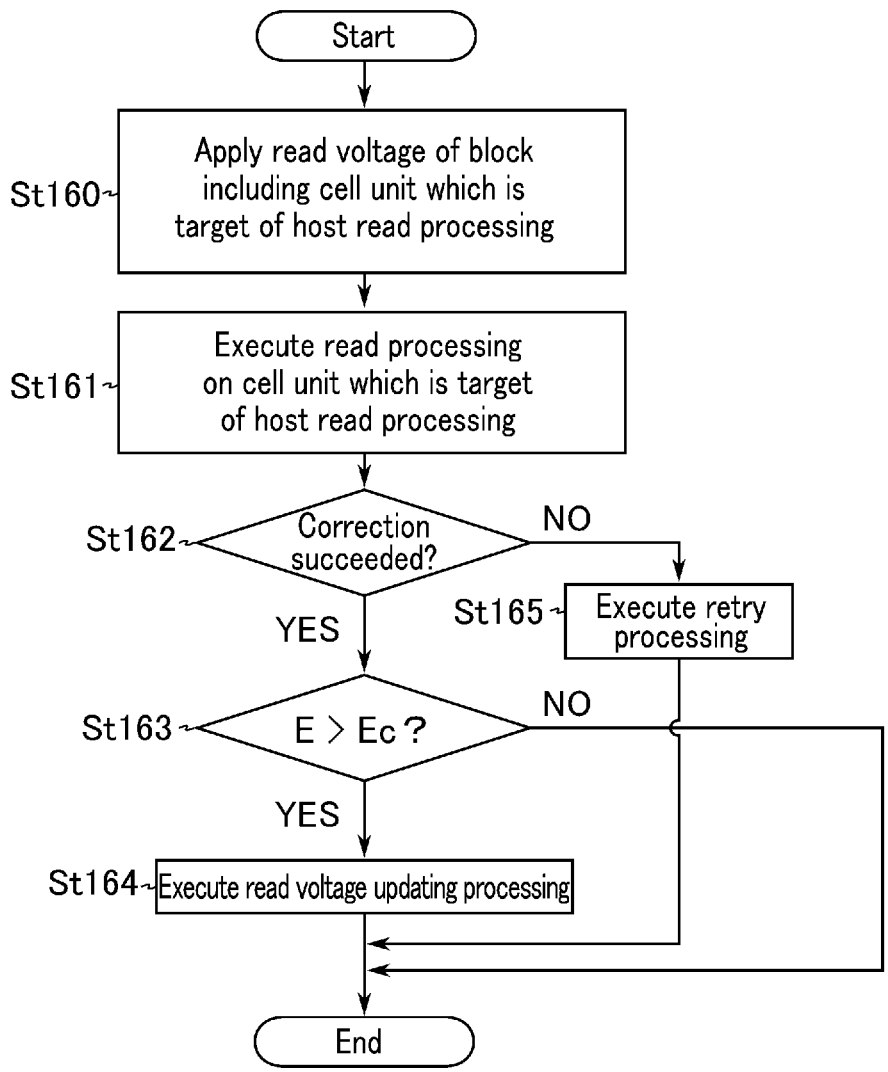
FIG. 35 is a flowchart for explaining host reading processing using a memory system according to a third modification of the second embodiment.

Host reading processing in the memory system 1 according to the third modification of the second embodiment will be described with reference to FIG. 35. FIG. 35 is a flowchart for explaining host reading processing using the memory system according to the third modification of the second embodiment.

Upon receipt of an instruction for read processing from a host device 2 (Start), a read voltage selection unit 37 applies, based on a read voltage identifier assigned to a block BLK including a cell unit CU which is a target of read processing in the instruction, a read voltage of the block BLK as the read voltage (St160).

The controller 30 executes the read processing using the applied read voltage on the cell unit CU, which is the target of host read processing (St161). Then, the processing proceeds to St162.

The processing of St162 is substantially the same as the processing of St83 of the operation example of the second embodiment and the processing of St113 of the first modification of the second embodiment except that the processing is executed on the cell unit CU as the target of the host read processing instead of the cell unit $CUk_0$ of the block $BLKj_0$ of the chip $Chipi_0$ and the cell unit $CUk_1$ of the block $BLKj_1$ of the chip $Chipi_1$. If it is determined that the error correction has succeeded (St162; YES), the processing proceeds to St163. If it is determined that the error correction has failed (St162; NO), the processing proceeds to St165.

The calculation target determination unit 39 determines, using the result of error detection in St162, whether the number of fail bits E of the cell unit CU is larger than the reference value Ec (St163). If it is determined that the number of fail bits E of the cell unit CU is larger than the reference value Ec (St163; YES), the processing proceeds to St164. If it is determined that the number of fail bits E of the cell unit CU is equal to or smaller than the reference value Ec (St163; NO), the host read processing ends (End).

If it is determined that the number of fail bits E of the cell unit CU is larger than the reference value Ec (St163; YES), the controller 30 executes read voltage updating processing (St164). The processing of St164 is substantially the same as the processing of St85 of the operation example of the second embodiment, the processing of St131 of the first modification of the second embodiment, and the processing of St157 of the second modification of the second embodiment except that the processing is executed on the block BLK including the cell unit CU as the target of the host read processing. Then, the host read processing ends.

The processing of St165 is substantially the same as the processing of St86 of the operation example of the second embodiment and the processing of St116 of the first modification of the second embodiment except that the processing is executed on the cell unit CU as the target of the host read processing instead of the cell unit $CUk_0$ of the block $BLKj_0$ of the chip $Chipi_0$ and the cell unit $CUk_1$ of the block $BLKj_1$ of the chip $Chipi_1$.

Through the operations described above, the host read processing ends.

According to the memory system 1 of the third modification of the second embodiment, the same advantageous effects as those of the first embodiment, the first modification of the first embodiment, the second modification of the first embodiment, and the second embodiment can also be obtained.

2.6 Fourth Modification of Second Embodiment

In the third modification of the second embodiment, the case has been described in which the read voltage updating processing is executed during the host read processing. However, the embodiment is not limited to this case. The read voltage updating processing may be executed, in processing other than the host read processing, on the block BLK determined to be the target of the read voltage updating processing in the host read processing.

The configuration of the memory system 1 according to the fourth modification of the second embodiment is substantially the same as that of the memory system according to the first modification of the second embodiment. In the following, differences in operations of a memory system 1 according to the fourth modification of the second embodiment from those of the memory system 1 according to the first modification of the second embodiment will be described.

Figure 36:
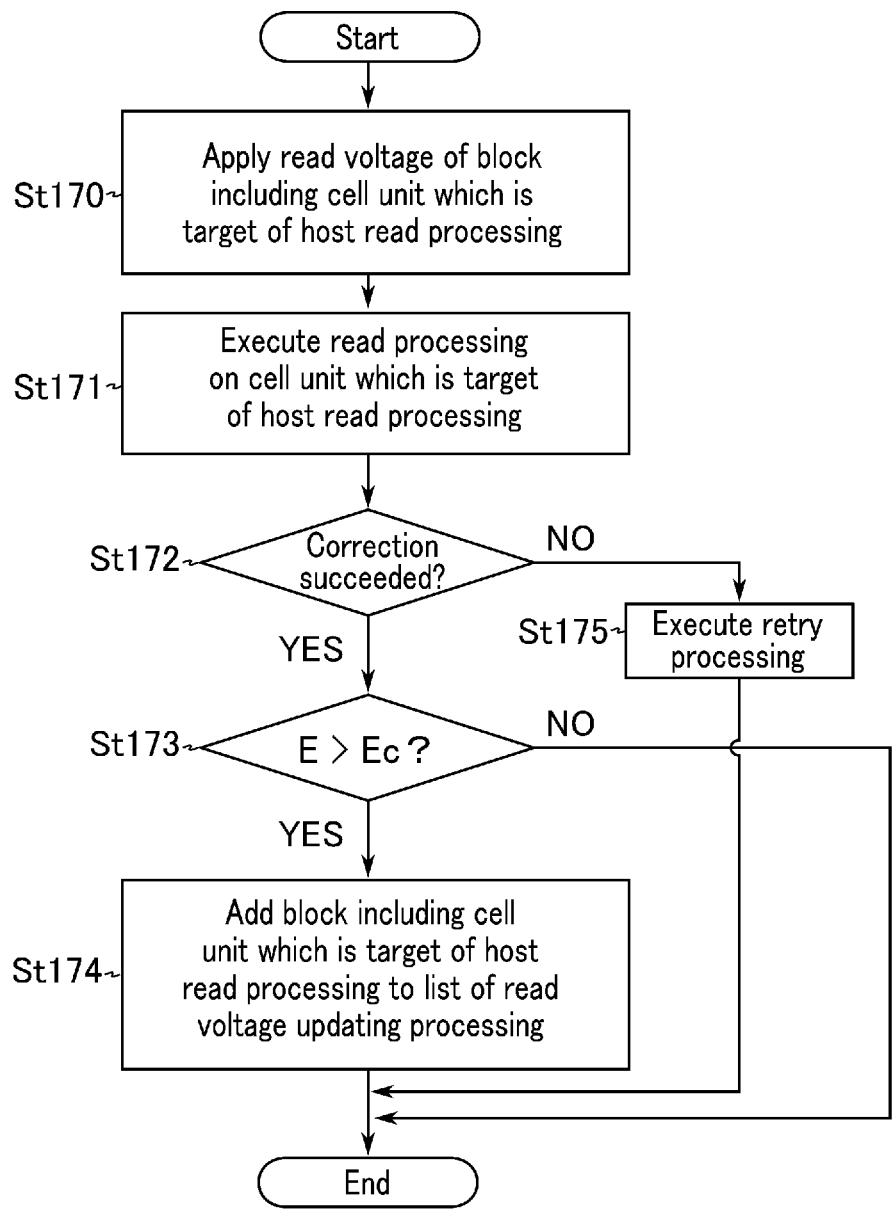
FIG. 36 is a flowchart for explaining host reading processing using a memory system according to a fourth modification of the second embodiment.

Host read processing in the memory system 1 according to the fourth modification of the second embodiment will be described with reference to FIG. 36. FIG. 36 is a flowchart for explaining the host reading processing using the memory system according to the fourth modification of the second embodiment.

The processing of St170 through St173 and St175 is substantially the same as the processing of St160 through St163 and St165 in the third modification of the second embodiment.

If it is determined that the number of fail bits E of the cell unit CU as the target of host read processing is larger than the reference value Ec (St173; YES), the controller 30 adds a block BLK including the cell unit CU to the list of the read voltage updating processing (St174). The controller 30 may produce one target list in the same manner as in the first modification of the second embodiment, or may produce two target lists based on the number of fail bits in the same manner as in the second modification of the second embodiment. Then, the host read processing ends.

The read voltage updating processing using the first target list and the read voltage updating processing using the second target list and the third target list may be respectively the same as the read voltage updating processing in the first modification of the second embodiment and the read voltage updating processing in the second modification of the second embodiment.

According to the memory system 1 of the fourth modification of the second embodiment, the same advantageous effects as those of the first embodiment, the first modification of the first embodiment, the second modification of the first embodiment, the second embodiment, the first modification of the second embodiment, the second modification of the second embodiment, and the third modification of the second embodiment can also be obtained.

2.7 Fifth Modification of Second Embodiment

In the operation example of the second embodiment described above, an example is described, in which a read voltage of a block BLK is updated, in a case where the number of fail bits E in the block is determined to be many, but does not exceed a maximum number of fail bits Eth such that error correction processing in a patrol operation is able to be performed. However, the embodiment is not limited to this example. The read voltage of a block BLK that is determined to have exceeded the maximum number of fail bits such that error correction processing is able to be performed may be updated in the patrol processing.

The configuration of the fifth modification of the second embodiment may be the same as that of the second embodiment. In the following, differences in operations according to the fifth modification of the second embodiment from those of the second embodiment will be mainly described.

2.7.1 Operation Example

An operation example of the fifth modification of the second embodiment will be described in which a read voltage of a block BLK is updated in a case where the number of fail bits E is determined to have exceeded the maximum number of fail bits Eth such that error correction processing in the patrol processing is able to be performed.

2.7.1.1 Read Voltage Updating Processing

Figure 37:
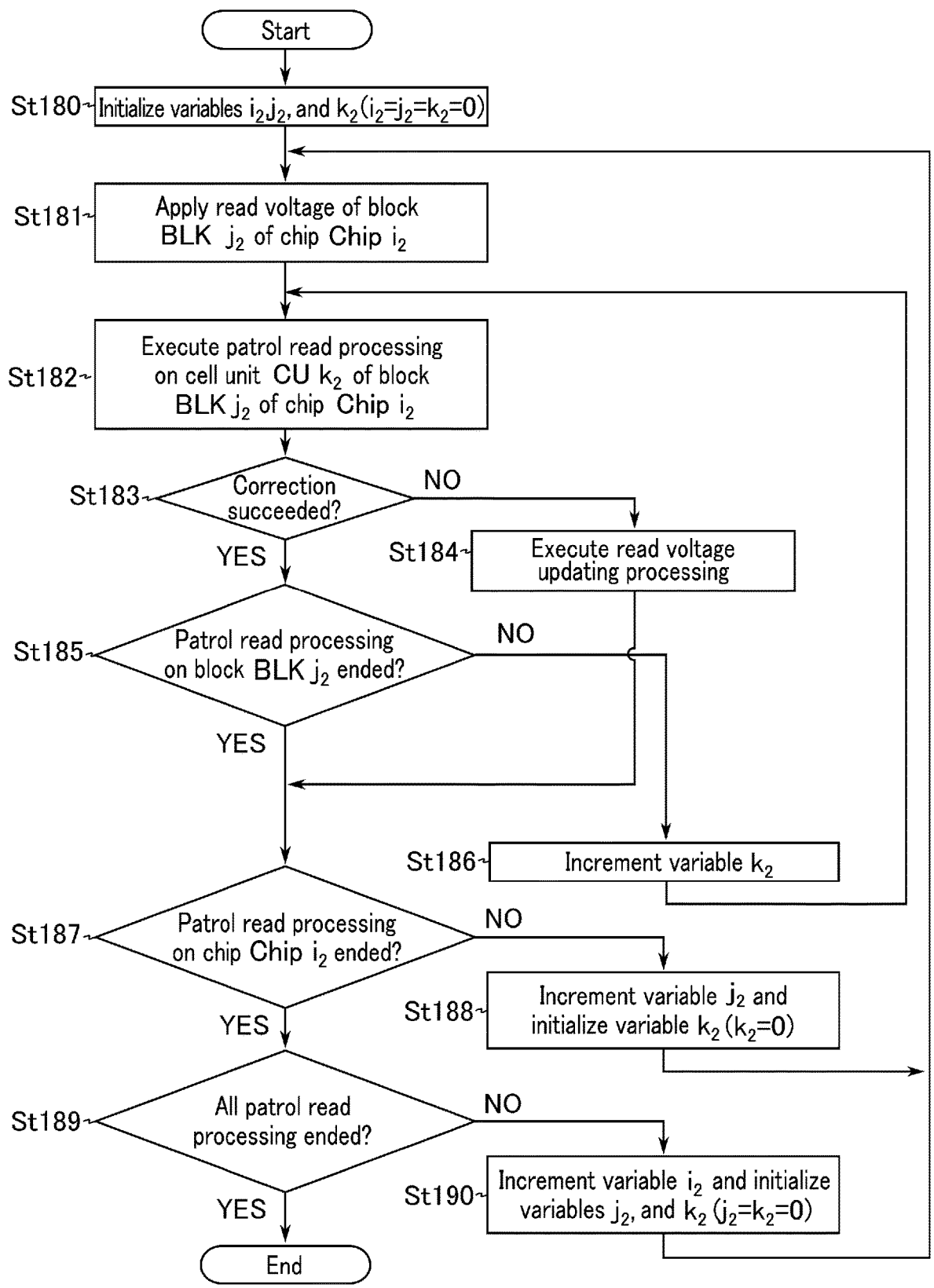
FIG. 37 is a flowchart for explaining patrol processing in a memory system according to a fifth modification of the second embodiment.

Overall operations in the fifth modification of the second embodiment will be described with reference to FIG. 37. FIG. 37 is a flowchart for explaining patrol processing in a memory system according to the fifth modification of the second embodiment.

In the patrol processing in the fifth modification of the second embodiment, the processing of St180 through St182 and St185 through St190 is substantially the same as the processing of St80 through St82 and St87 through St92 in the patrol processing of the operation example of the second embodiment, except for using variables $i_2$, $j_2$, and $k_2$ instead of the variables $i_0$, $j_0$, and $k_0$. In the following, differences in the patrol processing according to the fifth modification of the second embodiment from those of the operation examples of the patrol processing according to the second embodiment will be mainly described.

The controller 30 determines whether the error correction has succeeded (St183). If it is determined that the error correction has succeeded (St183; YES), the processing proceeds to St185. If it is determined that the error correction has failed (St183; NO), the processing proceeds to St184.

If it is determined that the error correction has failed (St183; NO), the read voltage calculation unit 38 executes the read voltage updating processing in the same manner as in the processing of St85 of the operation example of the second embodiment, the processing of St131 of the first modification of the second embodiment, the processing of St157 of the second modification of the second embodiment, and the processing of St164 of the third modification of the second embodiment, except that the processing relating to a block $BLKj_2$ of a chip $Chipi_2$ is executed instead of the processing relating to the block $BLKj_0$ of the chip $Chipi_0$ (St184). Through the operations described above, the read voltage calculation unit 38 stores a calculated individual read voltage as an individual read voltage of the block $BLKj_2$ of the chip $Chipi_2$. The read voltage calculation unit 38 also assigns the individual read voltage identifier Ii as the read voltage identifier of the read voltage identifier of the block $BLKj_2$ of the chip $Chipi_2$. Then, the processing proceeds to St187.

In the manner described above, the operations of the fifth modification of the second embodiment are executed.

According to the memory system 1 of the fifth modification of the second embodiment, the same advantageous effects as those of the first embodiment, the first modification of the first embodiment, and the second modification of the first embodiment can also be obtained.

3. Others

The case in which a common read voltage is applied in each chip has been described above, but the embodiments are not limited to this case. A common read voltage may be applied to each plane PLN, or each group of a plurality of blocks BLK in the plane PLN. In the case of applying a common read voltage to each group of blocks BLK in each plane PLN, the blocks BLK in the plane PLN are divided into groups based on the physical distance between a sense amplifier module and each of the blocks BLK in the plane PLN.

Furthermore, the case in which a read voltage identifier is assigned to each block BLK has been described, but the embodiments are not limited to this case. A read voltage identifier may be assigned to a unit smaller than the block BLK. The unit smaller than the block BLK is, for example, a word line group including at least one cell unit CU. In this case, the volatile memory 20 of the memory system 1 stores read voltage information with respect to, for example, each word line group. Specifically, the volatile memory 20 stores, for example, a read voltage identifier, an individual read voltage, and information on whether the word line group is for updating a common read voltage with respect to each word line group. The word line group for updating a common read voltage corresponds to a common read voltage updating block. Furthermore, in the overall operations including the first processing and the second processing, the patrol processing, and the host read processing, processing can be executed for each word line group instead of executing processing for each block BLK. Moreover, each chip may be managed based on a combination of different configuration units, each including, for example, at least one block BLK and at least one word line group. In this case, the read voltage information 21 can include a read voltage identifier, an individual read voltage, and information on whether the block BLK is for updating a common read voltage with respect to each of at least one block BLK. The read voltage information 21 can also include a read voltage identifier, an individual read voltage, and information on whether the word line group is for updating a common read voltage with respect to each of at least one word line group. In the overall operations including the first processing and the second processing, the patrol processing, and the host read processing, either processing targeted for a block BLK or processing targeted for a word line group can be executed.

In the above embodiments, the case has been described in which the read voltage information 21 is stored in only the volatile memory 20. However, the embodiments are not limited to this case. The memory system 1 may be configured to store at least part of the read voltage information 21 in the non-volatile memory 10. Furthermore, the memory system 1 may be configured so that, for example, the non-volatile memory 10 regularly or irregularly stores latest updated information or added information of the read voltage information 21. Accordingly, in a case where the power supply of the memory system 1 is improperly shut off, the read voltage information 21 can be restored based on the information on the read voltage information 21 stored in the non-volatile memory 10.

The embodiments of the present invention have been explained. These are presented merely as examples and are not intended to restrict the scope of the invention. These embodiments may be realized in various other forms, and various omissions, replacements, and changes can be made without departing from the gist of the invention. Such embodiments and modifications are included in the scope and gist of the invention, and are included in the scope of the invention described in the claims and its equivalents.

What is claimed is:

1. A memory system comprising:
a non-volatile memory including a first sub-memory region, a second sub-memory region, a third sub-memory region, a fourth sub-memory region, and a fifth sub-memory region; and
a controller, wherein
each of the first sub-memory region, the second sub-memory region, the third sub-memory region, the fourth sub-memory region, and the fifth sub-memory region includes a plurality of memory cells, and
the controller is configured to:
calculate a first voltage corresponding to the first sub-memory region in first processing;
calculate a second voltage corresponding to the fourth sub-memory region in second processing after the first processing;
before the first processing, use a third voltage as a common voltage when reading data from each of the first sub-memory region, the second sub-memory region, the fourth sub-memory region, and the fifth sub-memory region, and use a fourth voltage corresponding to the third sub-memory region when reading data from the third sub-memory region;
after the first processing and before the second processing, use the first voltage when reading data from fifth voltage calculated by using the first voltage when reading data from each of the second sub-memory region, the fourth sub-memory region, and the fifth sub-memory region, and use the fourth voltage when reading data from the third sub-memory region; and
after the second processing, use the first voltage when reading data from the first sub-memory region, use as the common voltage a sixth voltage calculated by using the second voltage when reading data from each of the second sub-memory region and the fifth sub-memory region, use the fourth voltage when reading data from the third sub-memory region, and use the second voltage when reading data from the fourth sub-memory region.

2. The system of claim 1, wherein
the first processing is executed when a first condition is satisfied,
the first condition including:
that data is written in the first sub-memory region; and
at least one of that a first period of time has elapsed after data is written in the first sub-memory region, that the temperature is equal to or higher than a first temperature, or that the number of fail bits is equal to or larger than a first value when reading data from the first sub-memory region.

3. The system of claim 2, wherein
whether the first condition is satisfied is determined through processing without an instruction from outside.

4. The system of claim 2, wherein
whether the first condition is satisfied is determined based on a read instruction from outside.

5. A memory system according to claim 1, wherein
the non-volatile memory includes a first memory region and a second memory region,
each of the first memory and the second memory region includes a plurality of sub-memory regions, each sub-memory region including a plurality of memory cells,
the plurality of sub-memory regions included in the first memory region including the first sub-memory region, the second sub-memory region, the third sub-memory region, the fourth sub-memory region, and the fifth sub-memory region, and
the controller is configured to:
use a first common voltage corresponding to the first memory region as the common voltage when reading data from each of the sub-memory regions included in the first memory region; and
use a second common voltage corresponding to the second memory region and independent of the first common voltage when reading data from each of the sub-memory regions included in the second memory region.

6. The system of claim 5, wherein
the controller is configured to, when a first sub-memory region in the first memory region satisfies a first condition:
calculate a first voltage corresponding to the first sub-memory region;
calculate a second voltage based on the first voltage; and
apply the second voltage as the first common voltage.

7. A memory system comprising:
a non-volatile memory including a first sub-memory region, a second sub-memory region, a third sub-memory region, a fourth sub-memory region, a fifth sub-memory region, and a sixth sub-memory region; and
a controller, wherein
each of the first sub-memory region, the second sub-memory region, the third sub-memory region, the fourth sub-memory region, the fifth sub-memory region, and the sixth sub-memory region including a plurality of memory cells, and
the controller is configured to:
calculate a first voltage corresponding to the first sub-memory region in first processing;
before the first processing, use a second voltage as a first common voltage when reading data from each of the first sub-memory region, the second sub-memory region, and the fourth sub-memory region, use a third voltage corresponding to the third sub-memory region when reading data from the third sub-memory region, and use a fourth voltage as a second common voltage when reading data from each of the fifth sub-memory region and the sixth sub-memory region;
when a first condition is satisfied in the first processing, after the first processing, use the first voltage when reading data from the first sub-memory region, use as the first common voltage a fifth voltage calculated by using the first voltage when reading data from each of the second sub-memory region and the fourth sub-memory region, use the third voltage when reading data from the third sub-memory region, and use the fourth voltage when reading data from each of the fifth sub-memory region and the sixth sub-memory region; and
when a first condition is not satisfied in the first processing, after the first processing, use the first voltage when reading data from the first sub-memory region, use the second voltage as the first common voltage when reading data from each of the second sub-memory region and the fourth sub-memory region, use the third voltage when reading data from the third sub-memory region, and use as the second common voltage a sixth voltage calculated by using the first voltage when reading data from each of the fifth sub-memory region and the sixth sub-memory region.

8. The system of claim 7, wherein
the first processing is executed when a second condition is satisfied,
the second condition including:
   that data is written in the first sub-memory region; and
   at least one of that a first period of time has elapsed after data is written in the first sub-memory region, that the temperature is equal to or higher than a first temperature, or that the number of fail bits is equal to or larger than a first value when data is read from the first sub-memory region.

9. The system of claim 8, wherein
the first condition includes at least one of:
   a condition related to a position of the first sub-memory region;
   a condition related to a temperature when data is written in the first sub-memory region;
   a condition related to a status when data is written in the first sub-memory region; or that the fifth voltage or the sixth voltage is within a first voltage range.

10. The system of claim 8, wherein
whether the second condition is satisfied is determined through processing without an instruction from outside.

11. The system of claim 8, wherein
whether the second condition is satisfied is determined based on a read instruction from outside.

12. A memory system, comprising:
a non-volatile memory including a first memory region and a second memory region; and
a controller, wherein
each of the first memory and the second memory region including a plurality of sub-memory regions, each sub-memory region including a plurality of memory cells, and
the controller is configured to:
   use a first common voltage corresponding to the first memory when reading data from each of the sub-memory regions included in the first memory region; and
   use a second common voltage corresponding to the second memory region and independent of the first common voltage when reading data from each of the sub-memory regions included in the second memory region;
the controller is further configured to, when a first sub-memory region in the first memory region satisfies a first condition:
   calculate a first voltage corresponding to the first sub-memory region;
   calculate a second voltage based on the first voltage; and
   apply the second voltage as the first common voltage;
the controller is further configured to, after applying the second voltage as the first common voltage:
   use the first common voltage when reading data from each of the sub-memory regions, excluding the first sub-memory region, included in the first memory region; and
   use the first voltage when reading data from the first sub-memory region.

13. The system of claim 12, wherein
the first condition includes a condition that a temperature is lower than a predetermined temperature when data is written in the first sub-memory region.

14. The system of claim 12, wherein
the first condition includes a condition that the number of times of execution of data write processing into the first sub-memory region is smaller than a predetermined number of times when data is written in the first sub-memory region.

15. The system of claim 12, wherein
the controller is configured to, when a second sub-memory region in the first memory region satisfies a second condition, use a third common voltage corresponding to the first memory region when reading data from the second sub-memory region.

16. The system of claim 15, wherein
the controller is configured to, when a third sub-memory region in the first memory region satisfies the second condition:
calculate a third voltage corresponding to the third sub-memory region;
calculate a fourth voltage based on the third voltage; and
apply the fourth voltage as the third common voltage.

17. A memory system, comprising:
a non-volatile memory including a first memory region and a second memory region; and
a controller, wherein
each of the first memory and the second memory region including a plurality of sub-memory regions, each sub-memory region including a plurality of memory cells, and
the controller is configured to:
   use a first common voltage corresponding to the first memory when reading data from each of the sub-memory regions included in the first memory region; and
   use a second common voltage corresponding to the second memory region and independent of the first common voltage when reading data from each of the sub-memory regions included in the second memory region;
the controller is further configured to, when a fourth sub-memory region of the sub-memory regions included in the first memory region satisfies a third condition:
   calculate a fifth voltage corresponding to the fourth sub-memory region; and
   use the fifth voltage when reading data from the fourth sub-memory region; and
   use the first common voltage when reading data from each of the sub-memory regions, excluding the fourth sub-memory region, included in the first memory region.

18. The system of claim 17, wherein
whether the fourth sub-memory region satisfies the third condition is determined through internal processing without an instruction from outside.

19. The system of claim 17, wherein
whether the fourth sub-memory region satisfies the third condition is determined based on an instruction from outside.

* * * * *